US008768097B2

(12) United States Patent
Wang et al.

(10) Patent No.: US 8,768,097 B2
(45) Date of Patent: Jul. 1, 2014

(54) IMAGE PROCESSING APPARATUS, MOVING IMAGE REPRODUCING APPARATUS, AND PROCESSING METHOD AND PROGRAM THEREFOR

(75) Inventors: QiHong Wang, Tokyo (JP); Yasutaka Fukumoto, Tokyo (JP); Masatomo Kurata, Tokyo (JP); Shingo Tsurumi, Saitama (JP); Mitsuo Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 12/524,383

(22) PCT Filed: Dec. 4, 2008

(86) PCT No.: PCT/JP2008/072036
§ 371 (c)(1),
(2), (4) Date: Jul. 24, 2009

(87) PCT Pub. No.: WO2009/072551
PCT Pub. Date: Jun. 11, 2009

(65) Prior Publication Data
US 2010/0111429 A1    May 6, 2010

(30) Foreign Application Priority Data
Dec. 7, 2007  (JP) .................................. 2007-317770

(51) Int. Cl.
*G06K 9/36*   (2006.01)
*G06K 9/32*   (2006.01)
*G09G 5/00*   (2006.01)
*H04N 9/74*   (2006.01)

(52) U.S. Cl.
USPC ............ 382/284; 382/294; 345/629; 348/584

(58) Field of Classification Search
None
See application file for complete search history.

(56) References Cited

U.S. PATENT DOCUMENTS

| 5,469,274 A | 11/1995 | Iwasaki et al. |
| 5,649,032 A | 7/1997 | Burt et al. |

(Continued)

FOREIGN PATENT DOCUMENTS

| JP | 5 260264 | 10/1993 |
| JP | 7 28986 | 1/1995 |

(Continued)

OTHER PUBLICATIONS

U.S. Appl. No. 12/565,499, filed Sep. 23, 2009, Tsurumi.

(Continued)

*Primary Examiner* — Randolph I Chu
(74) *Attorney, Agent, or Firm* — Oblon, Spivak, McClelland, Maier & Neustadt, L.L.P.

(57) ABSTRACT

To easily understand the contents of a moving image taken by an image taking apparatus. An image conversion block 150 converts a taken image on the basis of conversion information. A transparency conversion block 160 converts the transparency in the converted taken image. A image synthesis block 170 synthesizes the taken image with the transparency converted with a log image and holds a resultant new log image in an image memory 180. An index image extraction block 190 extracts a new index image from among the converted taken images on the basis of the coordinate position and size of an index image in an image taking space. A selection block 270 selects an index image on the basis of the position of a selected representative image when the position of a panorama image displayed on a display block 292 is selected. A display control block 291 displays a panorama image on the display block 292 and displays the selected index image, overlapped on the panorama image.

12 Claims, 63 Drawing Sheets

(56) References Cited

U.S. PATENT DOCUMENTS

| | | | |
|---|---|---|---|
| 5,657,402 A | | 8/1997 | Bender et al. |
| 5,706,416 A | | 1/1998 | Mann et al. |
| 5,920,657 A | | 7/1999 | Bender et al. |
| 5,982,951 A | * | 11/1999 | Katayama et al. ............ 382/284 |
| 5,999,662 A | | 12/1999 | Burt et al. |
| 6,393,163 B1 | | 5/2002 | Burt et al. |
| 6,434,280 B1 | * | 8/2002 | Peleg et al. ................... 382/299 |
| 6,466,262 B1 | | 10/2002 | Miyatake et al. |
| 6,895,126 B2 | | 5/2005 | Di Bernardo et al. |
| 7,327,494 B2 | | 2/2008 | Aiso |
| 2001/0005208 A1 | * | 6/2001 | Minami et al. ................ 345/474 |
| 2002/0126890 A1 | * | 9/2002 | Katayama et al. ............ 382/154 |
| 2002/0135672 A1 | * | 9/2002 | Sezan et al. ..................... 348/36 |
| 2004/0150657 A1 | | 8/2004 | Wittenburg et al. |
| 2004/0197075 A1 | * | 10/2004 | Aiso ................................ 386/46 |
| 2005/0041156 A1 | | 2/2005 | Kondo et al. |
| 2006/0109283 A1 | | 5/2006 | Shipman et al. |
| 2007/0008499 A1 | | 1/2007 | Iketani et al. |
| 2007/0058717 A1 | * | 3/2007 | Chosak et al. .......... 375/240.08 |
| 2007/0103544 A1 | | 5/2007 | Nakazawa |
| 2008/0050035 A1 | * | 2/2008 | Tsurumi ...................... 382/276 |
| 2010/0111429 A1 | | 5/2010 | Wang et al. |

FOREIGN PATENT DOCUMENTS

| | | |
|---|---|---|
| JP | 9 62861 | 3/1997 |
| JP | 11 4398 | 1/1999 |
| JP | 11 120353 | 4/1999 |
| JP | 11 134352 | 5/1999 |
| JP | 11 289517 | 10/1999 |
| JP | 2002 359798 | 12/2002 |
| JP | 2003 323170 | 11/2003 |
| JP | 2004 222025 | 8/2004 |
| JP | 2004 266670 | 9/2004 |
| JP | 2005-136599 | 5/2005 |
| JP | 2005 217874 | 8/2005 |
| JP | 2007 183588 | 7/2007 |
| WO | 2005 024723 | 3/2005 |
| WO | 2005 032125 | 4/2005 |

OTHER PUBLICATIONS

European Search Report issued Jun. 17, 2011, in Patent Application No. 08858027.9.
Michal Irani, et al., "Video Indexing Based on Mosaic Representations", Proceedings of the IEEE, vol. 86. No. 5, XP 11044016, May 1998, pp. 905-921.
U.S. Appl. No. 12/524,887, filed Jul. 29, 2009, Tsurumi.
U.S. Appl. No. 12/526,058, filed Aug. 6, 2009, Tsurumi.
U.S. Appl. No. 12/524,777, filed Jul. 28, 2009, Fukumoto, et al.
U.S. Appl. No. 12/524,734, filed Jul. 28, 2009, Tsurumi.
U.S. Appl. No. 12/524,757, filed Jul. 28, 2009, Tsurumi.
U.S. Appl. No. 13/486,209, filed Jun. 1, 2012, Tsurumi.
Japanese Office Action issued Oct. 2, 2012 in Patent Application No. 2007-317770 with English Translation.
U.S. Appl. No. 14/054,178, filed Oct. 15, 2013, Tsurumi.
Japanese Office Action dated Jan. 8, 2013, with English translation.

* cited by examiner

FIG.3
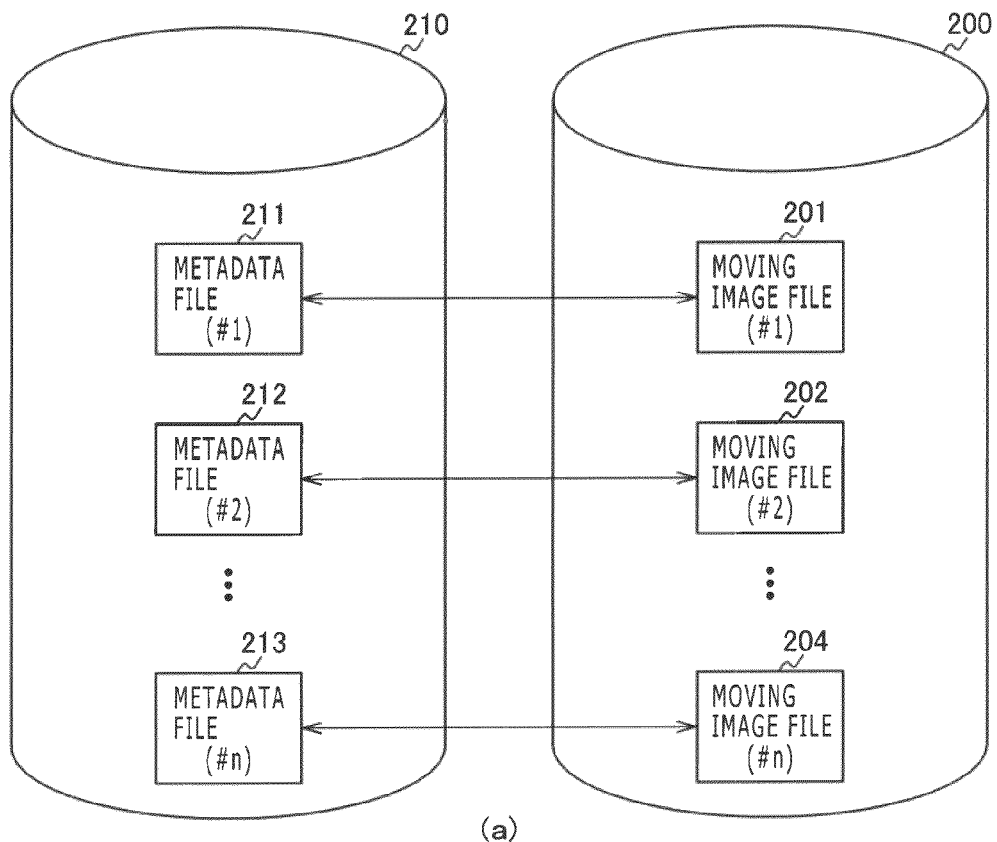
(a)
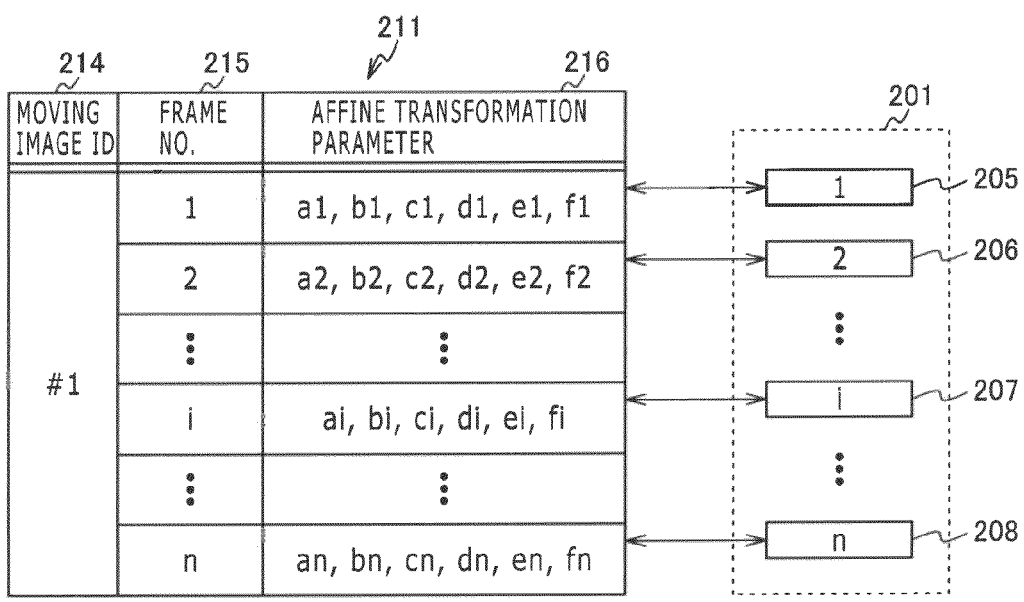
(b)

FIG.4

| MOVING IMAGE ID | FRAME NO. | POSITIONAL INFORMATION | INDEX IMAGE | AUDIO INFORMATION | MOVING IMAGE INFORMATION |
|---|---|---|---|---|---|
| #123 | 1 | (x11,y11)(x12,y12)(x13,y13)(x14,y14) | D1 | ... | ... |
| | 6 | (x61,y61)(x62,y62)(x63,y63)(x64,y64) | D6 | ... | ... |
| | 17 | (x71,y71)(x72,y72)(x73,y73)(x74,y74) | D7 | ... | ... |
| | ⋮ | ⋮ | ⋮ | ⋮ | ⋮ |
| #124 | ⋮ | ⋮ | ⋮ | ⋮ | ⋮ |
| #125 | ⋮ | ⋮ | ⋮ | ⋮ | ⋮ |
| ⋮ | ⋮ | ⋮ | ⋮ | ⋮ | ⋮ |

FIG.5

| MOVING IMAGE ID | PANORAMA IMAGE |
|---|---|
| #123 | PANORAMA IMAGE |
| #124 | PANORAMA IMAGE |
| #125 | PANORAMA IMAGE |
| ⋮ | ⋮ |

FIG. 9
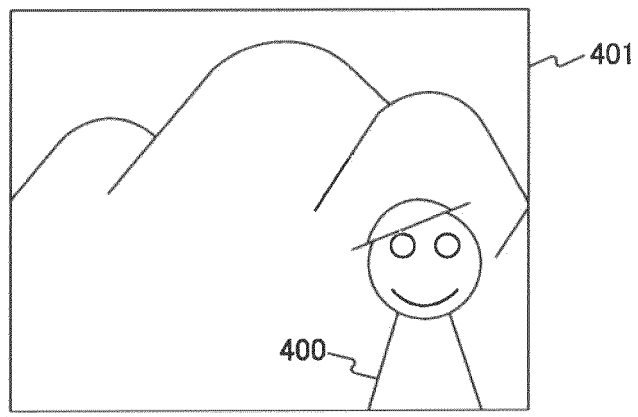
(a)
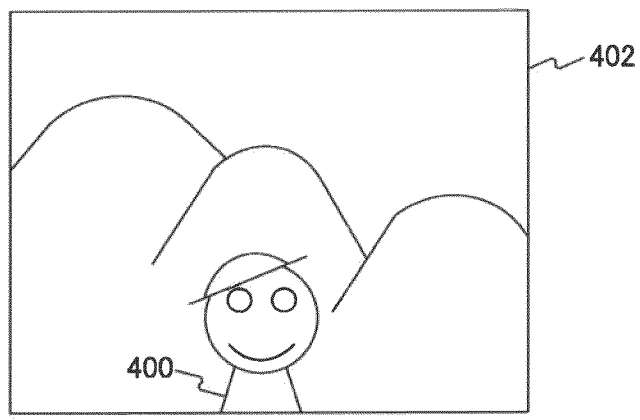
(b)
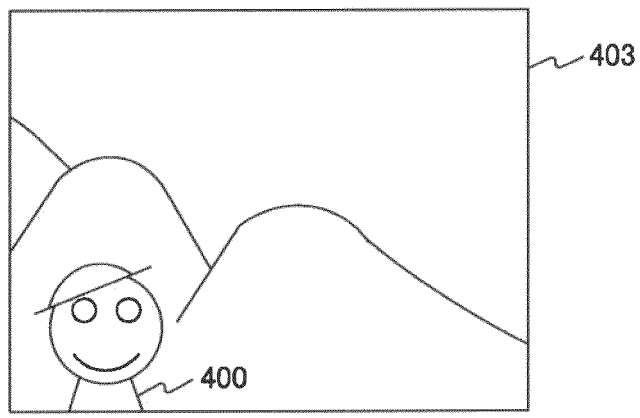
(c)

FIG.12
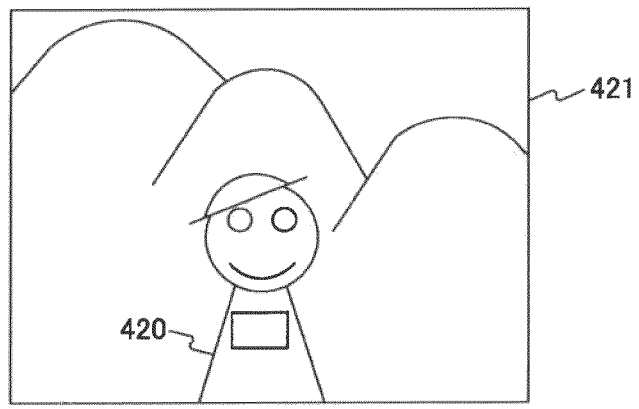
(a)
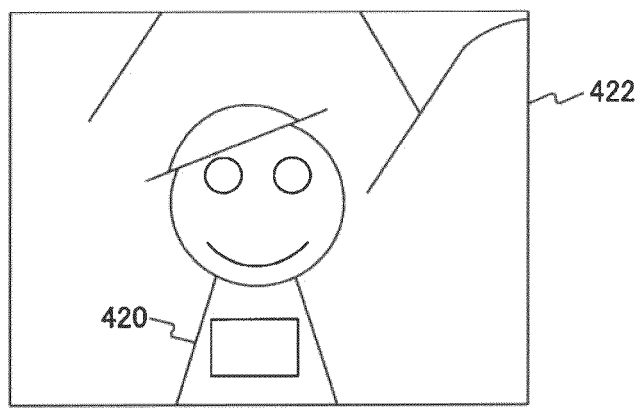
(b)
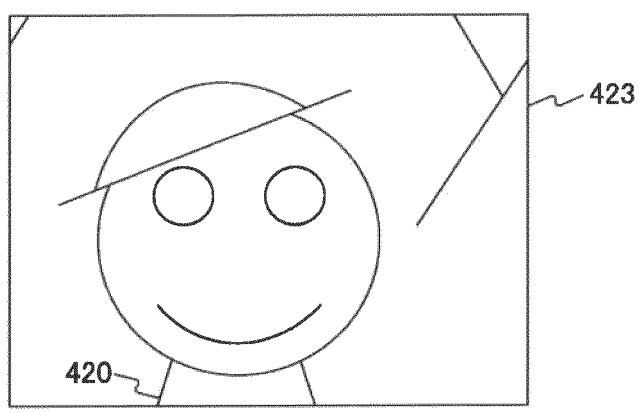
(c)

FIG.13
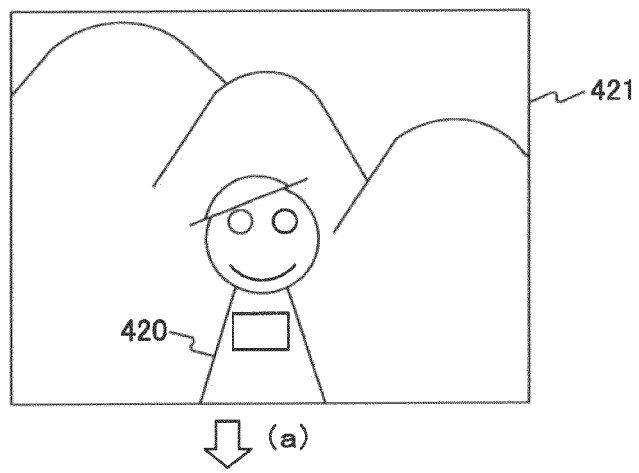
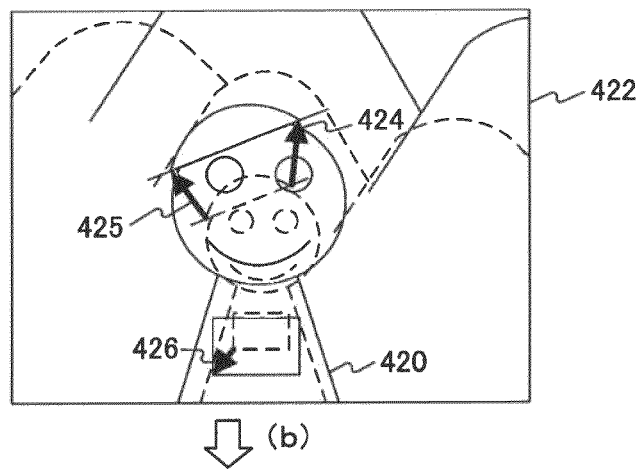
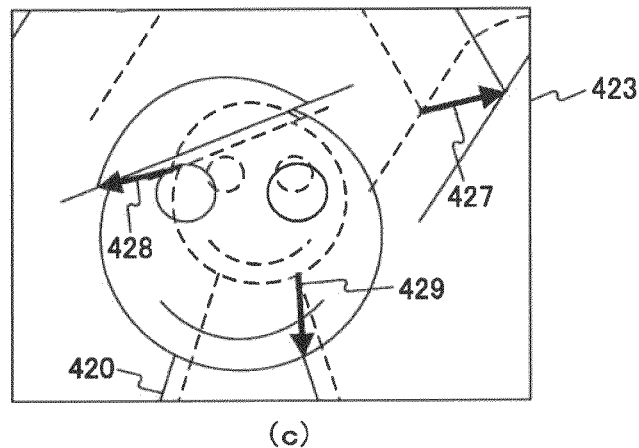

FIG.15
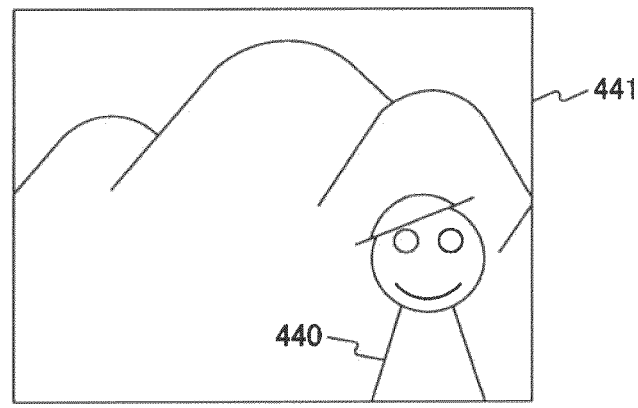
(a)
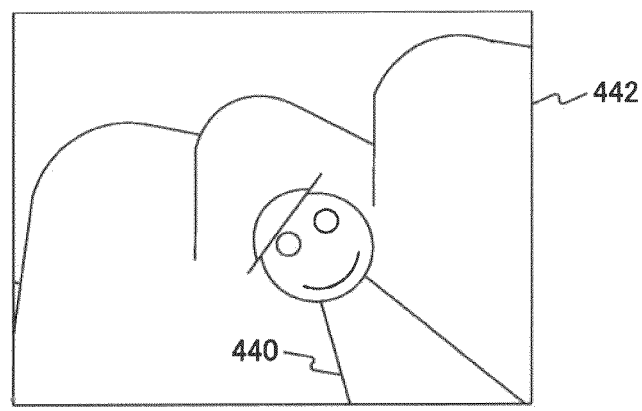
(b)
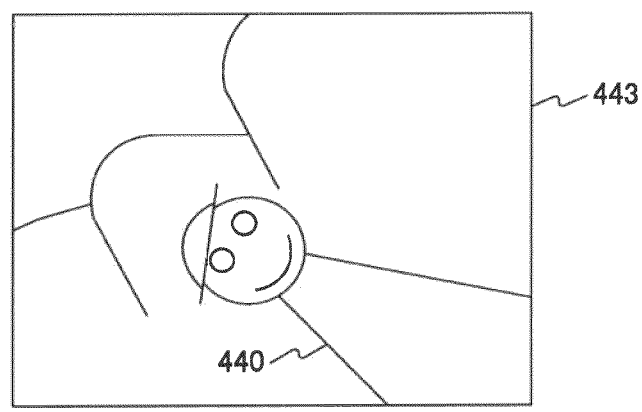
(c)

FIG. 16
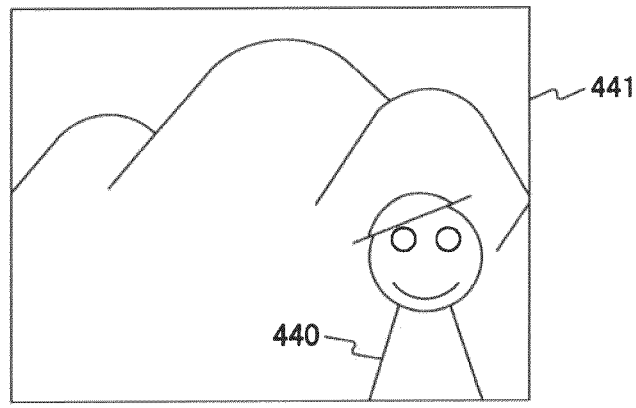
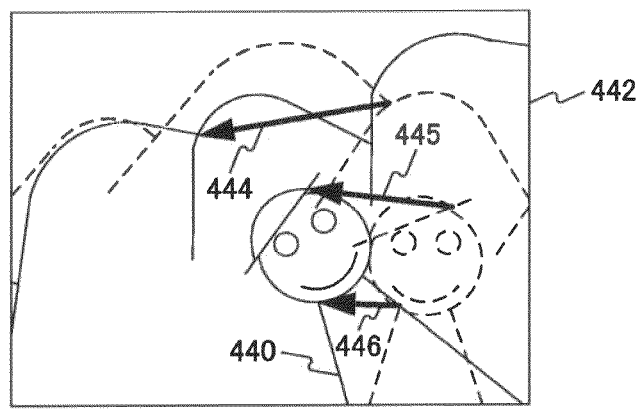
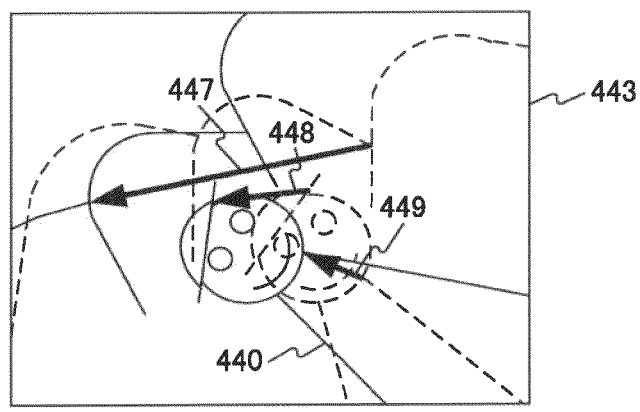

FIG.18
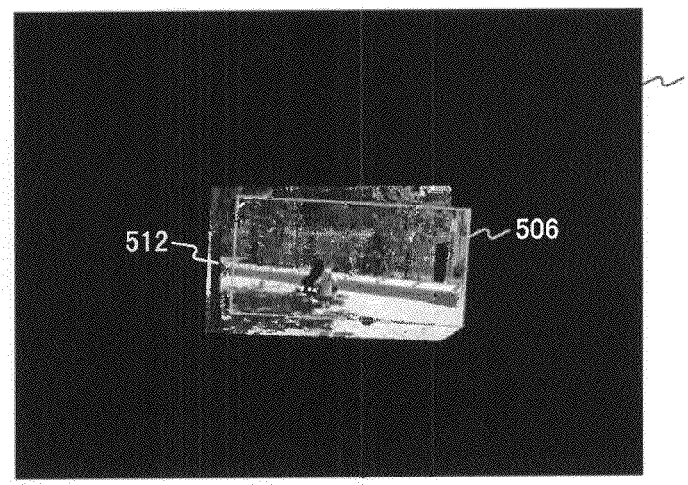
⇩ (a)
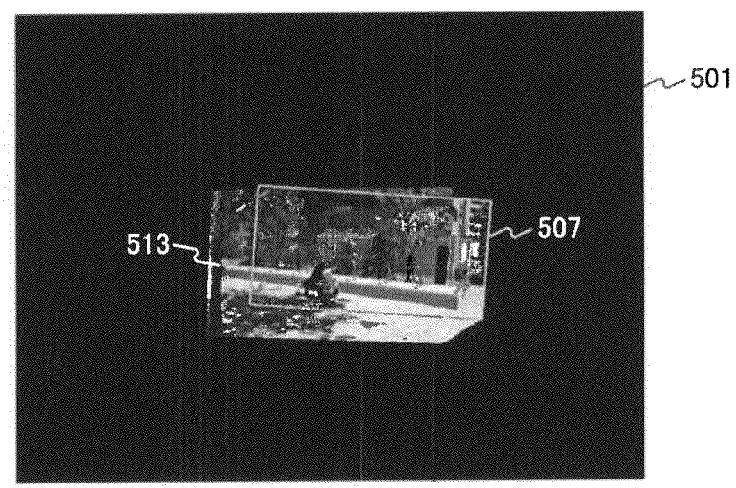
⇩ (b)
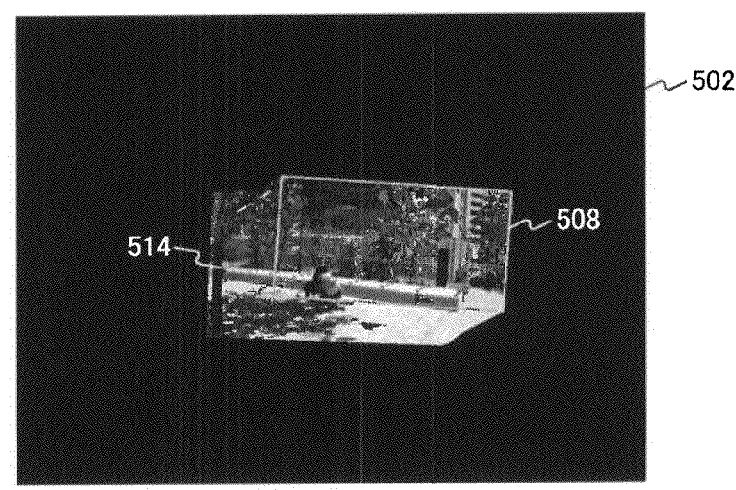
⇩ (c)

FIG.19
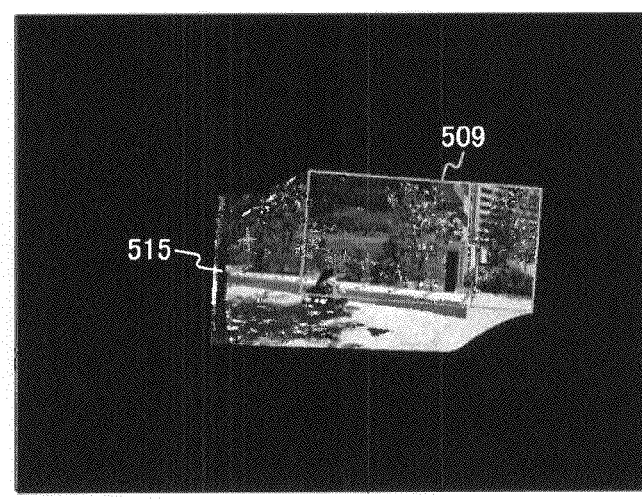
(a)
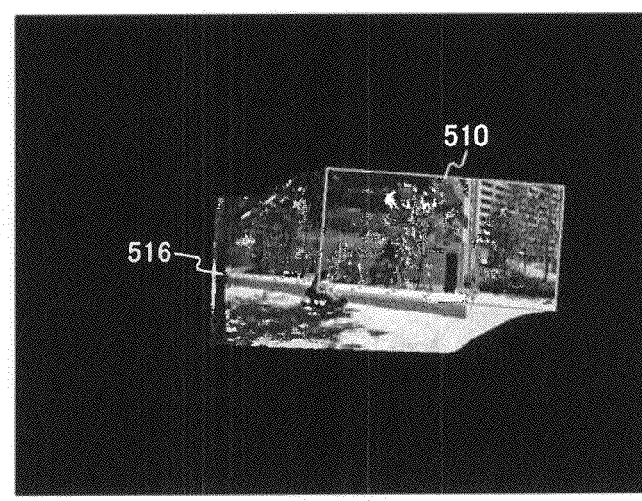
(b)
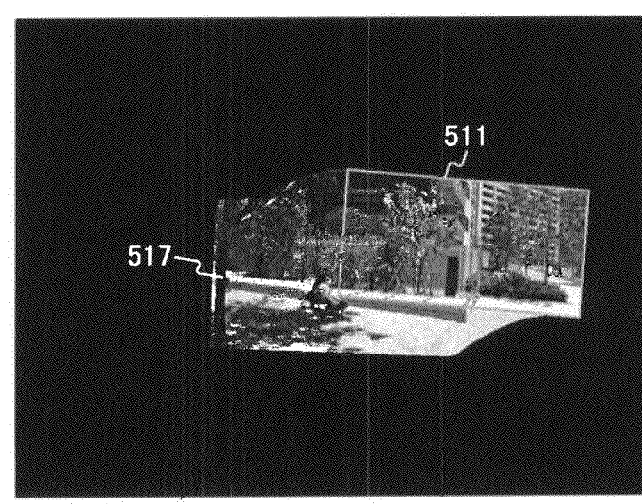
(c)

FIG.20
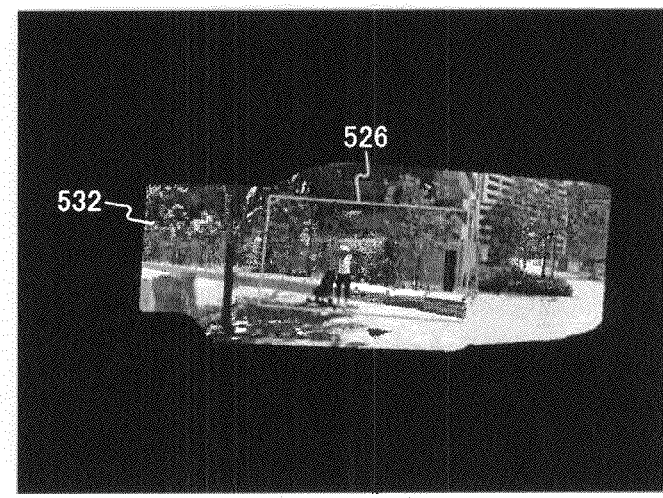
(a)
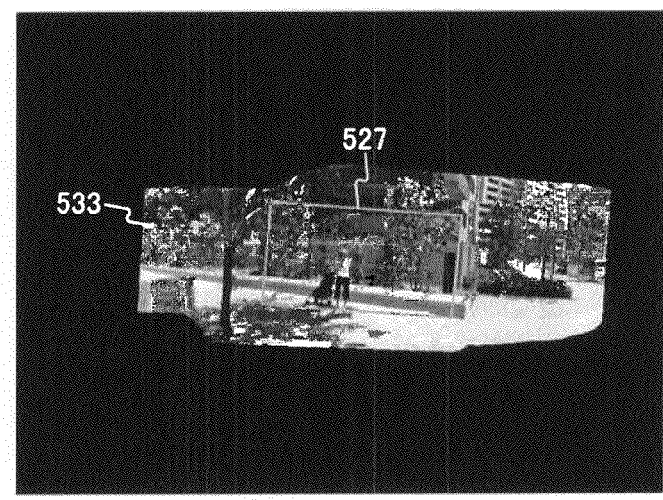
(b)
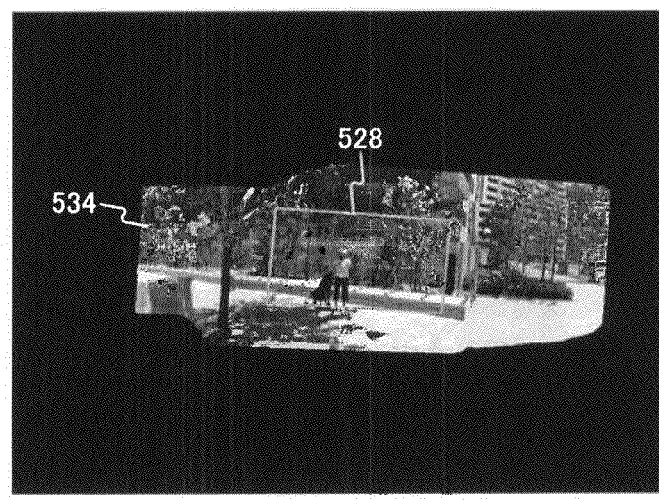
(c)

FIG.21
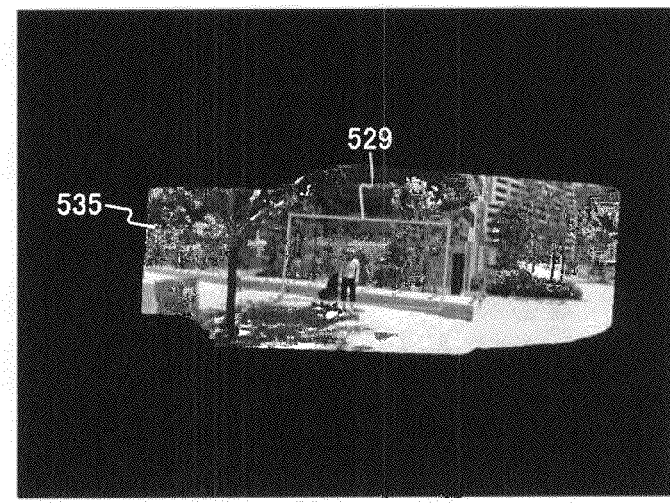
(a)
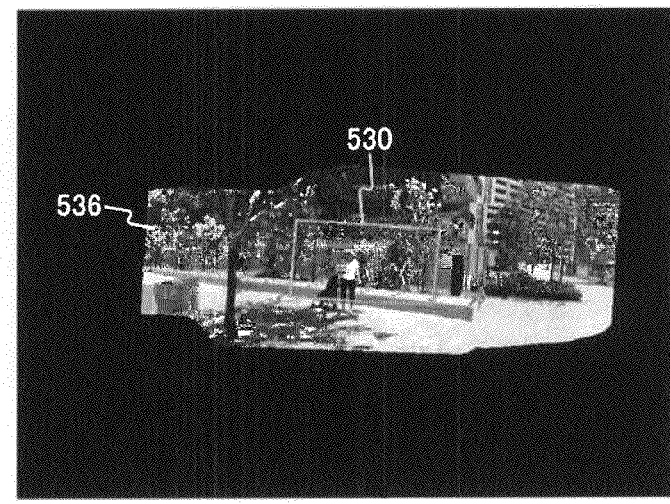
(b)
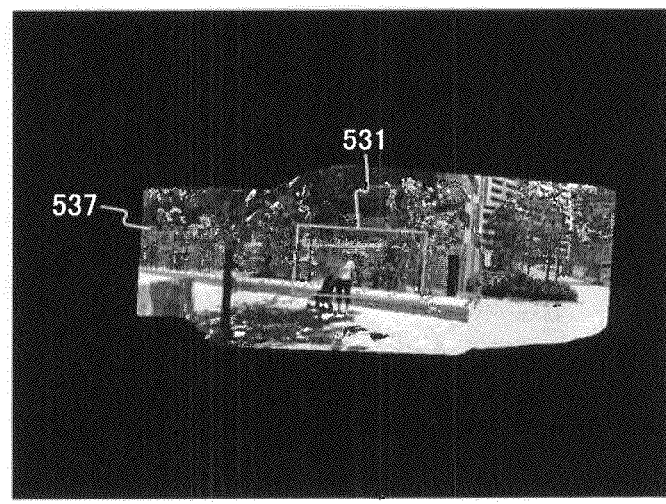
(c)

FIG.23
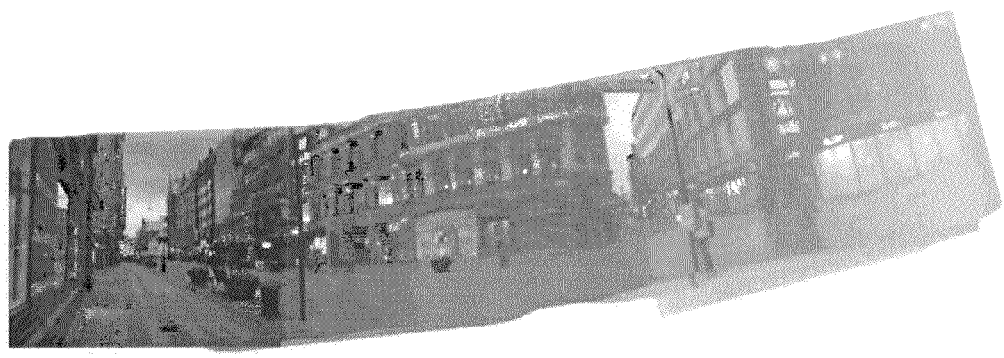
(a)
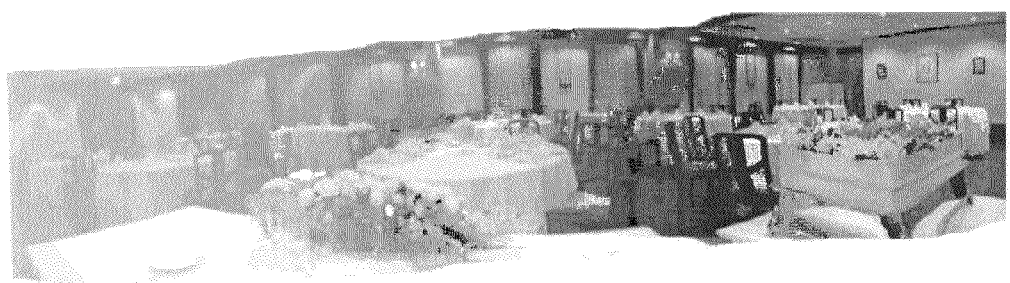
(b)

FIG.26
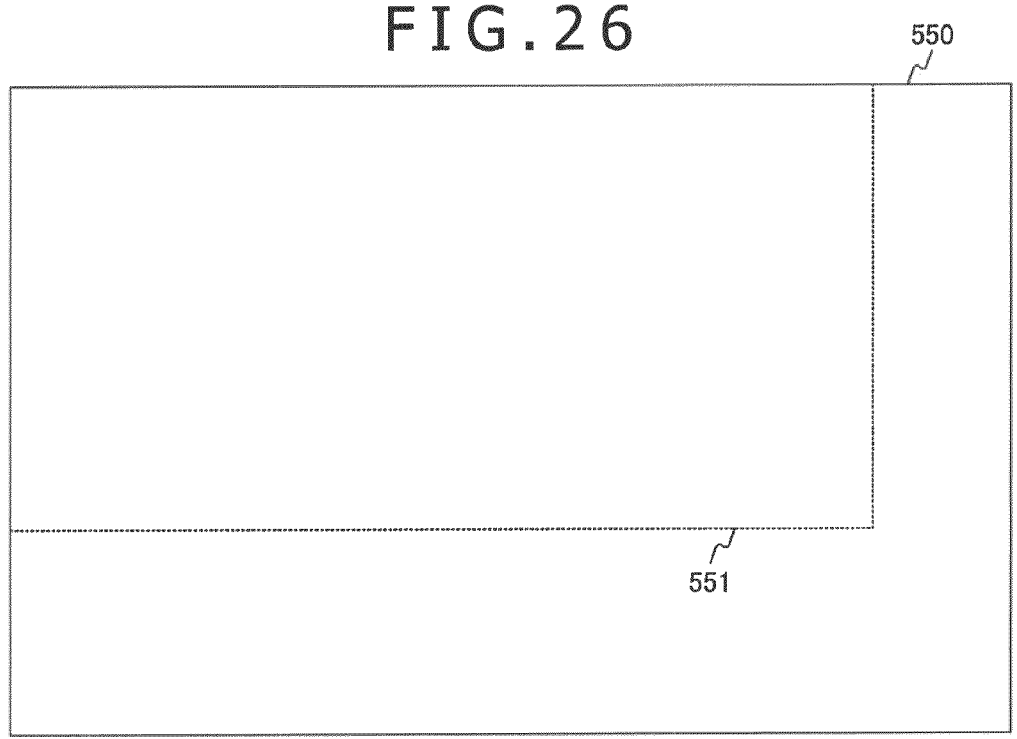
(a)
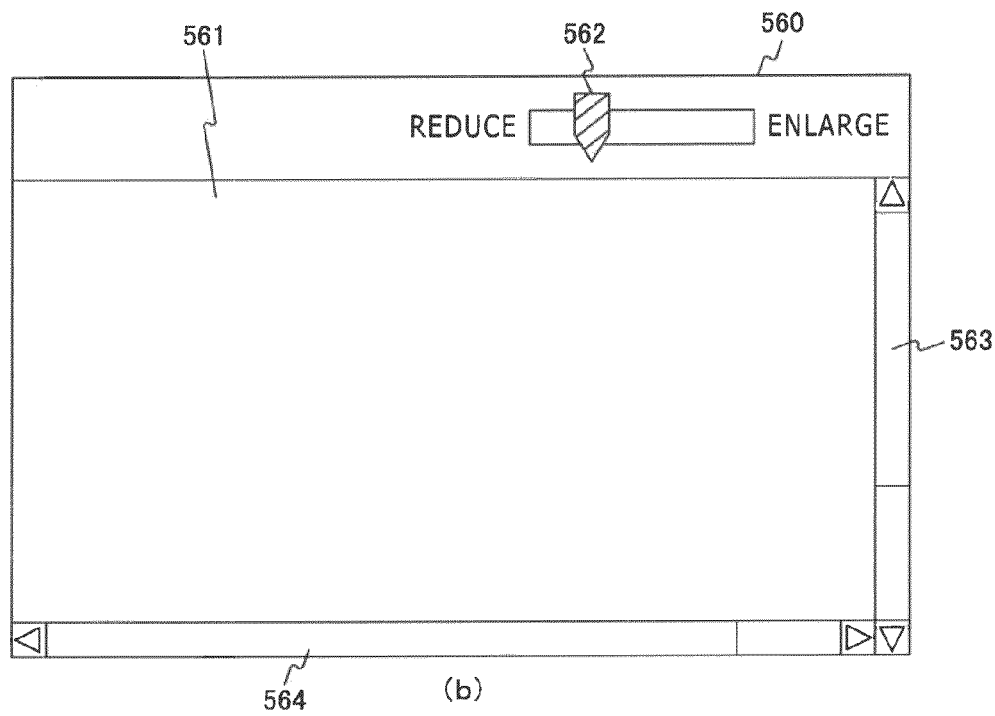
(b)

FIG.29
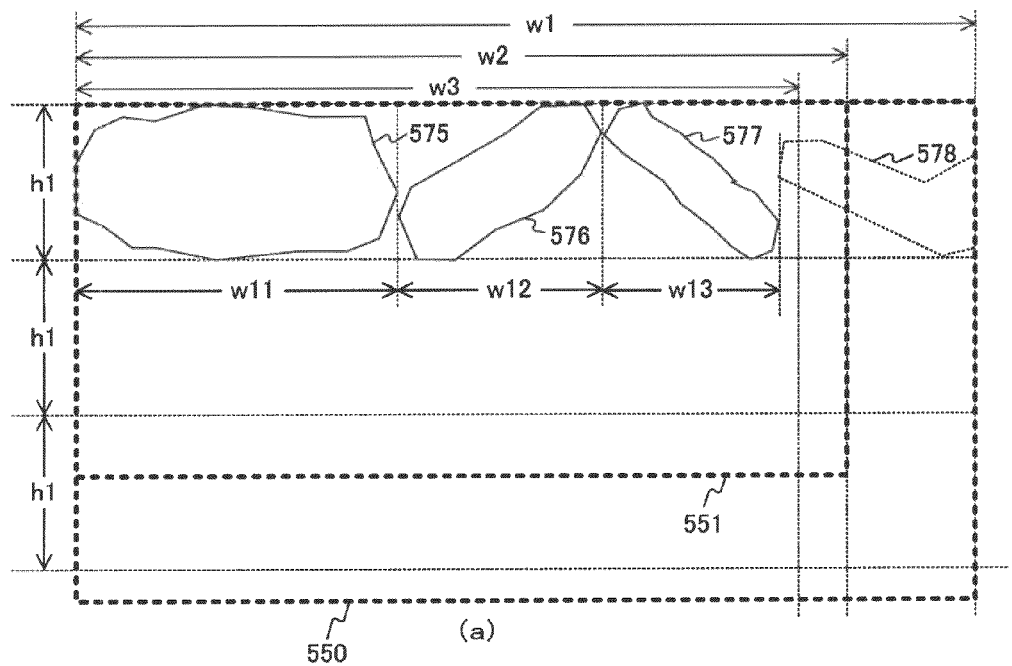
(a)
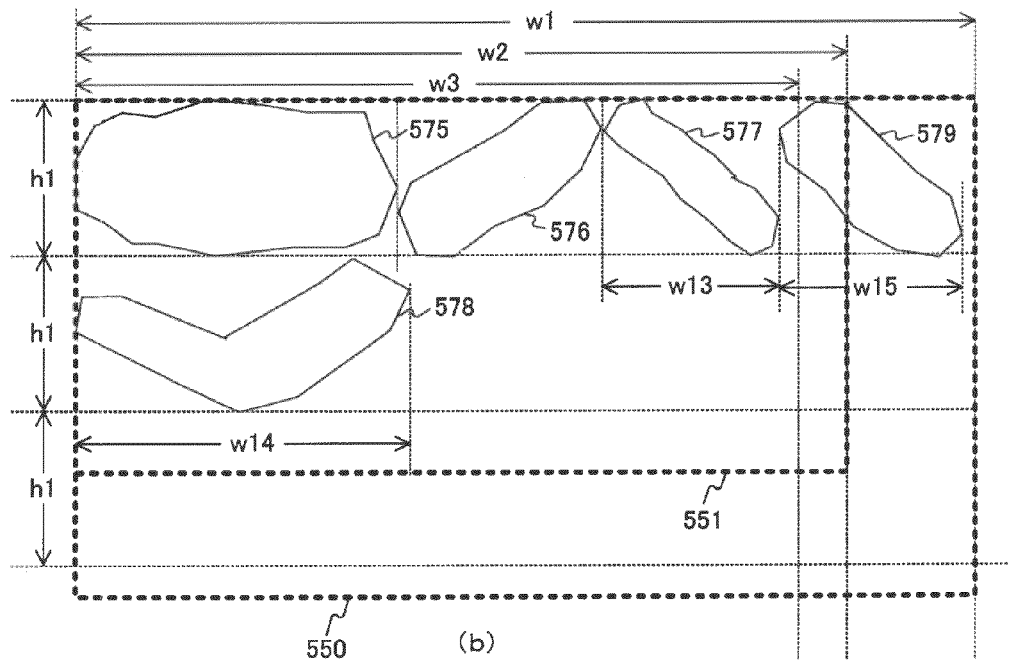
(b)

FIG.30
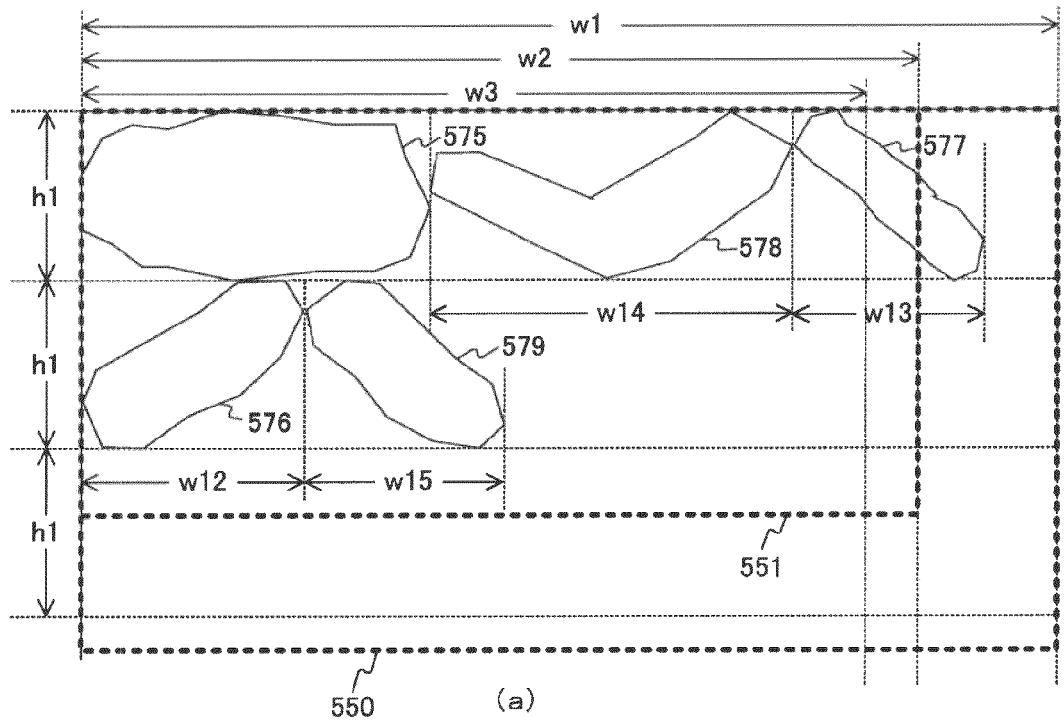
(a)
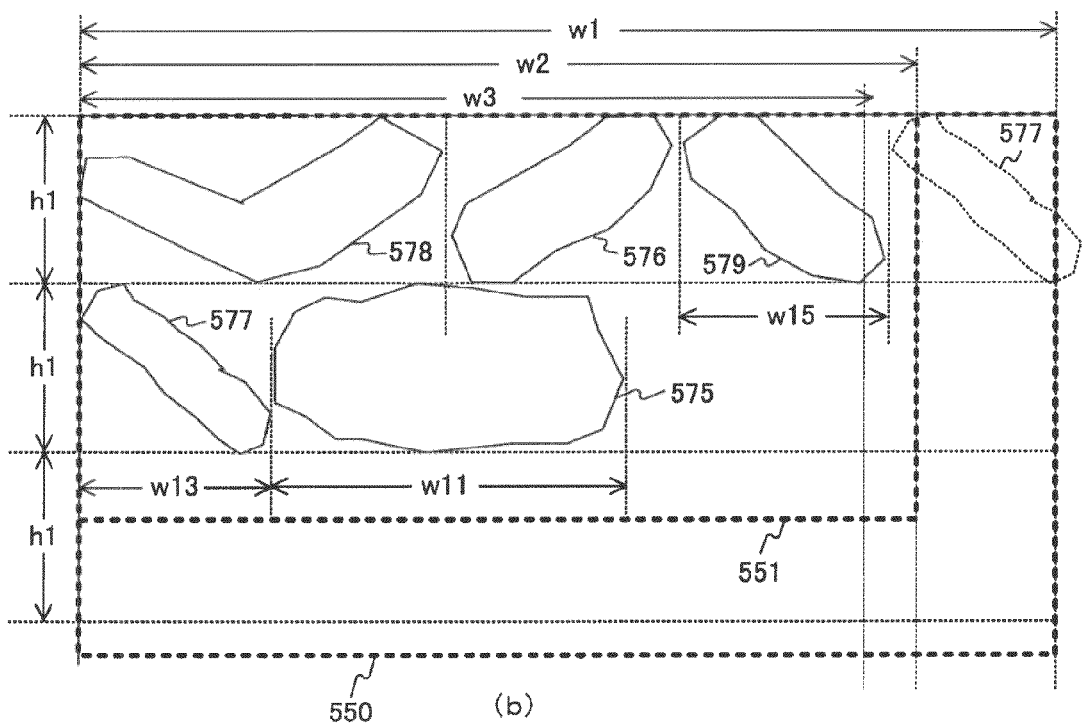
(b)

FIG.32
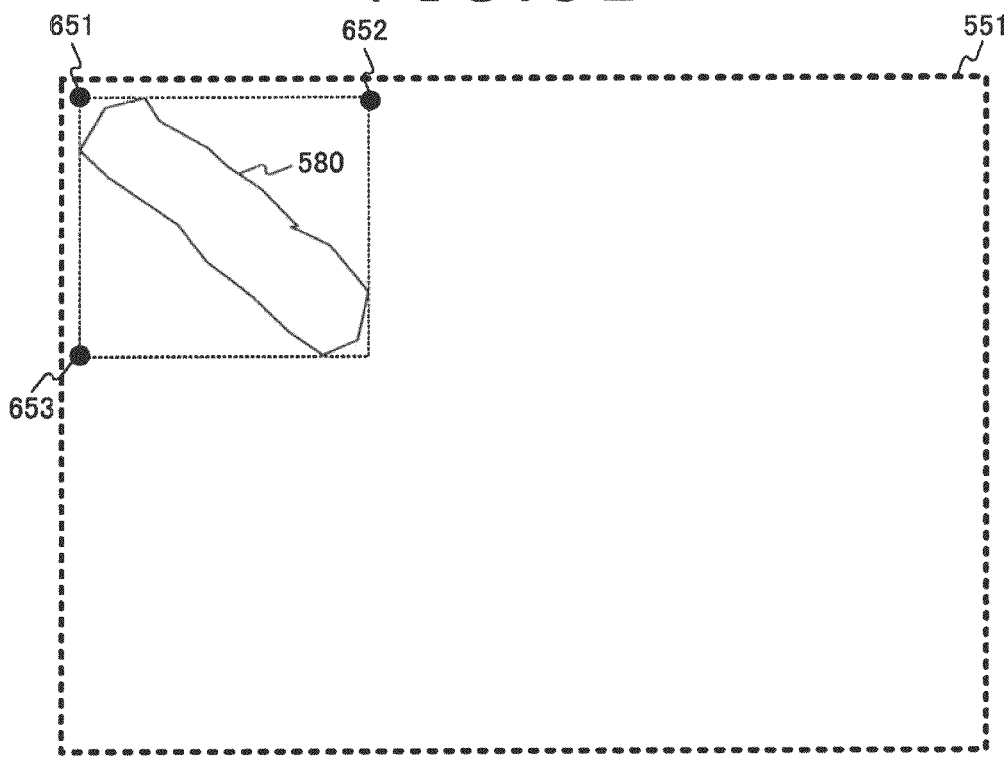
(a)
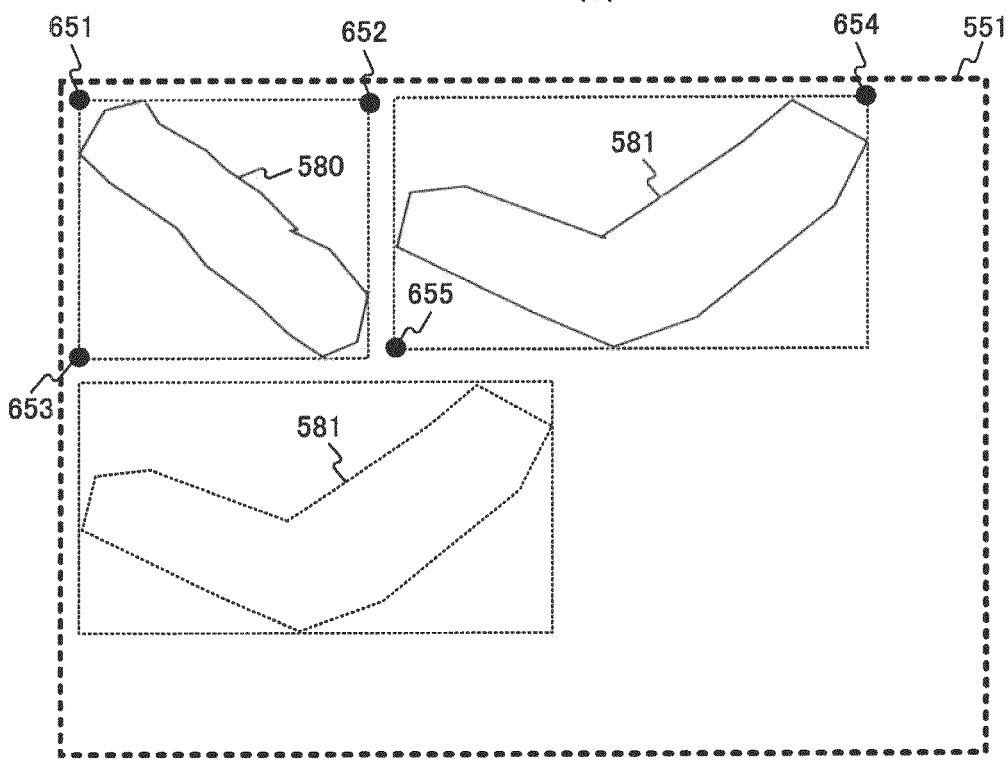
(b)

FIG. 34
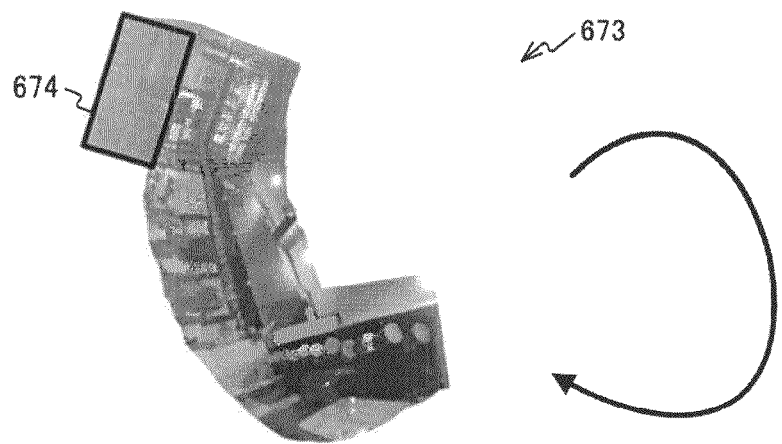
(a)
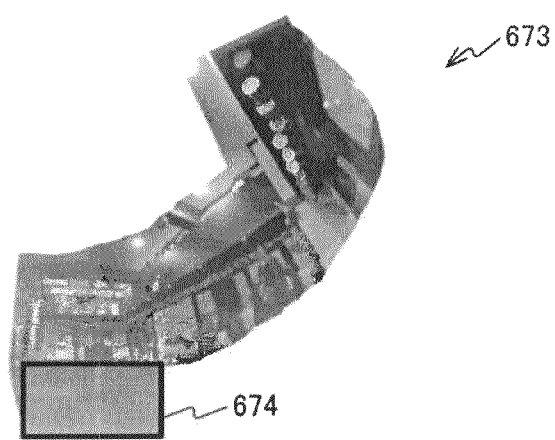
(b)

FIG. 35
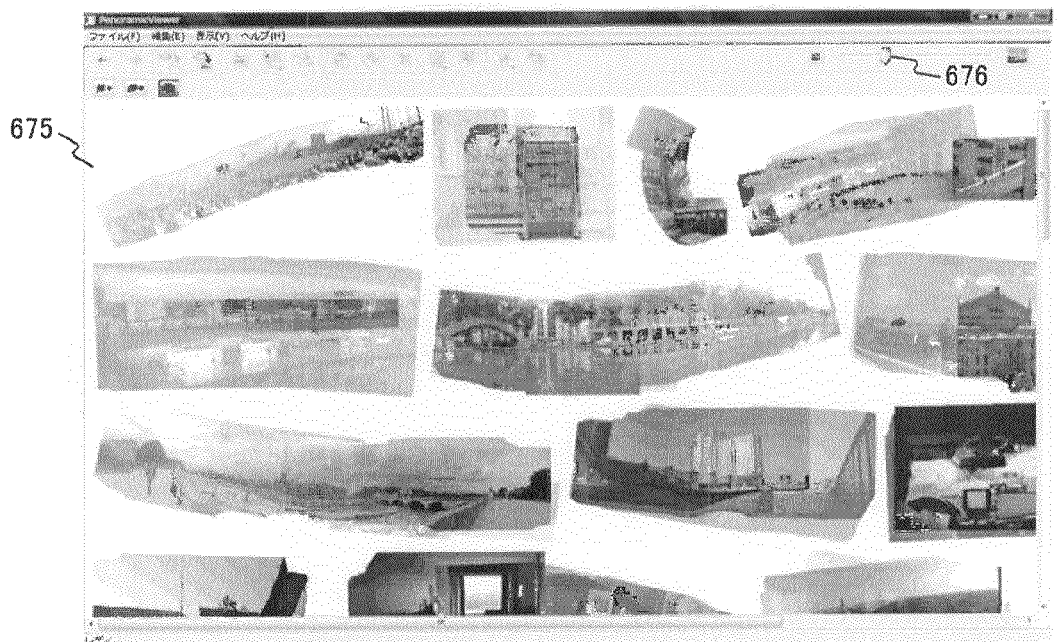
(a)
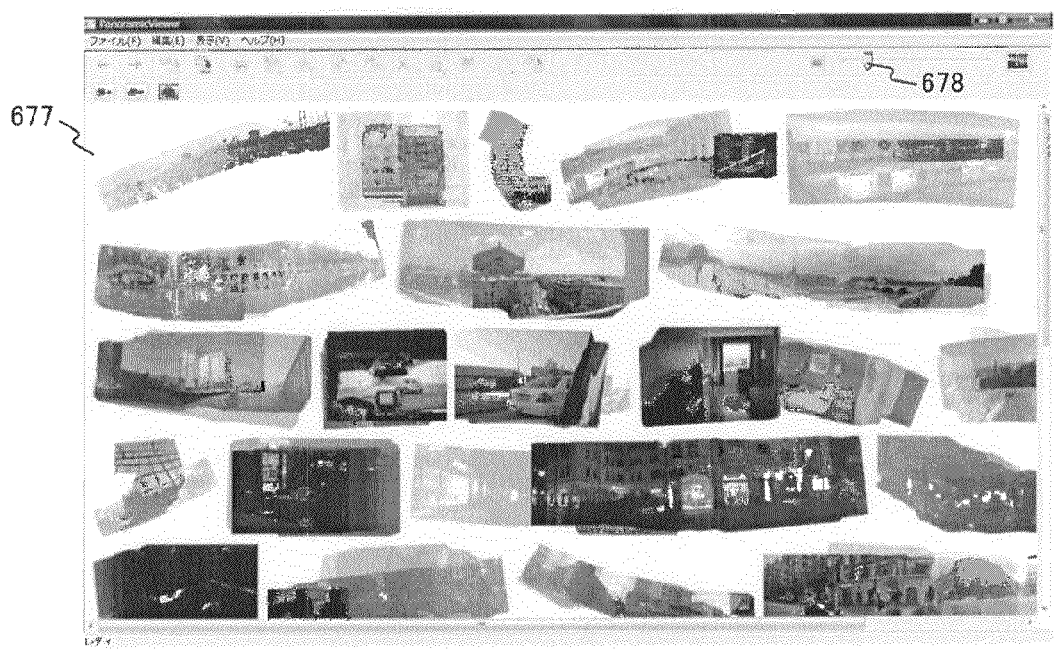
(b)

FIG.36
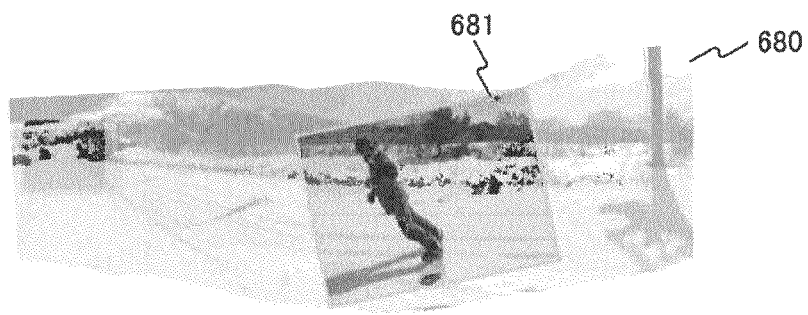
(a)
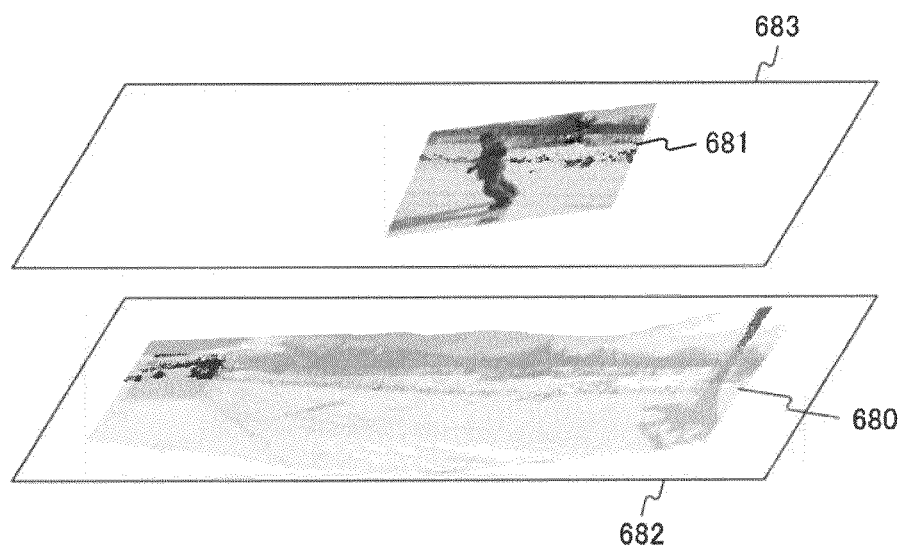
(b)

FIG.38
(a)
(b)
(c)

FIG.39
(a)
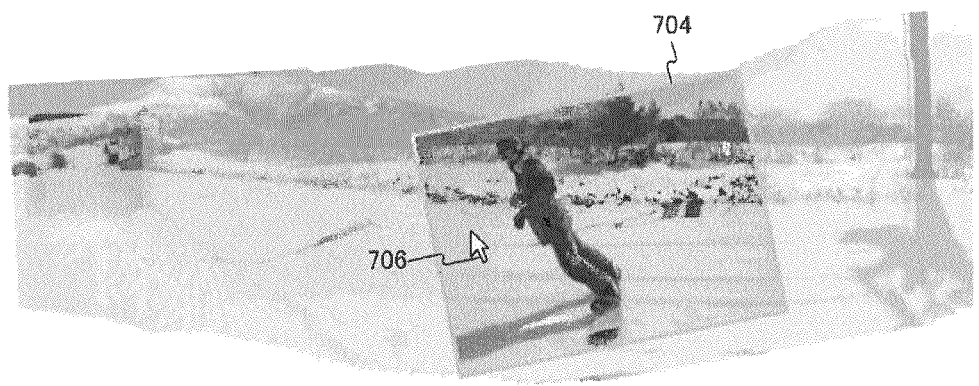
(b)
(c)

FIG.40
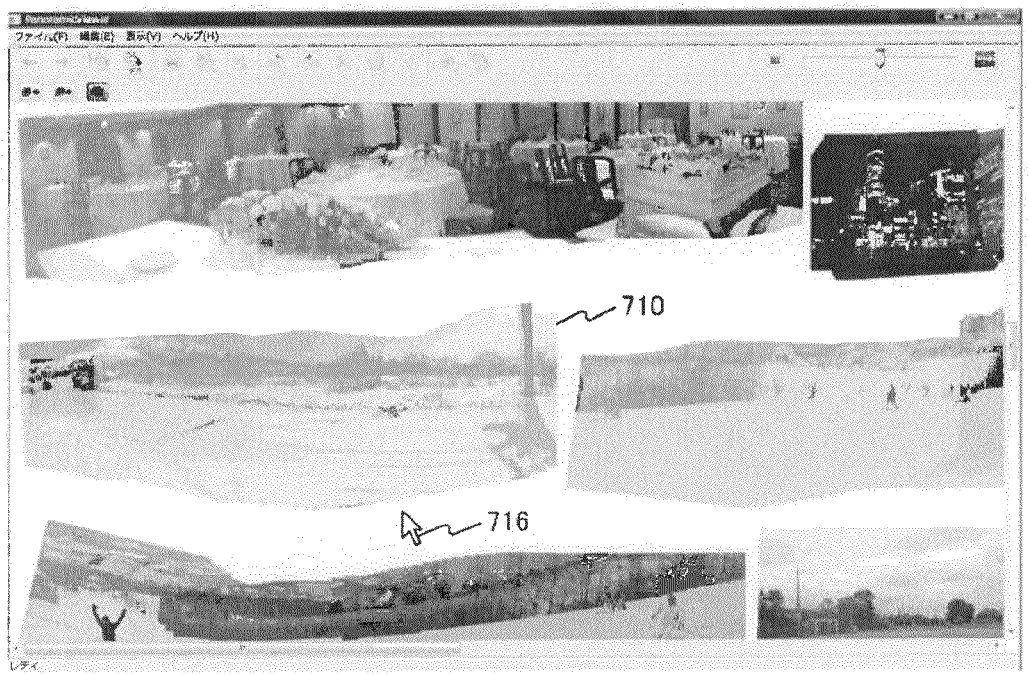
(a)
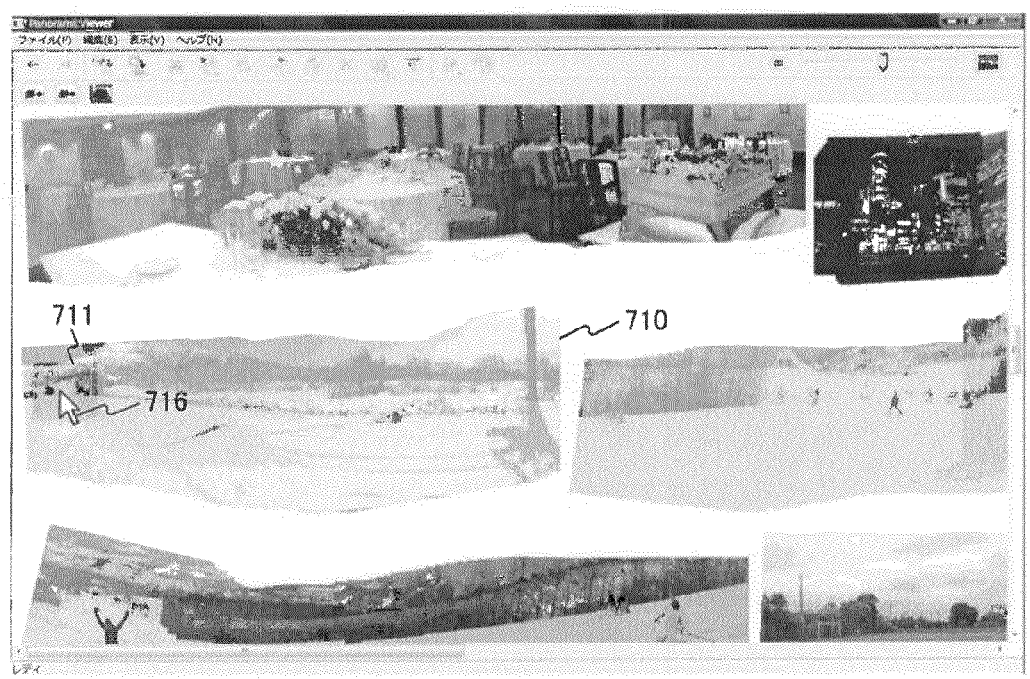
(b)

FIG. 41
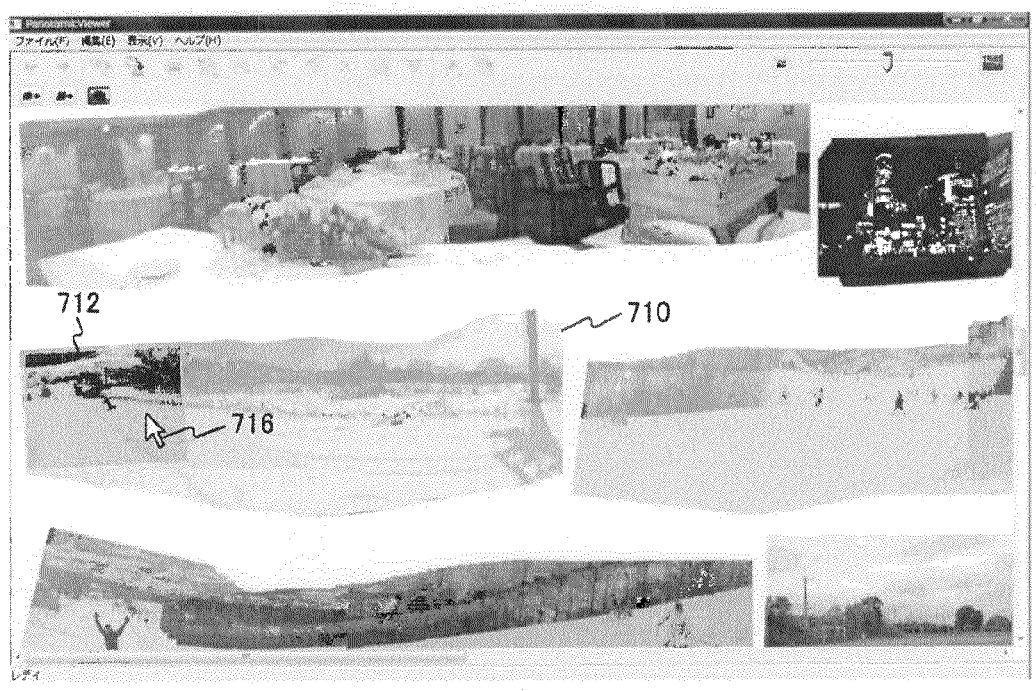
(a)
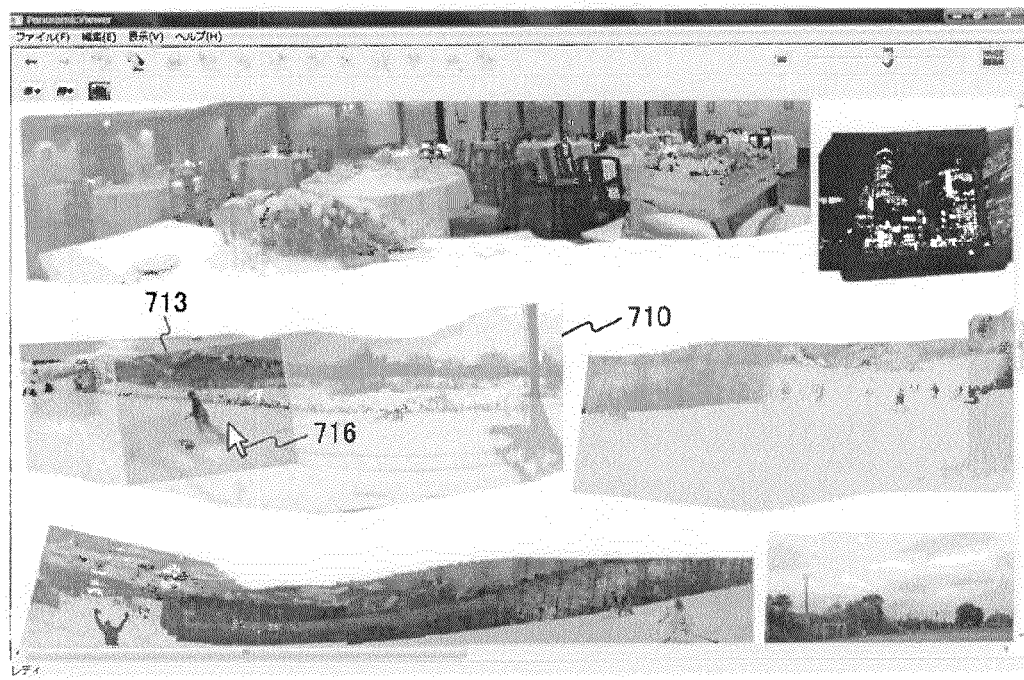
(b)

FIG.42
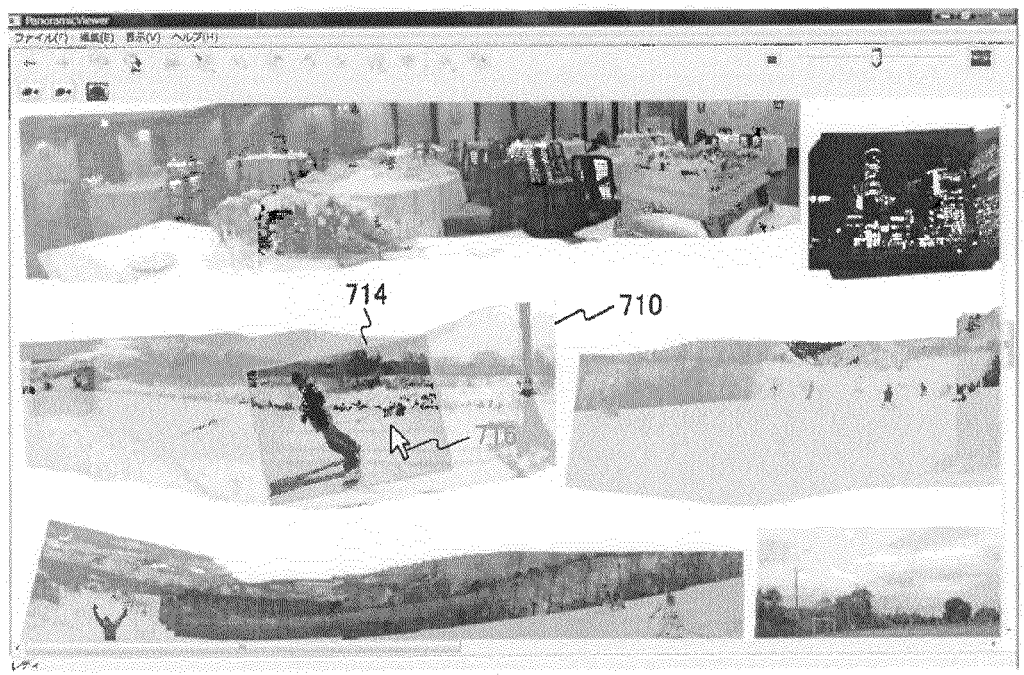
(a)
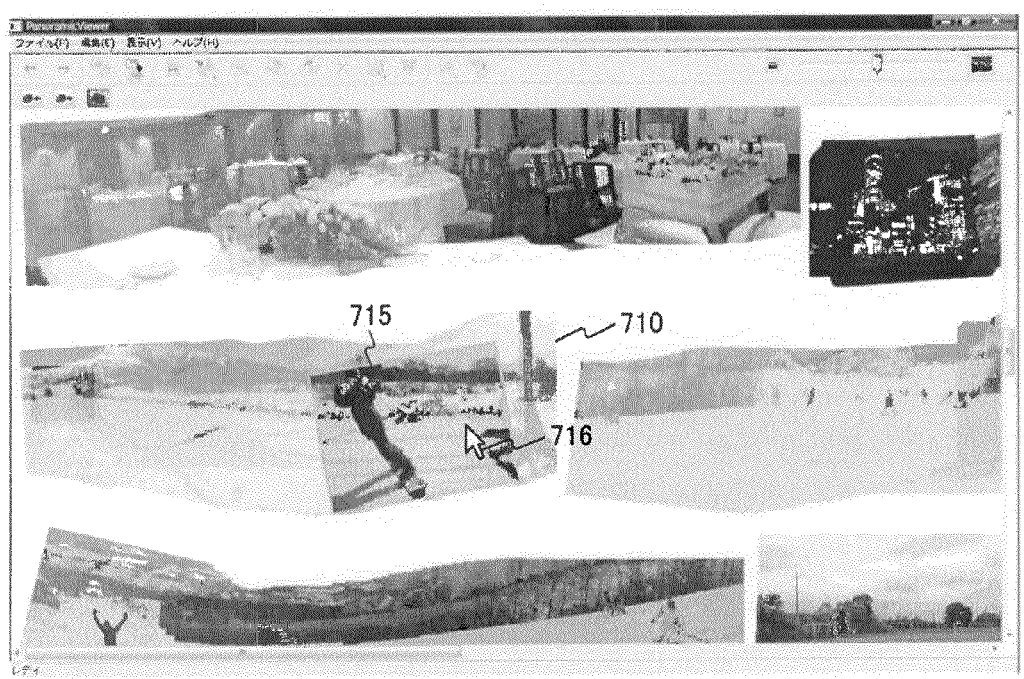
(b)

FIG. 45
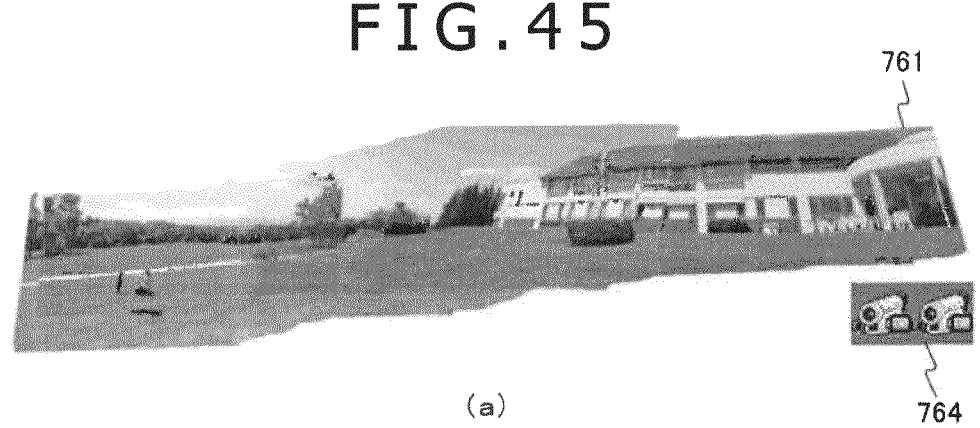
(a)
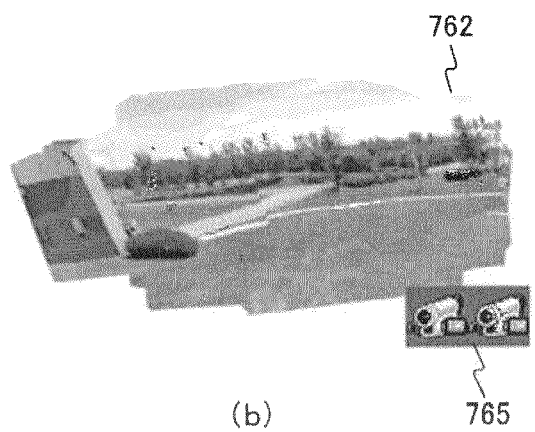
(b)
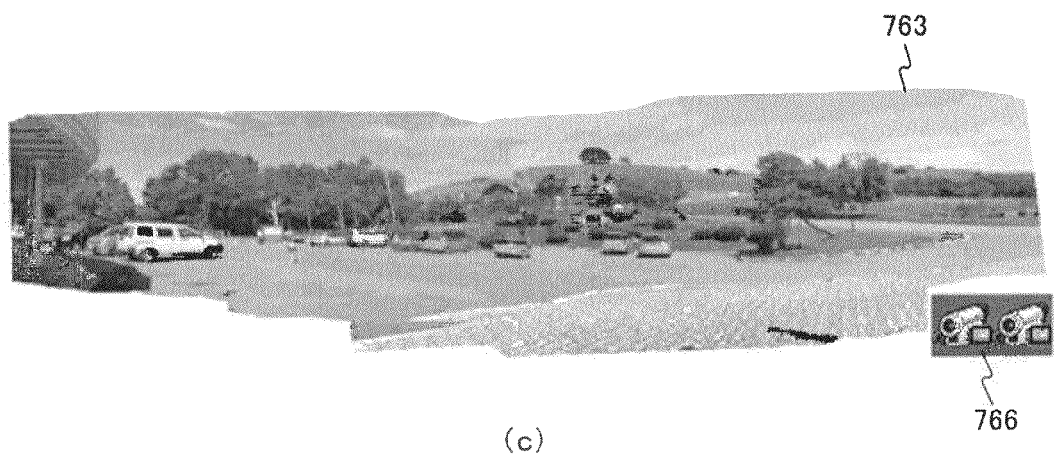
(c)

⇩ SIMD COMPUTATION 827 828 829

| A1 | | B1 | | C1 |
| A2 | + | B2 | = | C2 |
| A3 | | B3 | | C3 |
| A4 | | B4 | | C4 |

(b)

FIG.58
| 0 | 1 | 2 | 3 | 4 | 5 | 6 | ... | 30 | 31 |
|---|---|---|---|---|---|---|---|---|---|
| 32 | 33 | 34 | 35 | 36 | 37 | 38 | ... | 62 | 63 |
| 64 | 65 | 66 | 67 | 68 | 69 | 70 | ... | 94 | 95 |
| 96 | 97 | 98 | 99 | 100 | 101 | 102 | ... | 126 | 127 |
| 128 | 129 | 130 | 131 | 132 | 133 | 134 | ... | 158 | 159 |
| 160 | 161 | 162 | 163 | 164 | 165 | 166 | ... | 190 | 191 |
| ... | | | | | | | | | |
|  | | | | | | | | | |
781
| -1 | 0 | 1 |
|---|---|---|
| -2 | 0 | 2 |
| -1 | 0 | 1 |
830
OUTPUT OF RESULT

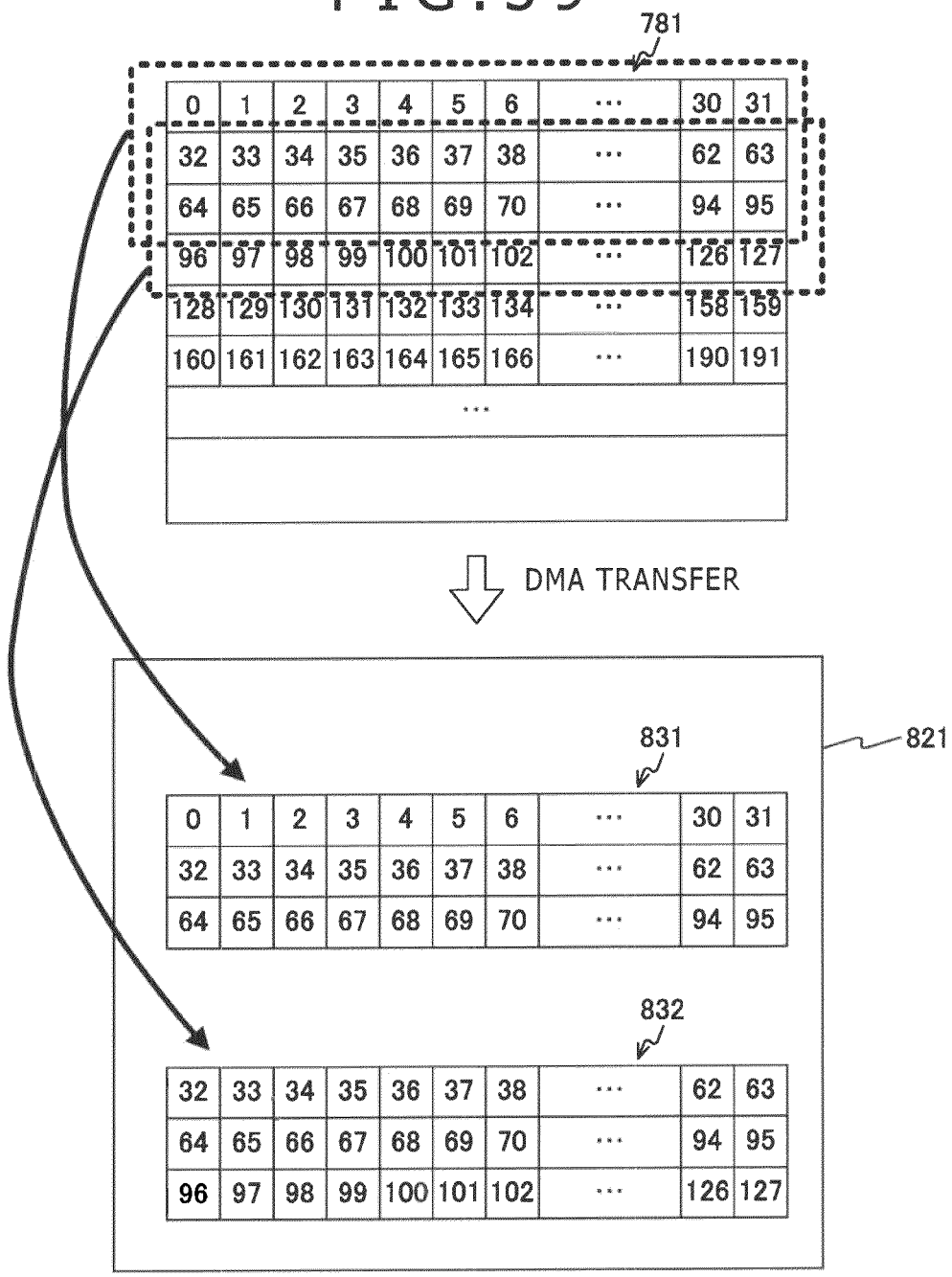

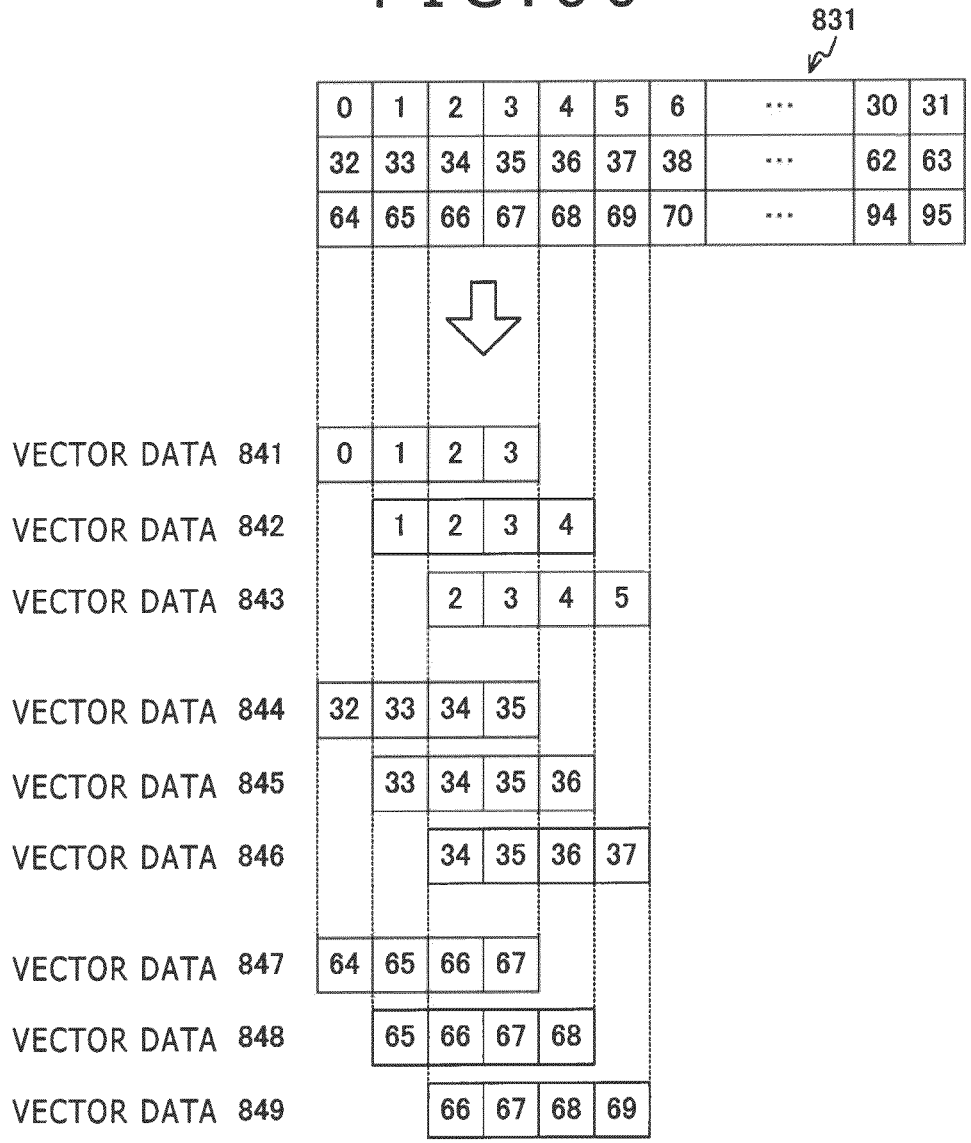

FIG.61

$$\text{VECTOR A} = \left( -1 \times \begin{array}{|c|} \hline 0 \\ \hline 1 \\ \hline 2 \\ \hline 3 \\ \hline \end{array} \begin{array}{c} 841 \end{array} + 0 \times \begin{array}{|c|} \hline 1 \\ \hline 2 \\ \hline 3 \\ \hline 4 \\ \hline \end{array} \begin{array}{c} 842 \end{array} + 1 \times \begin{array}{|c|} \hline 2 \\ \hline 3 \\ \hline 4 \\ \hline 5 \\ \hline \end{array} \begin{array}{c} 843 \end{array} \right)$$

$$\text{VECTOR B} = \left( -2 \times \begin{array}{|c|} \hline 32 \\ \hline 33 \\ \hline 34 \\ \hline 35 \\ \hline \end{array} \begin{array}{c} 844 \end{array} + 0 \times \begin{array}{|c|} \hline 33 \\ \hline 34 \\ \hline 35 \\ \hline 36 \\ \hline \end{array} \begin{array}{c} 845 \end{array} + 2 \times \begin{array}{|c|} \hline 34 \\ \hline 35 \\ \hline 36 \\ \hline 37 \\ \hline \end{array} \begin{array}{c} 846 \end{array} \right)$$

$$\text{VECTOR C} = \left( -1 \times \begin{array}{|c|} \hline 64 \\ \hline 65 \\ \hline 66 \\ \hline 67 \\ \hline \end{array} \begin{array}{c} 847 \end{array} + 0 \times \begin{array}{|c|} \hline 65 \\ \hline 66 \\ \hline 67 \\ \hline 68 \\ \hline \end{array} \begin{array}{c} 848 \end{array} + 1 \times \begin{array}{|c|} \hline 66 \\ \hline 67 \\ \hline 68 \\ \hline 69 \\ \hline \end{array} \begin{array}{c} 849 \end{array} \right)$$

VECTOR D = ( VECTOR A + VECTOR B ) + VECTOR C

IMAGE PROCESSING APPARATUS, MOVING IMAGE REPRODUCING APPARATUS, AND PROCESSING METHOD AND PROGRAM THEREFOR

TECHNICAL FIELD

The present invention relates to an image processing apparatus and, more particularly, to an image processing apparatus, a moving image reproducing apparatus, and a processing method therein and a program for making a computer execute this processing method.

BACKGROUND ART

Recently, digital video cameras have been gaining popularity. Therefore, for example, taking of events of kindergartens with digital video cameras by parents for example is now common scene. If video taking is done by parents for example in such events, the parent often take their children mostly and, at the same time, in order to describe the events in detail, often take the scenes themselves of such events appropriately. Also, taking video for each kindergarten event, for example, a lot of taken moving images accumulated.

The moving images thus taken may be reproduced by use of a moving image reproducing apparatus at home, for example. However, in reproducing all moving images taken in two or more events, reproducing all moving images from the beginning takes time, for example. Therefore, it may be considered that the reproduction of moving images may be efficiently enjoyed if an audience searches all the moving images for desired parts and sequentially reproduce the obtained parts.

So, a technology has been proposed in which a thumbnail image is generated for each portion of a moving image and this generated thumbnail image is used to reproduce the moving image from a desired recording position. For example, a reproducing apparatus was proposed in which, from two or more moving scenes recorded to a recording media, two or more thumbnail images indicative of these scenes are formed, a desired thumbnail image is selected from the displayed thumbnail images, and the reproduction of the moving image is started from the beginning of the scene corresponding to the selected thumbnail image (for example, refer to Japanese Patent Laid-open No. Hei 11-289517 (FIG. 7).

According to the above-mentioned conventional technology, in viewing moving images taken in two or more events in a kindergarten or the like, the reproduction of the moving image can be started from the beginning of a desired scene by use of the thumbnail images displayed for these moving images.

Here, for example, in order to view moving images taken with own child focused in two or more events of the kindergarten, it is possible that similar scenes in which own child is included are often reproduced even if scenes are different. In this case, the thumbnail images to be generated are also often similar with each other. In addition, if the number of taken moving images is large, the number of thumbnail images to be generated becomes large. Thus, in the case where thumbnail images similar to each other are displayed or many thumbnail images are displayed, it is possible that proper search cannot be quickly done.

For example, even if a person focused in image taking is the same, it can sometimes be determined whether a moving image is the subject of search on the basis of a location or an atmosphere in which the moving image was taken. So, for example, in viewing moving images taken in two or more events of a kindergarten or the like, if the location or the atmosphere in which these events took place can easily be referenced, the contents of the moving images can be easily recognized, thereby possibly allowing the quick search for desired moving images.

Therefore, it is an object of the present invention to allow easy understanding of the contents of moving images taken with an image taking apparatus.

DISCLOSURE OF INVENTION

In carrying out the invention and according to a first aspect thereof, there are provided an image processing apparatus, a processing method thereof, and a program for making a computer execute this method, including: moving image storage means for storing a taken moving image taken by an image taking apparatus; conversion information storage means for storing, as related with each taken image, conversion information for converting another taken image with reference to at least one taken image of taken images configuring the taken moving image; image holding means for holding a log image; image conversion means for converting a taken image related with the conversion information on the basis of the conversion information; image synthesis means for synthesizing the converted taken image with the log image to hold a resultant new log image in the image holding means; index image extraction means for extracting a new index image from among the converted taken images obtained by converting at least one of the converted taken images on the basis of a coordinate position and a size of the index image in an image taking space defined by the conversion information as an index image of the taken moving image; display control means for displaying the log image as a representative image indicative of the taken moving image; operation acceptance means for accepting a selection operation for selecting a position on the selected representative image; and selection means for selecting the extracted index image on the basis of a position on the selected representative image; wherein the display control means displays the selected index image along with the representative image. Consequently, a function is provided that a taken image is converted on the basis of conversion information, this converted taken image is synthesized with a log image to hold a resultant new log image, at least one of converted taken images is selected as an index image of a taken moving image, a new index image is extracted on the basis of the coordinate position and size of an index image in an image taking space, and, when a position in a displayed representative image is selected, an index image is selected on the basis of the selected position in the representative image, and this selected index image is displayed along with the representative image.

Also, in this first aspect, index information storage means may further be included for storing the extracted index image and a coordinate position and a size of the index image as related with each other. This provides a function that an extracted index image and the coordinate position and size of this index image are stored as related with each other.

Also, in this first aspect, on the basis of a coordinate position and a size of an index image stored in the index information storage means, the display control means may overlappingly display the selected index image at a position on the representative image corresponding to the selected index image. This provides a function that an index image may be overlappingly displayed on the position of a representative image corresponding to a selected index image on the basis of the coordinate position and size of a stored index image.

Also, in this first aspect, the index image extraction means may compute an overlap ratio between the converted taken image and an index image stored in the index information storage means and extracts the index image on the basis of the computed overlap ratio. This provides a function that an overlap ratio between a converted taken image and a stored index image is computed and an index image is extracted on the basis of this overlap ratio.

Also, in this first aspect, the display control means may display a marker indicative of a position of the index image at a position on the representative image corresponding to the extracted index image on the basis of a coordinate position and a size of an index image stored in the index information storage means. This provides a function that, on the basis of the coordinate position and size of a stored index image, a marker indicative of the position of the index image may be displayed on the position on the representative image corresponding to the extracted index image.

Also, in this first aspect, the display control means may change types of the marker for display in accordance with a recording position in the taken moving image of the extracted index image. This provides a function that the types of the maker are changed for display in accordance with the recording position in the taken moving image of the extracted index image.

Also, in this first aspect, given interval information extraction means for extracting moving image information existing within a given interval of the taken moving image including the extracted index image and index information storage means for storing the extracted index image and the moving image information existing within a given interval extracted in correspondence with the index image as related with each other may further be included, wherein, if an instruction operation for displaying the moving image information is accepted by the operation acceptance means, the display control means displays moving image information stored in the index information storage means as related with the selected index image. This provides a function that if an instruction operation for displaying moving image information is accepted, the moving image information stored in as related with the selected index image is displayed.

Also, in this first aspect, the moving image storage means may store taken moving image related with audio information and given interval information extraction means for extracting audio information existing a given interval of the taken moving image including the extracted index image, index information storage means for storing the extracted index image and the audio information existing within a given interval extracted in correspondence with the index image as related with each other, and audio control means for outputting audio information stored in the index information storage means as related with the selected index image if an instruction operation for outputting the audio information is accepted by the operation acceptance means may further be included. This provides a function that, if an instruction operation for outputting audio information is accepted, the audio information stored as related with the selected index image is outputted.

In carrying out the invention and according to a second aspect thereof, there are provided an image processing apparatus, a processing method thereof, and a program for making a computer execute this method, including: moving image storage means for storing a taken moving image taken by an image taking apparatus; conversion information storage means for storing, as related with each taken image, conversion information for converting another taken image with reference to at least one taken image of taken images configuring the taken moving image; image holding means for holding a log image; image conversion means for converting a taken image related with the conversion information on the basis of the conversion information; color information conversion means for converting color information in the converted taken image in accordance with a recording position in the taken moving image of the taken image; image synthesis means for synthesizing the taken image with color information converted and holding a resultant new log image in the image holding means; and display control means for displaying the log image as a representative image indicative of the taken moving image. This provides a function that a taken image is converted on the basis of conversion information, the color information of this converted taken image is converted in accordance with the recording position of the taken moving image of a taken image, the taken image this color information converted is synthesized with a log image to hold a resultant new log image, and the log image is displayed as a representative image indicative of the taken moving image.

Also, in this second aspect, the color information conversion means may convert transparency in the converted taken image in accordance with a recording position in the taken moving image of the taken image. This provides a function that the transparency in the converted taken image is converted in accordance with the recording position in the taken moving image of a taken image.

In carrying out the invention and according to a third aspect thereof, there are provided an image processing apparatus, a processing method thereof, and a program for making a computer execute this method, including: moving image storage means for storing a plurality of taken moving images taken by an image taking apparatus; conversion information storage means for storing, as related with each taken image, conversion information for converting another taken moving image with reference to at least one taken image among taken images configuring the taken moving image; image holding means for holding a log image; image conversion means for converting a taken image related with the conversion information on the basis of the conversion image; image synthesis means for synthesizing the converted taken image with the log image and holding a resultant new log image in the image holding means; representative image storage means for storing the log image as a representative image indicative of the moving image; display position decision means, letting, in an approximate rectangle identified by a display area for displaying a list of representative images, one end of the approximate rectangle be a first end and another end in contact with the first end be a second end, then, when the representative images are sequentially arranged with the first end being an arrangement position of high priority and a subject representative image that is a representative image to be determined for arrangement is arranged next to another already arranged representative image, if a maximum distance from the first end of the end opposite to the first end of each already arranged representative image is shorter than a maximum distance from the first end of the end opposite to the first end of the subject representative image, then the display position decision means determines a position in which one end of the subject representative image is in contact with the second end as an arrangement position of the subject representative image; and display control means for displaying the each representative image at the determined display position. This provides a function that a taken image is converted on the basis of conversion information, this converted taken image is synthesized with a log image to hold a resultant new log image, and, letting, in an approximate rectangle identified by a display area for displaying a list of representative images stored in the representative image storage means, one end of the approximate rectangle be a first end and another end in contact with the first end be a second end, then, when the representative images are sequentially arranged with the first end being an arrangement position of high priority and a subject representative image that is a representative image to be determined for arrangement is arranged next to another already arranged representative image, if a maximum distance from the first end of the end opposite to the first end of each already arranged representative image is shorter than a maximum distance from the first end of the end opposite to the first end of the subject representative image, then the display position decision means determines a position in which one end of the subject representative image is in contact with the second end as an arrangement position of the subject representative image.

In carrying out the invention and according to a fourth aspect thereof, there are provided an image processing apparatus, a processing method thereof, and a program for making a computer execute this method, including: moving image input means for entering a moving image taken by an image taking apparatus as a taken moving image; conversion information computation means for computing, for each taken image, conversion information for converting another taken image with reference to at least one taken image among taken images configuring the taken moving image; image holding means for holding a log image; image conversion means for converting a taken image associated with the conversion information on the basis of the conversion information; image synthesis means for synthesizing the converted taken image with the log image and holding a resultant new log image in the image holding means; index image extraction means for extracting a new index image from among the converted taken images obtained by converting at least one of the converted taken images on the basis of a coordinate position and a size of the index image in an image taking space defined by the conversion information as an index image of the taken moving image; display control means for displaying the log image as a representative image indicative of the taken moving image; operation acceptance means for accepting a selection operation for selecting a position on the selected representative image; and selection means for selecting the extracted index image on the basis of a position on the selected representative image; wherein the display control means displays the selected index image along with the representative image. This provides a function that conversion information is computed for each taken image, each taken image is converted on the basis of this conversion information, the converted taken image is synthesize with a log image to hold a resultant new log image, at least one of the converted taken images is selected as an index image of a taken moving image, a new index image is extracted on the basis of the coordinate position and size of the index image in the image taking space, an index image is selected on the basis of the position of the selected representative image, and this selected index image is displayed along with the representative image.

In carrying out the invention and according to a fifth aspect thereof, there are provided an image reproducing apparatus, a processing method hereof, and a program for making a computer execute this method, including: moving image storage means for storing a taken moving image taken by an image taking apparatus; conversion information storage means for storing, as related with each taken image, conversion information for converting another taken image with reference to at least one taken image of taken images configuring the taken moving image; image holding means for holding a log image; image conversion means for converting a taken image related with the conversion information on the basis of the conversion information; image synthesis means for synthesizing the converted taken image with the log image to store a resultant new log image in the image holding means; index image extraction means for extracting a new index image from among the converted taken images obtained by converting at least one of the converted taken images on the basis of a coordinate position and a size of the index image in an image taking space defined by the conversion information as an index image of the taken moving image; display control means for displaying the log image as a representative image indicative of the taken moving image; operation acceptance means for accepting a selection operation for selecting a position on the selected representative image; and selection means for selecting the extracted index image on the basis of a position on the selected representative image; wherein the display control means displays the selected index image along with the representative image. This provides a function that conversion information is computed for each taken image, each taken image is converted on the basis of this conversion information, the converted taken image is synthesize with a log image to hold a resultant new log image, at least one of the converted taken images is selected as an index image of a taken moving image, a new index image is extracted on the basis of the coordinate position and size of the index image in the image taking space, an index image is selected on the basis of the position of the selected representative image, and this selected index image is displayed along with the representative image.

According to the present invention, excellent effects are provided that the contents of a moving image taken by an image taking apparatus are easily understood.

BRIEF DESCRIPTION OF DRAWINGS

FIG. 3 is a diagram schematically showing each file recorded to a moving image storage block 200 and a metadata storage block 210.

FIG. 4 is a diagram schematically showing contents stored in an index information storage block 230 in the embodiment of the present invention.

FIG. 5 is a diagram schematically showing contents stored in a panorama image storage block 240 in the embodiment of the present invention.

FIG. 9 shows diagrams illustrating one example of transition of moving images taken by a camera.

FIG. 12 shows diagrams illustrating one example of transition of moving images taken by a camera.

FIG. 13 shows diagrams illustrating, by dashed lines, images corresponding to an immediately preceding frame in each image shown in FIG. 12 and shows one example of an optical flow to be detected.

FIG. 15 shows diagrams illustrating one example of transition of moving images taken by a camera.

FIG. 16 shows diagrams illustrating, by dashed lines, images corresponding to an immediately preceding frame in each image shown in FIG. 15 and shows an exemplary optical flow to be detected.

FIG. 18 shows diagrams illustrating an exemplary transition of moving images taken by a camera.

FIG. 19 shows diagrams illustrating an exemplary transition of moving images taken by a camera.

FIG. 20 shows diagrams illustrating an exemplary transition of moving images taken by a camera.

FIG. 21 shows diagrams illustrating an exemplary transition of moving images taken by a camera.

FIG. 23 shows diagrams illustrating one example of panorama images synthesized by an image synthesis bloc 170.

FIG. 26 shows diagrams schematically illustrating a panorama image arrangement area in displaying a list of panorama images and a display screen on a display block 292 on which a list of panorama images is displayed.

FIG. 29 shows diagrams illustrating arrangement examples in the case where panorama images 575 through 579 are arranged in the panorama image arrangement area 550.

FIG. 30 shows diagrams illustrating arrangement examples in the case where panorama images 575 through 579 are arranged in the panorama image arrangement area 550.

FIG. 32 shows diagrams illustrating arrangement examples in the case where panorama images 580 through 584 are arranged in the panorama image arrangement area 550.

FIG. 34 shows diagrams illustrating a panorama image in the case where the panorama image is created by synthesizing an image in the direction from a last frame to a start frame forming a moving image and a panorama image after rotation.

FIG. 35 shows diagrams illustrating display examples in which panorama images are arranged at arrangement positions determined by the above-mentioned arrangement position decision method.

FIG. 36 shows diagrams illustrating a relation between a panorama image displayed on the display block 292 and an index image.

FIG. 38 shows diagrams illustrating display examples in the case where a selected index image is displayed on a panorama image.

FIG. 39 shows diagrams illustrating display examples in the case where a selected index image is displayed on a panorama image.

FIG. 40 shows diagrams illustrating display examples in the case where a selected index image is displayed on a panorama image.

FIG. 41 shows diagrams illustrating display examples in the case where a selected index image is displayed on a panorama image.

FIG. 42 shows diagrams illustrating display examples in the case where a selected index image is displayed on a panorama image.

FIG. 45 shows diagrams illustrating display examples in which, in the proximity of a panorama image created by two or more moving images, an indicator indicative of the number of these moving images is attached and displayed.

FIG. 56 is a diagram schematically illustrating an overview of an arithmetic operation method in which two or more data are processed by different instructions and an overview of a SIMD operation in which two or more data are processed by one instruction.

FIG. 58 shows diagrams illustrating an overview of a data structure and a processing flow in the case where image data stored in a main memory 781 in the embodiment of the present invention is filtered by a Sobel filter 830.

FIG. 59 is a diagram illustrating an overview of a data flow in the case where SIMD computation is executed, by use of the Sobel filter 830, on image data stored in the main memory 781 in the embodiment of the present invention.

FIG. 60 is a diagram illustrating an overview of a vector creating method of creating nine vectors from image data stored in a first buffer 831 in the filter processing by use of the Sobel filter 830 in the embodiment of the present invention.

FIG. 61 is a diagram illustrating an overview of a vector computation method of executing vector computation on vector data 841 through 849 by use of a SIMD instruction in the case where filter processing is executed by use of the Sobel filter 830 in the embodiment of the present invention.

BEST MODE FOR CARRYING OUT THE INVENTION

The following describes in detail embodiments of the present invention with reference to accompanying drawings.

Figure 1:
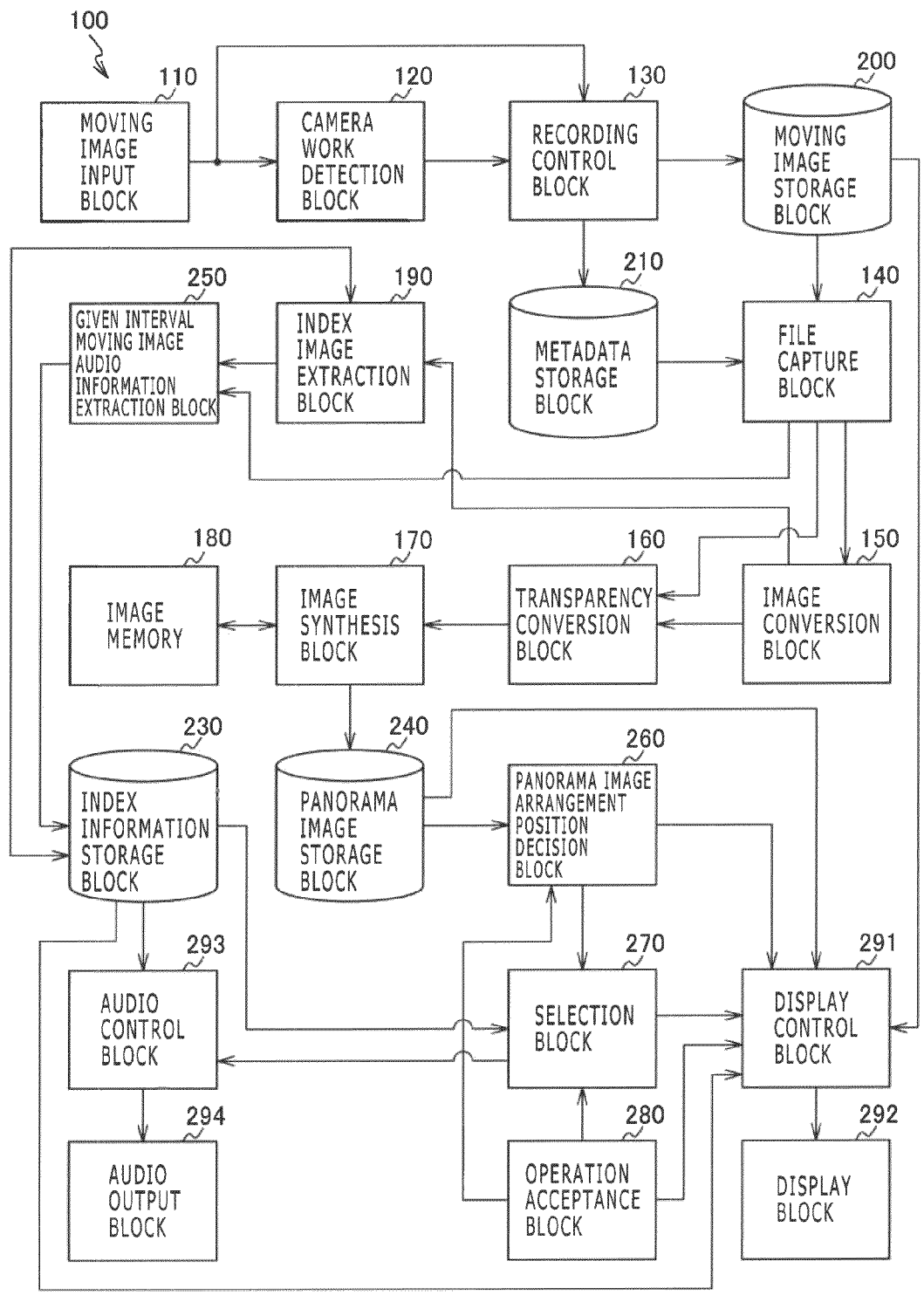
FIG. 1 is a block diagram illustrating an exemplary functional configuration of an image processing apparatus 100 practiced as one embodiment of the present invention.

FIG. 1 is a block diagram illustrating an exemplary functional configuration of an image processing apparatus 100 in an embodiment of the present invention. The image processing apparatus 100 has a moving image input block 110, a camera work detection block 120, a recording control block 130, a file capture block 140, an image conversion block 150, a transparency conversion block 160, an image synthesis block 170, an image memory 180, and index image extraction block 190, a moving image storage block 200, a metadata storage block 210, an index information storage block 230, a panorama image storage block 240, a given interval moving image audio information extraction block 250, a panorama image arrangement position decision block 260, a selection block 270, an operation acceptance block 280, a display control block 291, a display block 292, an audio control block 293, and an audio output block 294. The image processing apparatus 100 can be realized by a personal computer that is configured to extracts a feature amount by video analysis with respect to a moving image taken by an image taking apparatus, such as a digital camera, for example, and, by use of the extracted feature amount, execute various kinds of image processing.

The moving image input block 110 is a moving image input block through which a moving image taken by an image taking apparatus such as a digital video camera or the like (hereafter simply referred to as "camera") is entered and outputs the entered moving image to the camera work detection block 120.

The camera work detection block 120 analyzes a moving image outputted from the moving image input block 110 to detect moving information (camera work) of a camera at the time of image taking, thereby outputting an affine transformation parameter (a camera work parameter) computed on the basis of this camera moving information to the recording control block 130. Namely, the camera work detection block 120 extracts a feature point from each image configuring a moving image, extracts an optical flow (a moving vector) for the feature point, and analyzes the optical flow for the extracted feature point to select a feature point that presented a dominant movement, thereby estimating a camera work on the basis of the optical flow for the feature point that presented a dominant movement. Here, a dominant movement denotes a regular movement indicated by comparatively many optical flows among the optical flows for two or more feature points. It should be noted that the camera work detection block 120 will be detailed with reference to FIG. 2.

The recording control block 130 records a moving image outputted from the moving image input block 110 to the moving image storage block 200 as a moving image file and stores an affine transformation parameter outputted from the camera work detection block 120 to the metadata storage block 210 as a metadata file by relating the parameter with a corresponding moving image and a corresponding frame.

The moving image storage block 200 stores a moving image outputted from the moving image input block 110 to a moving image file under the control of the recording control block 130. Also, the moving image storage block 200 supplies a moving image file on request from the file capture block 140 to the file capture block 140 and supplies a moving image file on request from the display control block 291 to the display control block 291. It should be noted that moving image files to be stored in the moving image storage block 200 will be described in detail with reference to FIG. 3. It should also be noted that, in the embodiments of the present invention, moving image files with audio information related are described by way of example; however, it is also practicable to apply the embodiments of the present invention to those moving image files which are not related with audio information.

The metadata storage block 210 stores an affine transformation parameter outputted from the camera work detection block 120 as a metadata file under the control of the recording control block 130. Also, on request from the file capture block 140, the metadata storage block 210 supplies a metadata file to the file capture block 140. It should be noted that metadata files to be stored in the metadata storage block 210 will be detailed with reference to FIG. 3.

The file capture block 140 obtains a moving image file stored in the moving image storage block 200 and a metadata file related with this moving image file and stored in the metadata storage block 210 and supplies the information about each obtained file to each block. To be more specific, the file capture block 140 obtains a moving image file stored in the moving image storage block 200 and a metadata file related with this moving image file and stored in the metadata storage block 210 and outputs the moving image of the obtained moving image file and the affine transformation parameter of the obtained metadata file to the image conversion block 150. Here, the output of each frame configuring the moving image to be outputted from the file capture block 140 can be changed to any one of the output from the last frame to the start frame or the output from the start frame to the last frame depending on an operation input from the operation acceptance block 280. Also the file capture block 140 outputs the obtained moving image frame to the given interval moving image audio information extraction block 250 for each frame and outputs the number of frames configuring the obtained moving image frame to the transparency conversion block 160.

The image conversion block 150 executes affine transformation on the image configuring the moving image of the moving image file outputted from the file capture block 140 for each frame by use of an affine transformation parameter corresponding to this image and outputs the affine-transformed image to the transparency conversion block 160. To be more specific, the image conversion block 150 affine-transforms the image corresponding to the current frame outputted from the file capture block 140 by use of the affine transformation parameter supplied from the metadata storage block 210. Namely, if the output of the moving image from the file capture block 140 is the output from the last frame to the start frame, the image conversion block 150 executes the affine transformation by use of an inverse matrix to an affine-transformation parameter matrix. On the other hand, if the output of the moving image from the file capture block 140 is the output from the start frame to the last frame, the image conversion block 150 executes the affine transformation by use of an affine transformation parameter matrix. It should be noted that this image conversion will be detailed with reference to FIGS. 9 through 21.

The transparency conversion block 160 converts transparency in time sequence on the image affine-transformed by the image conversion block 150, on the basis of the number of frames configuring the moving image file outputted from the file capture block 140 and outputs the transparency-converted image to the image synthesis block 170. It should be noted that the conversion of transparency of images will be detailed with reference to FIG. 22 and FIG. 23.

The image synthesis block 170 synthesizes the image outputted from the transparency conversion block 160 and an synthesized image held in the image memory 180 and holds a newly synthesized image in the image memory 180. To be more specific, the image synthesis block 170 synthesizes images by writing the image affine-transformed by the image conversion block 150 and transparency-converted by the transparency conversion block 160 over a synthesized image corresponding to each frame up to the last held in the image memory 180. Also, if image synthesis for each frame configuring one moving image has been completed, the image synthesis block 170 outputs a synthesized image held in the image memory 180 to the panorama image storage block 240 as a panorama image for storage. This panorama image is a representative image indicative of a moving image of a moving image file stored in the moving image storage block 200, which is an image that is created so as to include the most portion of each image-taking space included in this moving image. It should be noted that this image synthesis will be detailed with reference to FIG. 9 through FIG. 21.

The image memory 180 is a work buffer that holds a synthesized image created by the image synthesis block 170 and supplies the held synthesized image to the image synthesis block 170. Namely, the image memory 180 is an image memory that holds a log image.

The index image extraction block 190 extracts an index image from among the images configuring a moving image of a moving image file outputted from the file capture block 140, on the basis of a converted image outputted from the image conversion block 150 and an index image stored in the index information storage block 230 and outputs the extracted index image to the index information storage block 230 along with the corresponding frame number and positional information. To be more specific, the index image extraction block 190 extracts an index image on the basis of a overlap ratio between an index image stored in the index information storage block 230 and an image corresponding to the affine-transformed current frame. Also, if an index image has been extracted, the index image extraction block 190 outputs information that the image corresponding to the current frame is an index image to the given interval moving image audio information extraction block 250. It should be noted that an extraction method of this index image will be detailed with reference to FIG. 25.

Upon reception of the information from the index image extraction block 190 that the image corresponding to the current frame is an index image, the given interval moving image audio information extraction block 250 obtains moving image information and audio information within a given interval from the frame corresponding to the index image from among the moving images outputted from the file capture block 140 and records, to the index information storage block 230, the obtained moving image information and audio information within the given interval by relating these moving image information and audio information with that index image.

The index information storage block 230 stores the index image outputted from the index image extraction block 190, the frame number and positional information corresponding to this index image, and the moving image information and audio information within the given interval corresponding to this index image, outputted from the given interval moving image audio information extraction block 250, as related with each other, outputs the stored index image, frame number, moving image ID and moving image information to the display control block 291, and outputs the frame number and positional information to the selection block 270. Also, the index information storage block 230 outputs the stored positional information to the index image extraction block 190. Further, the index information storage block 230 outputs the stored audio information to the audio control block 293. It should be noted that each item of information stored in the index information storage block 230 will be detailed with reference to FIG. 4.

The panorama image storage block 240 stores the synthesized image outputted from the image synthesis block 170 as a panorama image (a representative image) associated with a moving image stored in the moving image storage block 200 and supplies the stored panorama image to the panorama image arrangement position decision block 260 and the display control block 291. It should be noted that each item of information stored in the panorama image storage block 240 will be detailed with reference to FIG. 5.

The panorama image arrangement position decision block 260 determines the arrangement position of each panorama image stored in the panorama image storage block 240 in a display area shown on the display block 292 in accordance with the contents of an operation input accepted by the operation acceptance block 280 and outputs the determined arrangement position of each panorama image to the selection block 270 and the display control block 291. It should be noted that this determination of arrangement position will be detailed with reference to FIG. 26 through FIG. 33.

When an operation input for moving a cursor, an operation input of left-click operation, or an operation input of double click is accepted by the operation acceptance block 280, the selection block 270 selects one of the frame numbers and a moving image ID stored in the index information storage block 230 on the basis of a cursor position, positional information of an index image stored in the index information storage block 230, and the arrangement position of the panorama image determined by the panorama image arrangement position decision block 260 and outputs the selected frame number of moving image ID to the display control block 291 and the audio control block 293. It should be noted that this selection will be detailed with reference to FIG. 37.

The operation acceptance block 280 has a keyboard made up of various input keys and a mouse (a pointing device) and, upon accepting an operation input from these mouse and so on, outputs the contents of the accepted operation input to the file capture block 140, the panorama image arrangement position decision block 260, the selection block 270, and the display control block 291. It is also practicable to configure at least a part of the operation acceptance block 280 and the display block 292 into one unit. Also, the cursor (the mouse pointer) that moves in accordance with an operation input from the mouse is shown on the display block 292. The cursor is a mouse pointer for use in specifying the subject of an instruction or an operation on a screen shown on the display block 292. A mouse operation "left click" denotes the pressing of the left-side button of the mouse only once and a mouse operation "double click" denotes the pressing of the left-side button of the mouse twice consecutively, for example.

The display control block 291 executes control such that, in accordance with an operation input through the operation acceptance block 280, a panorama image stored in the panorama image storage block 240 and a moving image stored in the moving image storage block 200 are shown on the display block 292. Also, when a frame number and an moving image ID are entered from the selection block 270, the display control block 291 searches the index information storage block 230 for an index image or moving image information and displays the retrieved index image or moving image information on the display block 292.

Under the control of the display control block 291, the display block 292 displays a panorama image stored in the panorama image storage block 240, a moving image stored in the moving image storage block 200, or an index image or moving image information stored in the index information storage block 230. For example, the display block 292 may be realized a personal computer display or a television display. It should be noted that the display examples of synthesized images will be detailed with reference to FIG. 23, FIG. 35, and so on.

The audio control block 293 executes control of outputting audio information stored in the index information storage block 230 to the audio output block 294 on the basis of an instruction from the selection block 270 in accordance with a cursor movement or a left click operation. It should be noted that audio output is executed also for the reproduction of a moving image file stored in the moving image storage block 200, the description thereof being omitted here.

Under the control of the audio control block 293, the audio output block 294 outputs audio information stored in the index information storage block 230. For example, the audio output block 294 may be realized by a loudspeaker.

Figure 2:
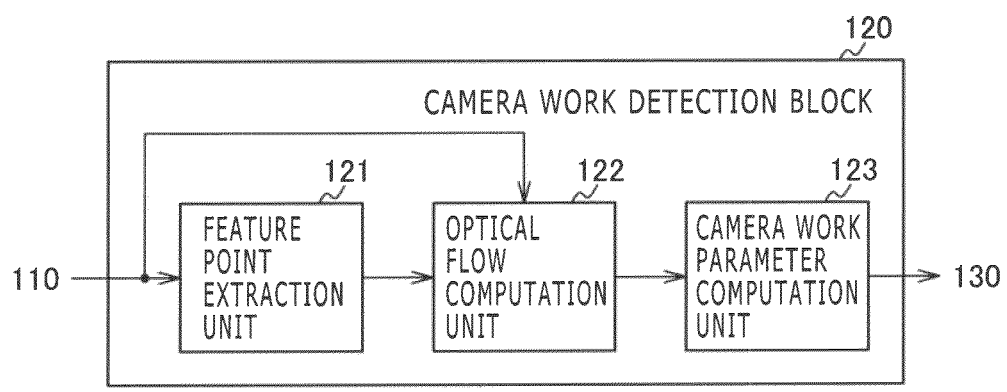
FIG. 2 is a block diagram illustrating an exemplary functional configuration of a camera work detection block 120 in the embodiment of the present invention.

Referring to FIG. 2, there is shown an exemplary functional configuration of the camera work detection block 120 in the embodiment of the present invention. The camera work detection block 120 has a feature point extraction unit 121, an optical flow computation unit 122, and a camera work parameter computation unit 123.

The feature point extraction unit 121 extracts a feature point corresponding to a frame configuring a moving image outputted from the moving image input block 110 and outputs the extracted feature point to the optical flow computation unit 122. Here, the feature point extraction unit 121 extracts a feature point from an entire image for the start frame of the frames configuring the moving image outputted from the moving image input block 110 and, for other frames than the start frame, extracts a feature point from the portion of an area newly taken as compared with an image corresponding to the immediately preceding frame. It should be noted that, for a feature point, a point that is sharp in edge gradient vertically or horizontally (generally referred to as "corner point," hereafter being referred to as "corner point") may be selected. This corner point is a feature point that is tough for the computation of an optical flow and can be obtained by use of edge detection. It should be noted that the extraction of this corner point will be detailed with reference to FIG. 6 through FIG. 8. Also, in this example, the feature point extraction unit 121 extracts a feature point from an entire image for the start frame, for other frames than the start frame, extracts a feature point from the portion of an area newly taken as compared with an image corresponding to the immediately preceding frame; however, it is also practicable, depending on the processing performance and other factors to extract a feature point from an entire image for frames other than the start frame.

The optical flow computation unit 122 computes an optical flow for each feature point outputted from the feature point extraction unit 121 and outputs the optical flow obtained by the computation to the camera work parameter computation unit 123. To be more specific, by comparing the images corresponding to the consecutive two frames (the current frame and the immediately preceding frame) configuring a moving image outputted from the moving image input block 110, the optical flow corresponding to each feature point in the image corresponding to the immediately preceding frame is obtained as the optical flow of the current frame. Also, an optical flow is obtained for each frame configuring a moving image. It should be noted that, for a detection method of detecting an optical flow, a detection method, such as a gradient method or a block matching method, can be employed. It should also be noted that this optical flow computation will be detailed with reference to FIG. 6 through FIG. 8.

The camera work parameter computation unit 123 executes camera work parameter computation processing for extracting a camera work parameter by use of an optical flow corresponding to each feature point outputted from the optical flow computation unit 122. The computed camera work parameter is outputted to the recording control block 130. Here, in the embodiment of the present invention, an image configuring a moving image subject to reproduction is converted and synthesized in accordance with camera work. For the conversion of this image, camera work is extracted by use of an optical flow computed by the optical flow computation unit 122 and a camera work parameter (a conversion parameter) is computed on the basis of this extracted work. It should be noted that, in the embodiment of the present invention, an example is employed in which affine transformation is used for a method of converting an image configuring a moving image subject to reproduction. Also, an example will be described in which, for a camera work parameter, an affine transformation parameter corresponding to the inverse matrix to a matrix of affine transformation parameters computed on the basis of an optical flow is used. It should be noted that another image conversion method, such as projective transformation, may be used.

It should be also noted that an affine transformation parameter may be obtained by use of three optical flows. Further it should also be noted that a project transformation parameter may be obtained by use of four optical flows. Here, a camera work parameter is conversion information for converting other taken images with reference to at least one taken image among the taken images configuring a taken image and includes positional information and attitude information that are described at least in a camera coordinate system. Namely, a camera work parameter includes the information associated with the position and attitude in the case where an image is being taken by an image taking person. Also, on the basis of an affine transformation parameter obtained by the camera work parameter computation unit 123, camera work by image taking person's operations, such as zoom-in, zoom-out, pan, tilt, rotation, and so on, can be presumed. It should be noted that the computation of an affine transformation parameter will be detailed with reference to FIG. 6 through FIG. 8.

Referring to FIG. 3, there is schematically shown each file recorded to the moving image storage block 200 and the metadata storage block 210 in the embodiment of the present invention. FIG. 3(a) shows moving image files 201 through 204 stored in the moving image storage block 200 and metadata files 211 through 213 stored in the metadata storage block 210 as related with the moving image files 201 through 204. Here, it is assumed that an moving image ID for identifying each moving image file stored in the moving image storage block 200 be assigned to each moving image file. For example, "#1" is assigned to the moving image file 201, "#2" is assigned to the moving image file 202, and "#n" is assigned to the moving image file 204.

FIG. 3(b) schematically shows the moving image file 201 stored in the moving image storage block 200 and the metadata file 211 stored in the metadata storage block 210 as related with the moving image file 201. Here, the moving image file 201 is a moving image file configured by n frames and these n frames are indicated as frames "1" 205 through "n" 208.

Also, the metadata 211 is stored as related with an moving image ID 214, a frame number 215, and an affine transformation parameter 216.

The moving image ID 214 is a moving image ID assigned to a corresponding moving image file; for example, "#1" assigned to the moving image file 201 is stored.

The frame number 215 is a serial number of each frame configuring a moving image of a corresponding moving image file; for example, "1" through "n" corresponding to frames "1" 205 through "n" 208 configuring a moving image of the moving image file 201 are stored.

The affine transformation parameter 216 is an affine transformation parameter computed for each frame of a moving image corresponding to the frame number 215. It should be noted that an affine parameter 216 "al, bl, cl, dl, el, fl" corresponding to "1" of the frame number 215 is an affine transformation parameter of unit matrix. Also, "am, bm, cm, dm, em, fm" of an affine transformation parameter 216 corresponding to "m (m is an integer of 2 or more) of the frame number 215 is an affine transformation parameter corresponding to the immediately preceding frame "m−1" of frame "m."

FIG. 4 shows an overview of the contents stored in the index information storage block 230 in the embodiment of the present invention.

The index information storage block 230 stores information associated with an index image extracted by the index image extraction block 190 for each frame in a time sequence and stores the audio information and moving image information within a given interval extracted by the given interval moving image audio information extraction block 250 as related with the index image. To be more specific, the index information storage block 230 stores a moving image ID 231, a frame number 232, positional information 233, an index image 234, audio information 235, and moving image information 236 as related with each other.

The moving image ID 231 is the ID corresponding to each moving image file stored in the moving image storage block 200.

The frame number 232 is the identification number of the frame corresponding to the index image extracted by the index image extraction block 190.

The positional information 233 is indicative of the position of the index image extracted by the index image extraction block 190 on a work buffer of the image memory 180. For example, if the work buffer of the image memory 180 is defined by xy coordinates, the values of the coordinates corresponding to four apex angles of the index image extracted by the index image extraction block 190 are recorded. Namely, as the position of the index image extracted by the index image extraction block 190, the coordinate position on the image taking space defined by the camera work information at the time of taking an moving image is recorded. This image taking space is an image space corresponding to a representative image created by the image synthesis block 170 by use of the affine transformation parameter computed on the basis of the amount of camera work at the time of image taking of the taken moving image entered from the moving image input block 110, for example. It should be noted that in the embodiment of the present invention, an example is described in which the values of coordinates corresponding to four apex angles are used for the positional information of the index image extracted by the index image extraction block 190; however, it is also applicable to use other positional information, such as the center position, size, and so on, of that image as the positional information of that index image.

The index image 234 is an index image extracted by the index image extraction block 190.

The audio information 235 is audio information within a given interval extracted by the given interval moving image audio information extraction block 250 and information for outputting the audio within the given interval corresponding to an index image from the audio output block 294.

The moving image information 236 is moving image information within a give interval extracted by the given interval moving image audio information extraction block 250 and information for displaying a moving image within the given interval corresponding to an index image onto the display block 292.

Figure 5:
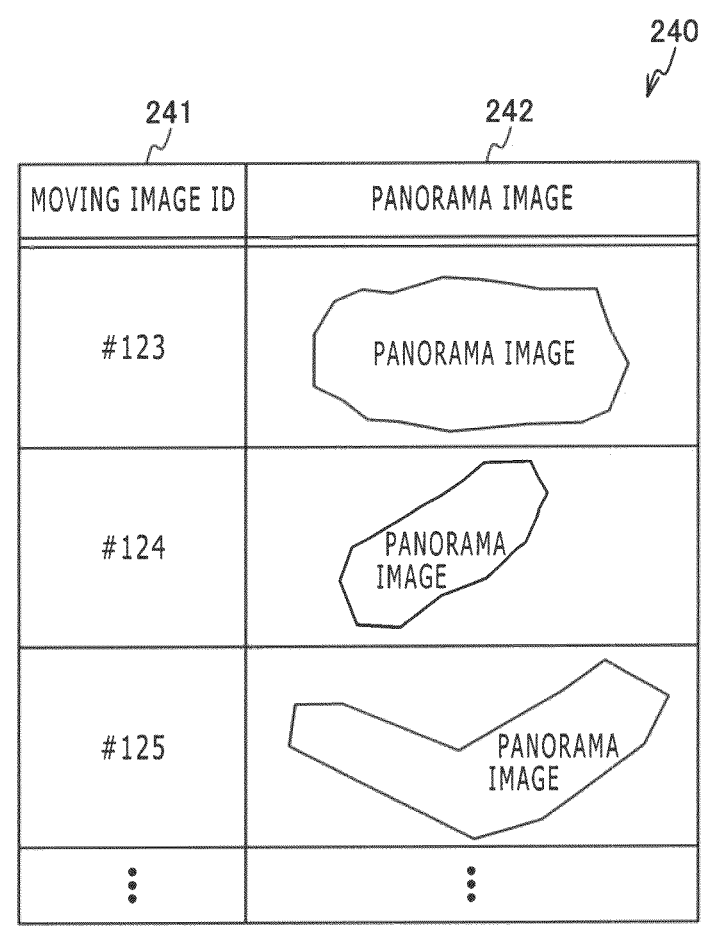

Referring to FIG. 5, there is shown an overview of the contents stored in the panorama image storage block 240 in the embodiment of the present invention.

The panorama image storage block 240 stores, as a panorama image, a synthesized image created by the image synthesis block 170 for each moving image file stored in the moving image storage block 200. To be more specific, the panorama image storage block 240 stores a moving image ID 241 and a panorama image 242 as related with each other. For example, one panorama image is stored for one moving image file.

The moving image ID 241 is an ID corresponding to each moving image file stored in the moving image storage block 200.

The panorama image 242 is a synthesized image synthesized by the image synthesis block 170 for each moving image file stored in the moving image storage block 200. It should be noted that FIG. 5 shows each panorama image stored in the panorama image storage block 240 in a simplified manner.

The following details a detection method of detecting affine transformation parameters for use in image conversion with reference to drawings.

Figure 6:
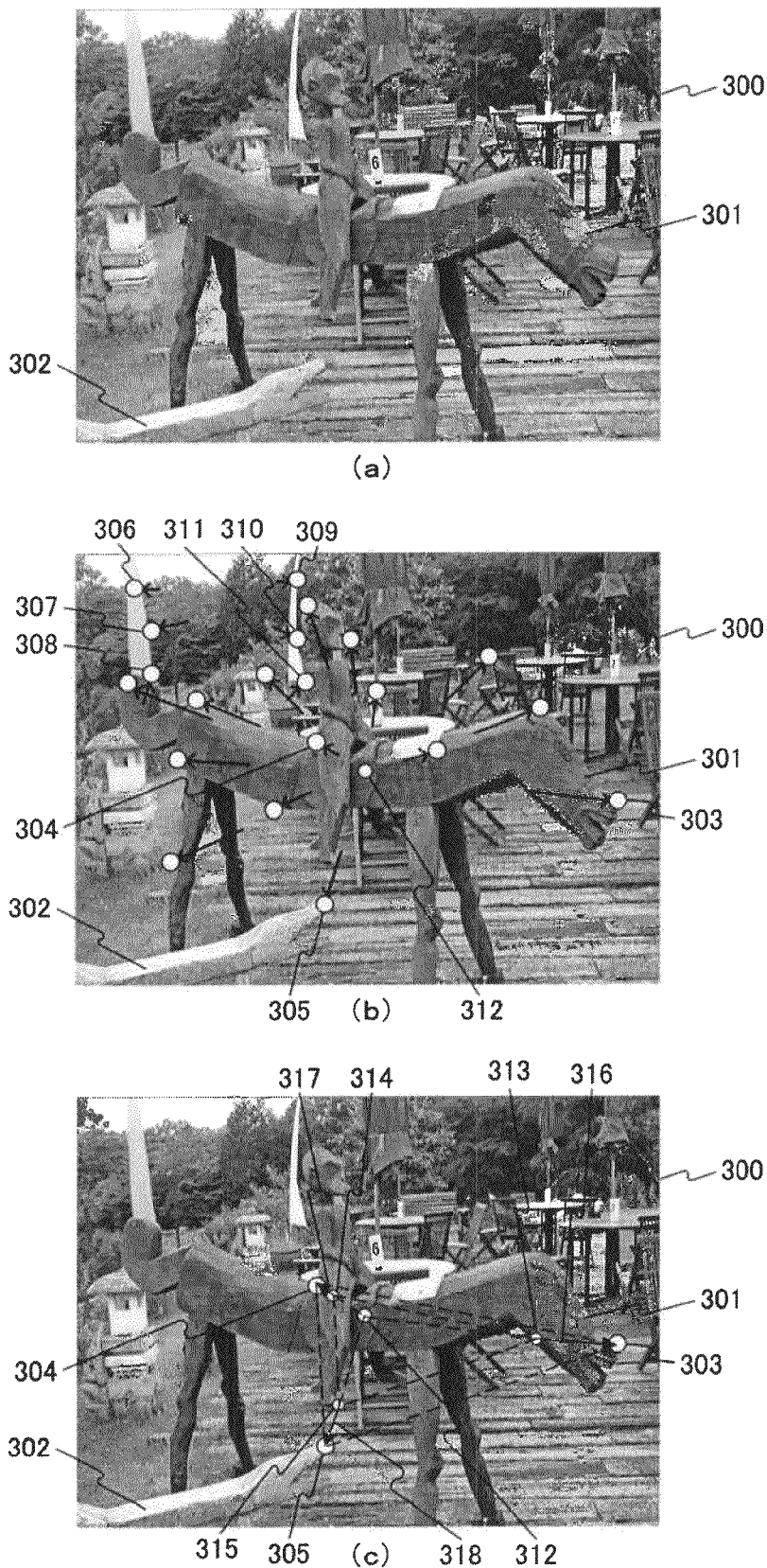
FIG. 6 shows diagrams illustrating one example of images corresponding to a frame forming moving images.

FIG. 6(a) through (c) show an example of an image corresponding to a frame configuring a moving image. FIG. 7(a) shows an image simplified by omitting a background and so on with an image corresponding to an immediately preceding frame corresponding to an image 300 shown in FIG. 3. FIGS. 7(b) and (c) show images simplified by omitting backgrounds and so on with an image 300 shown in FIG. 6.

Figure 7:
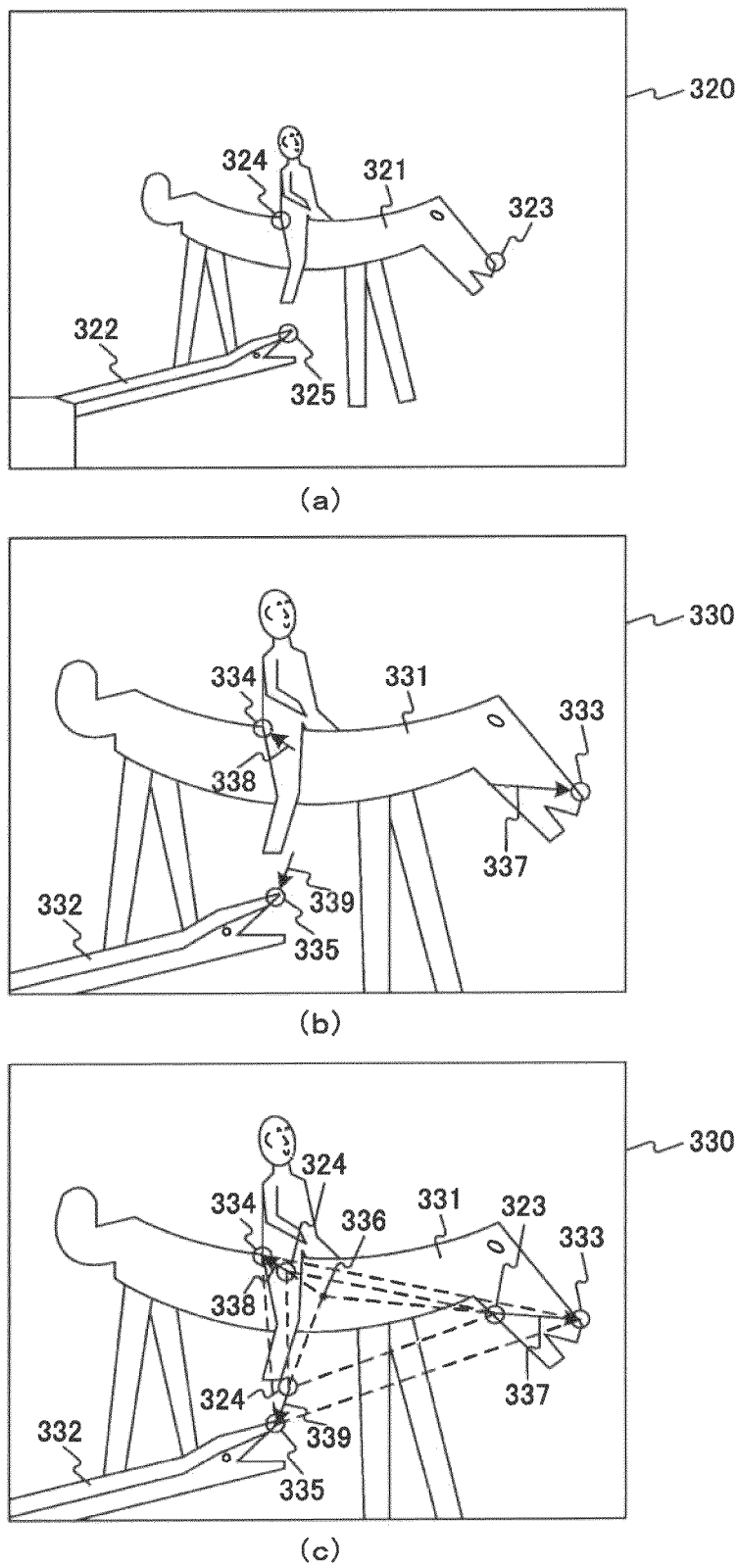
FIG. 7 shows diagrams illustrating an image with a background and so on simplified that corresponds to a frame forming moving images.

Images 300, 320, and 330 shown in FIG. 6 and FIG. 7 include images of mounted horse 301, 321, and 331 and snake images 302, 322, and 332 arranged in front of these mounted horse images 301, 321, and 331. Also, as shown in FIG. 6, in the background of these images, flags, chairs, and so on exist, the flags being streaming on the wind.

The image 320 shown in FIG. 7(a) is an image obtained by simplifying an image corresponding to an immediately preceding frame corresponding to the images 300 and 330 shown in FIG. 6(a) through (c) and FIGS. 7(b) and (c). The images 320 and 330 corresponding to two consecutive frames are images indicative of a transition in the case where a subject in the screen is gradually enlarged. Namely, at the time of this image taking, a zoom-in operation that is an operation for gradually enlarging a subject in the screen is executed.

In the embodiment of the present invention, a method is used for example in which a feature point is detected from images configuring a moving image and an optical flow corresponding to this feature point is used to compute an affine transformation parameter. In this example, a case where a corner point is used for a feature point is described.

Here, with reference to FIG. 7(a) through (c), a method is described as an example in which an optical flow corresponding to three corner points detected from the images 320 and 330 is used to compute an affine transformation parameter.

For example, it is assumed that, in the image 320 shown in FIG. 7(a), a corner point 323 near the mouth in a horse image 321, a corner point 324 near the rider's buttocks of the horse image 321, and a corner point 325 near the mouth of the snake image 322 have been detected as feature points. In this case, in the image 330 shown in FIG. 7(b), optical flows 337, 338, and 339 for the corner points 323, 324, and 325 in the image 320 are detected by a gradient method or block matching method. Then, on the basis of these detected optical flow 337, 338, and 339, the corner points 333, 334, and 335 corresponding to the corner points 323, 324, and 325 in the image 320 are detected.

Here, for example, because the horse images 321, 331 and the snake images 322, 332 included in the images 320 and 330 shown in FIGS. 7(a) and (b) are installed on the ground, these images do not move regardless of camera work. Hence, camera work can be correctly estimated on the basis of the optical flows obtained from the corner points detected in the horse images 321, 331 and the snake images 322, 332. For example, as shown in FIG. 7(c), on the basis of three optical flows 337 through 339 detected in the image 330, it can be estimated that the image 330 is an enlargement of the image shelf panel 320 around the point 336. Consequently, the camera work at the time of taking the image 330 can be determined to be a zoom-in operation around the point 336. Thus, corner points can be detected in an object that does not move regardless of camera work and, on the basis of the optical flows obtained for the corner points, the camera work having a certain regularity can be correctly detected. Hence, by use of the optical flows obtained for these corner points, affine transformation parameters can be obtained.

However, like flags streaming on the wind, an image may include an object that moves regardless of camera work. For example, the image 300 shown in FIG. 6 contains flags streaming on the wind. If corner points are detected in an object that moves regardless of camera work are detected and camera work is estimated by use of the optical flows obtained for the detected corner points, the camera work cannot be correctly estimated.

For example, the optical flows detected in the image 300 shown in FIG. 6(b) are indicated by arrows and the corner points detected by the optical flows are indicated by white circles at the ends. Here, the corner points 303 through 305 are corner points corresponding to the corner points 333 through 335 shown in FIGS. 7(b) and (c). Also, the corner points 306 through 311 are corner points detected for the flags existing in the background of the horse image 301. Then, because these flags are streaming on the wind, the movement of each flag affected by the wind is detected as an optical flow. Namely, each of the optical flows corresponding to the corner points 306 through 311 is detected for the flag that moves regardless of camera work. Hence, if an optical flow corresponding to at least one corner point of the corner points 306 through 311 is included in the three optical flows for use in the computation of affine transformation parameters, no correct camera work can be detected.

As described above, optical flows for an object that moves regardless of camera work (optical flows corresponding to the corner points 306 through 311 shown in FIG. 6(b)) and optical flows having a certain regularity with respect to camera work (optical flows other than the optical flows corresponding to the corner points 303 through 305 shown in FIG. 6(b)) may be detected from a taken image, for example.

So, in the embodiment of the present invention, an example is described in which affine transformation parameter computation processing for computing affine transformation parameters on the basis of three optical flows is executed two or more times to obtain two or more affine transformation parameters and an optimum affine transformation parameter is selected from the obtained two or more affine transformation parameters. It should be noted that, in this example, it is assumed that the size of a moving object included in each image configuring a moving image be comparatively small relative to the area of the image.

Here, affine transformation is described in a simple manner. In a two-dimensional space, let the position of move source be (x,y) and the position of move destination after affine transformation be (x',y'), then the determinant of affine transformation may be expressed by equation 1 below. It should be noted that in the case of a unit matrix, a=e=1, b=c=d=f=0 are satisfied.

[Mathematical expression 1]

$$[x'\ y'\ 1] = [x\ y\ 1]\begin{bmatrix} a & d & 0 \\ b & e & 0 \\ c & f & 1 \end{bmatrix}$$ (Equation 1)

In the above expression, a through f denote affine transformation parameters. Also, affine matrix AM based on these affine transformation parameters may be expressed by an equation below. In this case, zoom component XZ in X direction, zoom component YZ in Y direction, translation component XT in X direction, translation component YT in Y direction, and rotation component R can be obtained by the following equations, respectively.

[Mathematical expression 2]

$$AM = \begin{bmatrix} a & b & c \\ d & e & f \end{bmatrix}$$
$$XZ = \sqrt{a^2 + d^2}$$
$$YZ = \sqrt{b^2 + e^2}$$
$$XT = c$$
$$YT = f$$
$$R = \tan^{-1}\left[\frac{d}{a}\right]$$

The following describes an affine transformation parameter computation method.

First, in an image corresponding to a current frame that is one of the frames configuring a moving image, three feature points are selected from the feature points from which optical flows were detected. For example, three corner points are randomly selected from the corner points (indicated by white circles) detected in the image 300 shown in FIG. 6(b). It should be noted that, if a projective transformation parameter is used for a camera work parameter, four feature points are randomly selected.

Next, affine transformation parameters are computed by use of the three optical flows corresponding to the three selected feature points. For example, affine transformation parameters are computed by use of the optical flows (indicated by arrows connected to white circles) corresponding to the three corner points out of the corner points (indicated by white circles) in the image 300 shown in FIG. 6(b). The affine transformation parameters can be obtained by use of equation 1.

Next, on the basis of the obtained affine transformation parameters, a score of the affine transformation parameters is obtained. To be more specific, by use of the obtained affine transformation parameters, the positions of the move destinations of all feature points in an image corresponding to the immediately preceding frame of the current frame are obtained. Then, a comparison is made between the position of the move destination of the feature point obtained by use of the affine transformation parameters and the position of the feature point detected in the current frame to compute a difference value between the positions of the two feature points corresponding to each other. For the difference value, an absolute distance between the two corresponding position is computed, for example. Then, a comparison is made between the computed difference value and a preset threshold for each feature point to compute the number of feature points with the difference value smaller than the threshold value as the score of affine transformation parameters. Thus, three feature points are randomly selected from the feature points from which optical flow were detected and the processing of computing a score of affine transformation parameters is repeated the predetermined number of times on the basis of the optical flows corresponding to these feature points, thereby computing two or more scores of affine transformation parameters. This predetermined number of times may be appropriately set in accordance with the type of images subject to comparison or the processing performance and so on of the image processing apparatus 100 or set by use of a fixed value. This predetermined number of times may be 20 or so by taking the processing performance of the image processing apparatus 100 into consideration, for example.

For example, assume that three corner points other than the corner points 306 through 311 from the corner points detected in the image 300 shown in FIG. 6(b). If an affine transformation parameter is computed by use of three optical flows corresponding to the three corner points thus selected, an affine transformation parameter for converting the image corresponding to the immediately preceding image in accordance with certain rules is obtained because, as described above, these three optical flow have a certain regularity. Hence, for a difference value to be obtained for corner points other than the corner points 306 through 311, between the position of a corner point obtained by use of an affine transformation parameter and the position of a corner point detected in the current frame, a comparatively small value is computed. Hence, the score of affine transformation parameters takes a large value.

On the other hand, assume that three corner points including at least one of the corner points 306 through 311 be selected from the corner points detected in the image 300 shown in FIG. 6(b). If an affine transformation parameter is computed by use of three optical flows corresponding to the three corner points thus selected, an affine transformation parameter not converting the image corresponding to the immediately preceding frame is obtained because an optical flow having no certain regularity is included in these three optical flows. Hence, for a difference value between the position of a corner point obtained by the use of an affine transformation parameter and the position of a corner point obtained in the current frame, a comparatively large value is obtained at a given corner point. Hence, the score of affine transformation parameters takes a small value.

Next, of the obtained two or more scores of affine transformation parameters, the affine transformation parameter having the largest score value is selected an a representative affine transformation parameter. Then, the affine transformation parameter corresponding to the inverse matrix to a matrix corresponding to the selected representative affine transformation parameter is recorded to the moving image storage block 200 as related with the current frame. Consequently, in the affine transformation of an image configuring a moving image, the affine transformation can be executed by use of an optimum affine transformation parameter.

As described above, if an object (a moving object) that moves, such as a human being, car, or the like, is included in each image configuring an moving image and, if the size of such a moving object relative to the area of the image is comparatively small, camera work can be extracted without being affected by the moving object.

In addition, by extracting camera work, motions considered intentionally made by an image taking person, such as zoom-in, zoom-out, pan, tilt, and rotation, can be estimated. It should be noted that, in equation 1, an affine transformation parameter can be computed on the basis of two optical flows where a=e, d=−b. For example, if an image is affine-transformed by use of an affine transformation parameter computed on the basis of three optical flows for example, a rectangular image may be converted into a parallelogram. In contrast, if an image is affine-transformed by use of an affine transformation parameter computed on the basis of two optical flows, at least one of translation, rotation, and zoom (with zoom ratio being the same in xy directions) can be executed with the image in a rectangle state. In the embodiment of the present invention, an example is used for description in which image conversion is executed by use of a affine transformation parameter computed on the basis of three optical flows; the embodiment of the present invention is also applicable if image conversion is executed by use of affine transformation parameter computed by use of two optical flows.

The following describes an operation of the image processing apparatus 100 in the embodiment of the present invention with reference to drawings.

Figure 8:
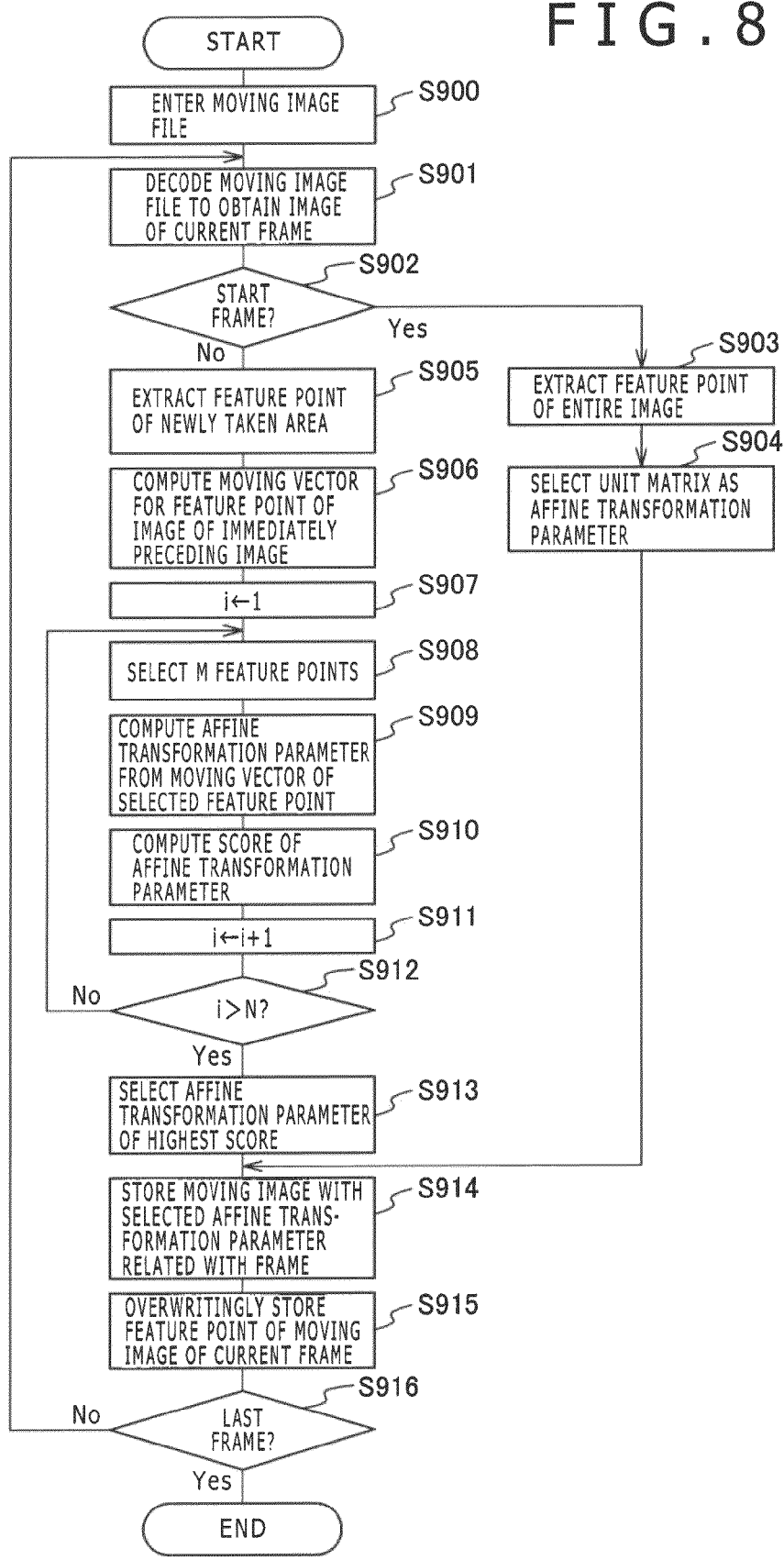
FIG. 8 is a flowchart indicative of a processing procedure of affine transformation parameter detection processing by the image processing apparatus 100 in the embodiment of the present invention.

Referring to FIG. 8, there is shown a flowchart indicative of a processing procedure of the affine transformation parameter detection processing by the image processing apparatus 100 in the embodiment of the present invention.

First, a moving image file is entered in the moving image input block 110 (step S900). Next, the moving image file entered in the moving image input block 110 is decoded and an image of one frame is obtained in a time sequence manner (step S901). Next, it is determined whether the obtained one frame is the start frame of the moving image data entered in the image processing apparatus 100 (step S902). If the obtained one frame is found to be the start frame (step S902), then feature points are extracted from the entire image corresponding to this start frame (step S903). For example, as shown in FIG. 6(b), two or more corner points are extracted in the image. Next, affine transformation parameters of a unit matrix are selected as the affine transformation parameter (step S904), upon which the procedure goes to step S914.

On the other hand, if the obtained one frame is found not to be the start frame (step S902), feature points are extracted from an area newly taken with reference to an image corresponding to an immediately preceding frame (step S905). Namely, the feature points already extracted in an image corresponding to an immediately preceding frame can be obtained by an optical flow corresponding to this feature point, so that these feature points are not extracted in the image corresponding to the current frame.

Next, an optical flow for each of the feature points extracted from the image corresponding to the immediately preceding frame are computed (step S906). Namely, as shown in FIG. 6(b), an optical flow for each corner point is computed.

Next, variable i is initialized to "1" (step S907). Next, from the feature points from which optical flows were computed, M feature points are selected (step S908). For example, if the affine transformation parameter is used for a camera work parameter, three feature points are randomly selected. Also, if the projective transformation parameter is used for a camera work parameter, four feature points are randomly selected. Next, on the basis of the M optical flows computed for the selected M feature points, affine transformation parameters are computed (step S909).

Next, on the basis of the computed affine transformation parameters, a score of the affine transformation parameters is computed (step S910). To be more specific, by use of the affine transformation parameters obtained by computation, the potions of the move destinations of all feature points in the image corresponding to the immediately preceding frame are obtained. Then, a comparison is made between the position of the feature point obtained by the affine transformation parameter and the position of the feature point in the image corresponding to the current frame obtained in the computation of optical flows in step S906 to compute a difference value between the positions of two corresponding feature points for each of the feature points. For the difference value, an absolute distance between the two corresponding positions is computed, for example. Next, a comparison is made between the computed difference value and a preset threshold value for each of the feature points, to obtain, as the score of affine transformation parameters, the number of feature points whose difference values are smaller than the threshold value.

Next, "1" is added to variable i (step S911) to determined whether variable i is greater than constant N (step S912). If variable i is less than constant N (step S912), then the procedure returns to step S908 to repeat the affine transformation parameter score computation processing (steps S908 through S910). For example, 20 may be used for constant N.

On the other hand, if variable i is greater than constant N (step S912), an affine transformation parameter having the greatest value is selected as a representative affine transformation parameter from the obtained scores of affine transformation parameters (step S913). Next, affine transformation parameters corresponding to the inverse matrix to a matrix of the selected affine transformation parameters are recorded to the moving image storage block 200 as related with the current frame (step S914). It should be noted that, if the current frame is the start frame, the affine transformation parameters of the selected unit matrix are recorded to the moving image storage block 200 as related with the start frame. Next, the image corresponding to the current frame and the feature points in this image are stored in an overwrite manner (step S915).

Next, it is determined whether the current frame is the last frame of the moving image entered in the moving image input block 110 (step S916). If the current frame is not the last frame (step S916), the procedure returns to step S901 to repeat the affine transformation parameter detection processing (steps S901 through S915). On the other hand, if the current frame is the last frame (step S916), the affine transformation parameter detection processing comes to an end.

In the embodiment of the present invention, the description has been made by use of an example in which, for the detection of a camera work parameter, affine transformation parameters are detected on the basis of optical flows detected in an image configuring a moving image; however, it is also practicable to arrange a sensor, such as an acceleration sensor or a gyro sensor for example or a zoom button for use in zoom operations onto the camera, detect a movement amount of the camera at the time of image taking, and obtain a camera work parameter on the detected camera movement amount. It should be noted that the camera movement amount detected at the time of image taking can be used when determining whether the camera work parameter obtained by the camera work parameter computation unit 123 are correct or not. Also, it is applicable to detect two or more camera work parameters by the camera work parameter computation unit 123 in advance and, on the basis of the camera movement amount detected at image taking, one of these camera work parameters.

The following describes in detail a case in which a moving image is synthesized by use of the above-mentioned affine transformation parameter with reference to drawings. It should be noted that images shown in FIG. 9 through FIG. 17 are shown in a simplified manner and the movement amount between two consecutive frames is shown large for the convenience of description. Also, referring to FIG. 9 through FIG. 17, an example is used in which an image is synthesized in the direction from the start frame to the last frame that configure a moving image.

First, a case is described in which, at the time of image taking by the camera, the direction of the lens of the camera has been moved up, down, to the left, or to the right relative of the position of the camera with magnification kept unchanged.

FIG. 9 shows one example of a transition of a moving image taken by a camera. FIG. 9 shows images 401 through 403 corresponding to continuous frames included in a moving image in which a person 400 was taken with mountains in the background. In this example, an image taking person is taking an image by moving the lens of the camera to the right side and up. In this case, the person 400 included in the moving image taken by the camera moves from right to left and down in the images configuring that moving image.

Figure 10:
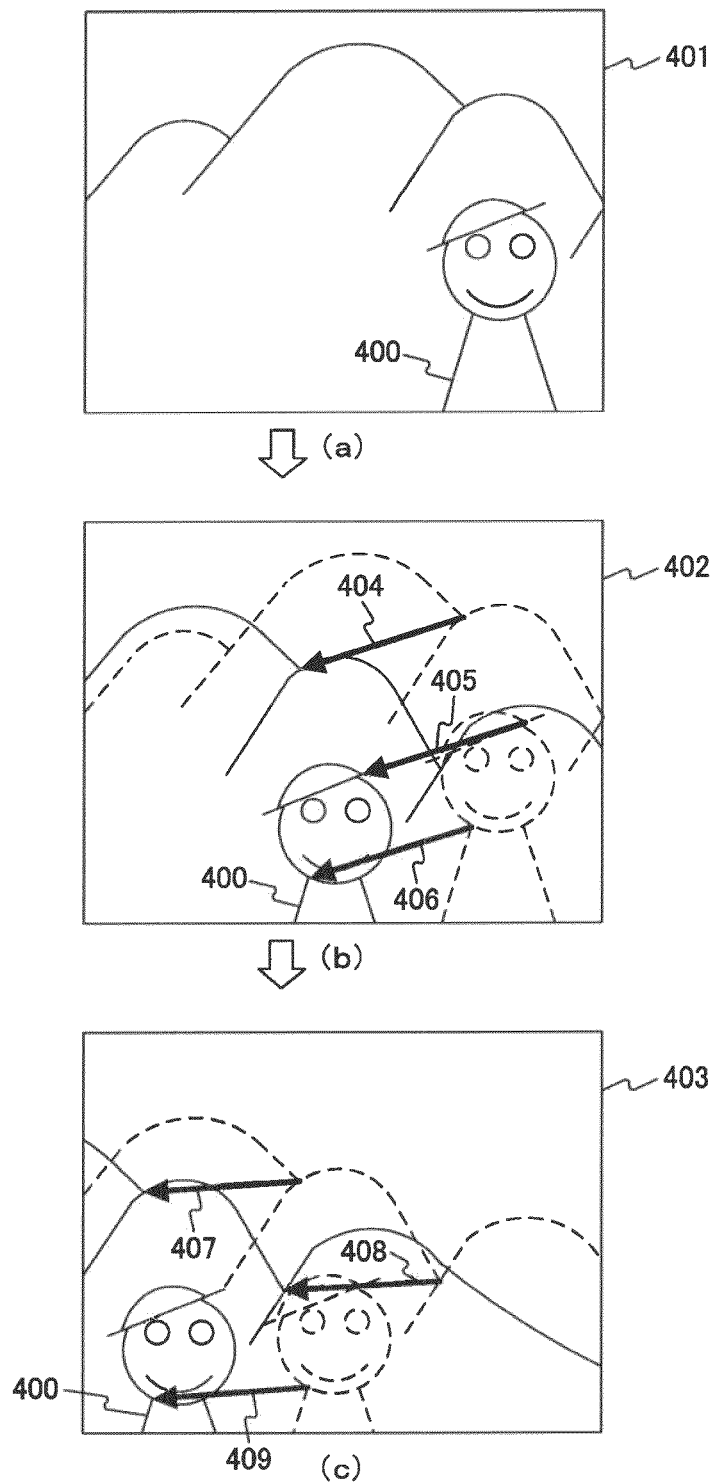
FIG. 10 shows diagrams illustrating an image corresponding to an immediately preceding frame in each image shown in FIG. 9 and shows one example of optical flows that is indicated by dashed lines.

FIG. 10 shows, dashed lines, the image corresponding to the immediately preceding frame in each image shown in FIG. 9 and one example of optical flows to be detected. The image 401 shown in FIG. 10(a) is the same as the image 401 shown in FIG. 9(a). The solid line portion of the image 402 shown in FIG. 10(b) is the same as that of the image 402 shown in FIG. 9(b) and the dashed line portion of the image 402 shown in FIG. 10(b) is the same as the solid line portion of the image 401 shown in FIG. 10(b). Arrows 404 through 406 in the image 402 shown in FIG. 10(b) are indicative of an example of optical flows detected from the image 402. Likewise, the solid line portion of the 403 shown in FIG. 10(c) is the same as that of the image 403 shown in FIG. 9(c) and the dashed line portion of the image 403 shown in FIG. 10(c) is the same as the solid line portion of the image 402 shown in FIG. 10(b). Arrows 407 through 409 in the image 403 shown in FIG. 10(c) are indicative of an example of optical flows detected from the image 403.

As shown in FIGS. 10(b) and (c), the person 400 and the background mountains included in the image move as the camera moves. On the basis of the optical flows detected by this movement, the affine transformation parameter can be obtained for each frame.

Figure 11:
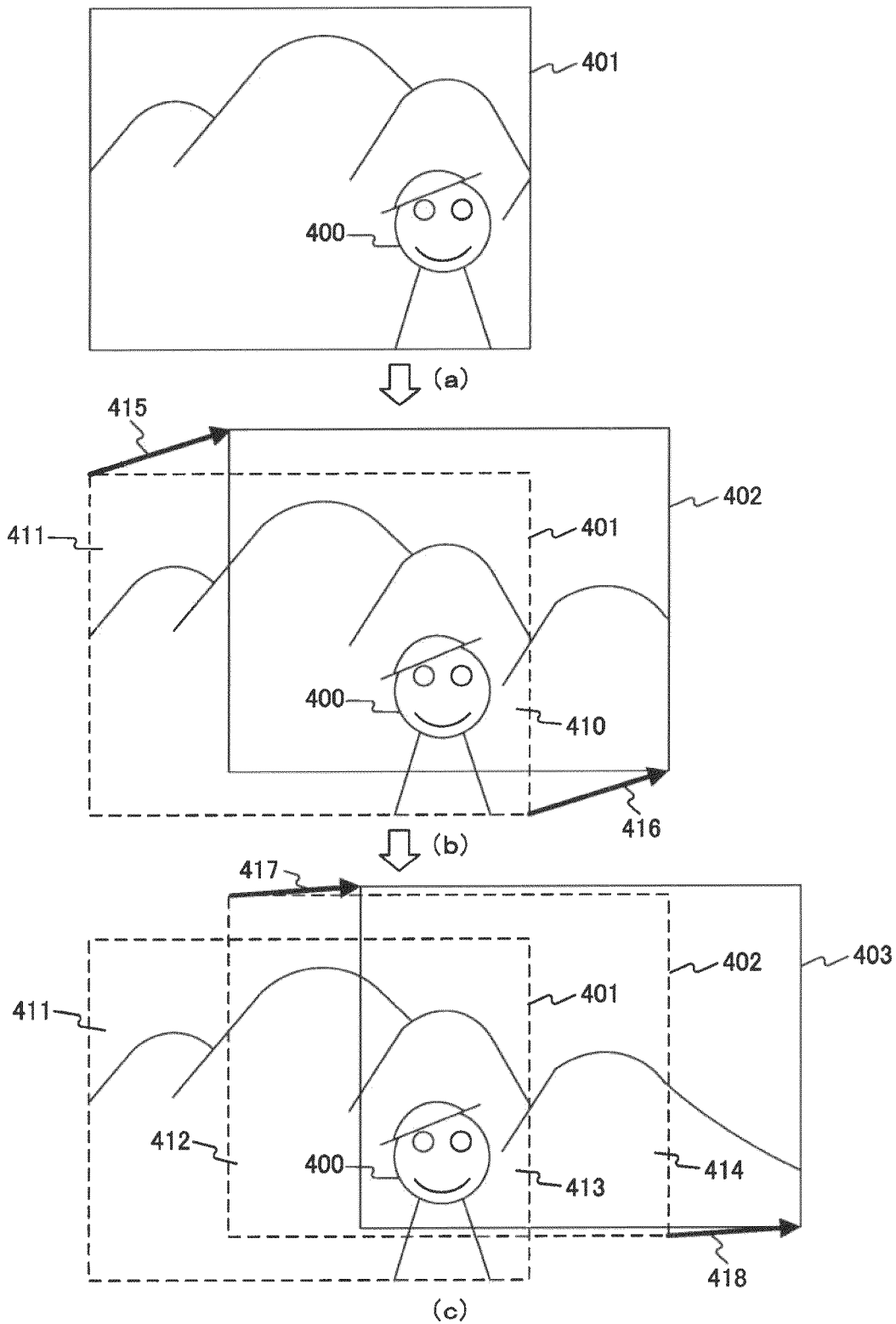
FIG. 11 shows diagrams illustrating an exemplary image synthesis in the synthesis of moving images including images 401 through 403 shown in FIG. 9.

FIG. 11 shows an exemplary image synthesis in the case where a moving image including the images 401 through 403 shown in FIG. 9 is synthesized.

As shown in FIG. 11(a), first synthesis is not executed because there is only the image 401 corresponding to the start frame. Here, let a matrix (a matrix of 3×3) of affine transformation parameters corresponding to the image 401 be A1, then the value of A1 is obtained and the image 401 is affine-transformed by the obtained A1 matrix with reference to the position and size of the image 401 of the start frame. It should be noted that, because A1 is unit matrix, the position and size of the image 401 are not converted. Next, if the image 402 corresponding to the next frame is synthesized, the image 402 is affine-transformed by use of the affine transformation parameters related with this frame. To be more specific, let the matrix of affine transformation parameters corresponding to the image 402 be A2 and the matrix of affine transformation parameters corresponding to the image 401 be A1, then the value of A2×A1 is obtained and the image 402 is affine-transformed by use of the obtained matrix of A2×A1 with reference to the position and size of the image 401 of the start frame. In the image shown in FIG. 11(b), only the position of the image 402 is converted. Then, the image 402 affine-transformed by the affine transformation parameter is written over the image 401 corresponding to the immediately preceding frame. Namely, of the areas of the image 401, the image of the image 402 is written over an area 410 that overlaps the image 402. Also, of the areas of the image 401, an area 411 that does not overlap the image 402 is synthesized with the image of image 401. Namely, if the image 402 corresponding to the second frame is synthesized, the whole portion of the image 402 is synthesized with a portion corresponding to the area 411 of the image 401 as shown in FIG. 11(b). Also, the affine transformation parameters used for affine-transforming the image 402 are held in the image conversion block 150.

Next, if the image 403 corresponding to the following frame is synthesized, the image 403 is affine-transformed by use of the affine transformation parameters related with this frame. Namely, the image 403 is affine-transformed by the affine transformation parameters obtained by use of the matrix of affine transformation parameters corresponding to the image 403 and the matrix of affine transformation parameters corresponding to the image 402 used for the immediately preceding affine transformation. To be more specific, let the matrix of affine transformation parameters for the image 403 be A3, the matrix of affine transformation parameters for the image 402 be A2, and the matrix of affine transformation parameters for the image 401 be A1, then A3×A2×A1 is obtained and the image 403 is affine-transformed by the obtained matrix A3×A2×A1 with reference to the position and size of the image 401 of the start frame. In the image shown in FIG. 11(c), only the position of the image 403 is converted. Then, the image 403 affine-transformed by affine transformation parameters is written over the synthesized image of the image 401 and the image 402 corresponding to the preceding frame. Namely, of the areas of the synthesized image of the image 401 and the image 402, areas 413 and 414 that overlap the image 403 are written over by the image of the image 403. Also, of the areas of the synthesized image of the image 401 and the image 402, areas 411 and 412 that do not overlap the image 403, the synthesized image of the image 401 and the image 402 is synthesized. Namely, if the image 403 corresponding to the third frame is synthesized, the whole portion of the image 403, a portion corresponding to the area 411 of the image 401, and a portion corresponding to the areas 412 of the image 402 are synthesized as shown in FIG. 11(c). Further, the affine transformation parameters used for affine-transforming the image 403 are held in the image conversion block 150. Namely, the affine transformation parameters obtained by multiplying the matrixes of the affine transformation parameters corresponding to the images 402 and 403 are held in the image conversion block 150. Thus, in the affine transformation of the image corresponding to the current frame, the image corresponding to the current frame is affine-transformed by use of the affine transformation parameters obtained by use of the matrix the affine transformation parameters corresponding to the current frame and the matrix of the affine transformation parameters corresponding to each frame before the immediately preceding frame. The affine transformation parameters obtained in this affine transformation are held in the image conversion block 150 to be used for a next affine transformation. Also, the values of the coordinates corresponding to the center position of the affine-transformed image in the work buffer of the image memory 180 and the image size indicative of the size of the image are recorded to the index information storage block 230. This holds the same with the examples shown in FIG. 14 and FIG. 17.

The following describes a case where magnifications are changed at the image taking by camera with the direction of the lens kept unmoved.

FIG. 12 shows one example of transitions of a moving image taken by camera. FIG. 12 shows images 421 through 423 corresponding to continuous frames included in the moving image in the case where a person 420 was taken with mountains in the background. In this example, an image taking person is taking an image while raising the magnification of the camera lens. In this case, the person 420 included in the moving image being taken by the camera grows in size in images configuring the moving image. It should be noted that, although the camera positions moves a little in raising magnification, this description is made without regard to the movement of camera position.

FIG. 13 shows images in dashed lines corresponding to the immediately preceding frame and shows optical flows to be detected, in each of the images shown in FIG. 12. An image 421 shown in FIG. 13(a) is the same as the image 421 shown in FIG. 12(a). A solid line portion of an image 422 shown in FIG. 13(b) is the same as that of the image 422 shown in FIG. 12(b), a dashed line portion of the image 422 shown in FIG. 13(b) is the same as that of the image 422 shown in FIG. 12(b), and a dashed line portion of the image 422 shown in FIG. 13(b) is the same as that of the image 421 shown in FIG. 12(a). Arrows 424 through 426 in the image 422 shown in FIG. 13(b) are indicative of one example of optical flows detected from the image 422. Likewise, a solid line portion of the image 423 shown in FIG. 13(c) is the same as that of the image 423 shown in FIG. 12(c) and a dashed line portion of the image 423 shown in FIG. 13(c) is the same as the solid line portion of the image 422 shown in FIG. 12(b). Arrows 427 through 429 in the image 423 shown in FIG. 13(c) are indicative of one example of optical flows detected from the image 423.

As shown in FIGS. 13(b) and (c), the sizes of the person 420 and the background mountains included in the image changes in accordance with a change in magnification. On the basis of optical flows to be detected by this change, affine transformation parameters can be obtained for each frame.

Figure 14:
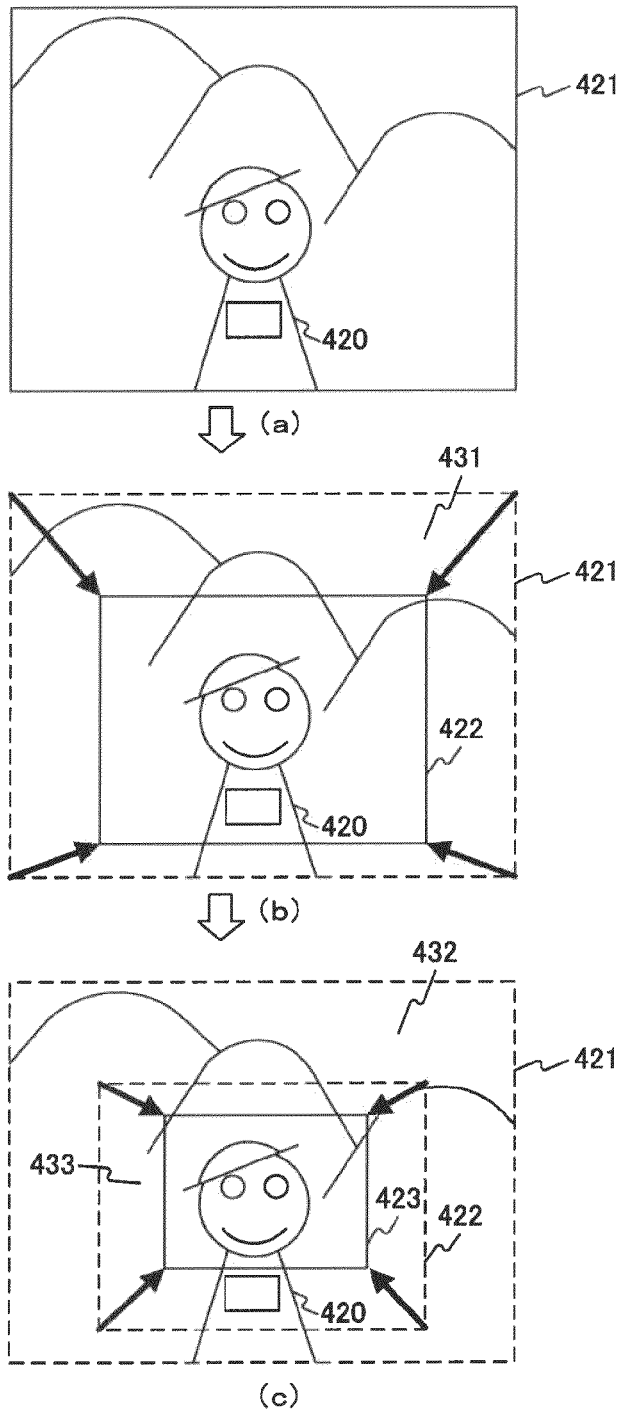
FIG. 14 shows diagrams illustrating an exemplary synthesis in the synthesis of moving images including images 421 through 423 shown in FIG. 12.

FIG. 14 shows an example of synthesis in the case where the image including the images 421 through 423 shown in FIG. 12 is synthesized.

As shown in FIG. 14(a), first, no synthesis is executed because there is only the image 421 corresponding to the start frame. Next, if the image 422 corresponding to the following frame is synthesized, the image 422 is affine-transformed by use of the affine transformation parameters related with this frame. In an image shown in FIG. 14(b), only the size of the image 422 is converted. Then, the image 422 affine-transformed by affine transformation parameters is written over the image 421 corresponding to the immediately preceding frame. Namely, of the areas of the image 421, an area overlapping the image 422 is overwritten with the image of the image 422. In this case, because the image 421 overlaps all areas of the image 422, so that the image 421 is overwritten with all images of the image 422. Also, of the areas of the image 421, an area 431 not overlapping the image 422 is synthesized with the image of image 421. Namely, if the image 422 corresponding to the second frame is synthesized, the whole portion of the image 422 and a portion corresponding to the area 431 of the image 421 are synthesized as shown in FIG. 14(b). Also, the affine transformation parameters used for affine-transforming the image 422 are held in the image conversion block 150.

Next, if the image 423 corresponding to the following frame is synthesized, the image 423 is affine-transformed by use of the affine transformation parameters related with this frame. Namely, the image 423 is affine-transformed by the affine transformation parameters obtained by use of the matrix of affine transformation parameters corresponding to the image 423 and the matrix of affine transformation parameters corresponding to the image 422 used for the immediately preceding affine transformation. In the image shown in FIG. 14(c), only the size of the image 423 is converted. Then, the affine-transformed image 423 is written over the synthesized image of the images 421 and 422 corresponding to the preceding frame. Namely, of the areas of the synthesized image of the images 421 and 422, an area overlapping the image 423 is overwritten with the image of image 423. In this case, the image 423 overlap all areas of images 421 and 422, so that the synthesis image of the images 421 and 422 is overwritten with all images of the image 423. Also, of the areas of the synthesis image of the images 421 and 422, the synthesis image of the images 421 and 422 are synthesized for the areas 432 and 433 not overlapping the image 423. Namely, if the image 423 corresponding to the third frame is synthesized, the whole portion of the image 423, a portion corresponding to the area 432 of the image 421, and a portion corresponding to the area 433 of the image 422 are synthesized as shown in FIG. 14(c). Also, the affine transformation parameters used for affine-transforming the image 423 are held in the image conversion block 150. Namely, the affine transformation parameters obtained by use of the affine transformation parameters each of the images 422 and 423 are held in the image conversion block 150.

The following describes a case in which a camera is rotated around the image taking direction at the time of image taking by the camera with the camera lens direction and magnification kept unchanged.

FIG. 15 shows one example of transitions of moving images taken by the camera. FIG. 15 shows images 441 through 443 corresponding to continuous frames included in the moving image in the case where a person 440 was taken with mountains in the background. In this example, an image taking person is taking an image while rotating the camera around the image taking direction. In this case, the person 440 included in the moving image taken by the camera rotates in the images configuring that moving image. It should be noted that, although the camera positions moves a little by camera rotation, this description is made without regard to the movement of camera position.

FIG. 16 shows images corresponding to the immediately preceding frame by dashed lines in each of the images shown in FIG. 15 and shows one example of optical flows to be detected. An image 441 shown in FIG. 16(a) is the same as the image 441 shown in FIG. 15(a). Also, a solid line portion of an image 442 shown in FIG. 16(b) is the same as that of the image 442 shown in FIG. 15(b) and a dashed line portion of the 442 shown in FIG. 16(b) is the same as the solid line portion of the image 441 shown in FIG. 15(a). Also, arrows 444 through 446 shown in FIG. 16(b) are indicative of optical flows detected from the image 442. Likewise, a solid line portion of the image 443 shown in FIG. 16(c) is the same as that of the image 443 shown in FIG. 15(c) and a dashed line portion of the image 443 shown in FIG. 16(c) is the same as the solid line portion of the image 442 shown in FIG. 15(b). Arrows 447 through 449 in the image 443 shown in FIG. 16(c) are indicative of one example of optical flows detected from the image 443.

As shown in FIGS. 16(b) and (c), the person 440 and the mountains in the background included in the image rotatively move as the camera rotates. On the basis of optical flows detected by this rotational movement, affine transformation parameters can be obtained for each frame.

Figure 17:
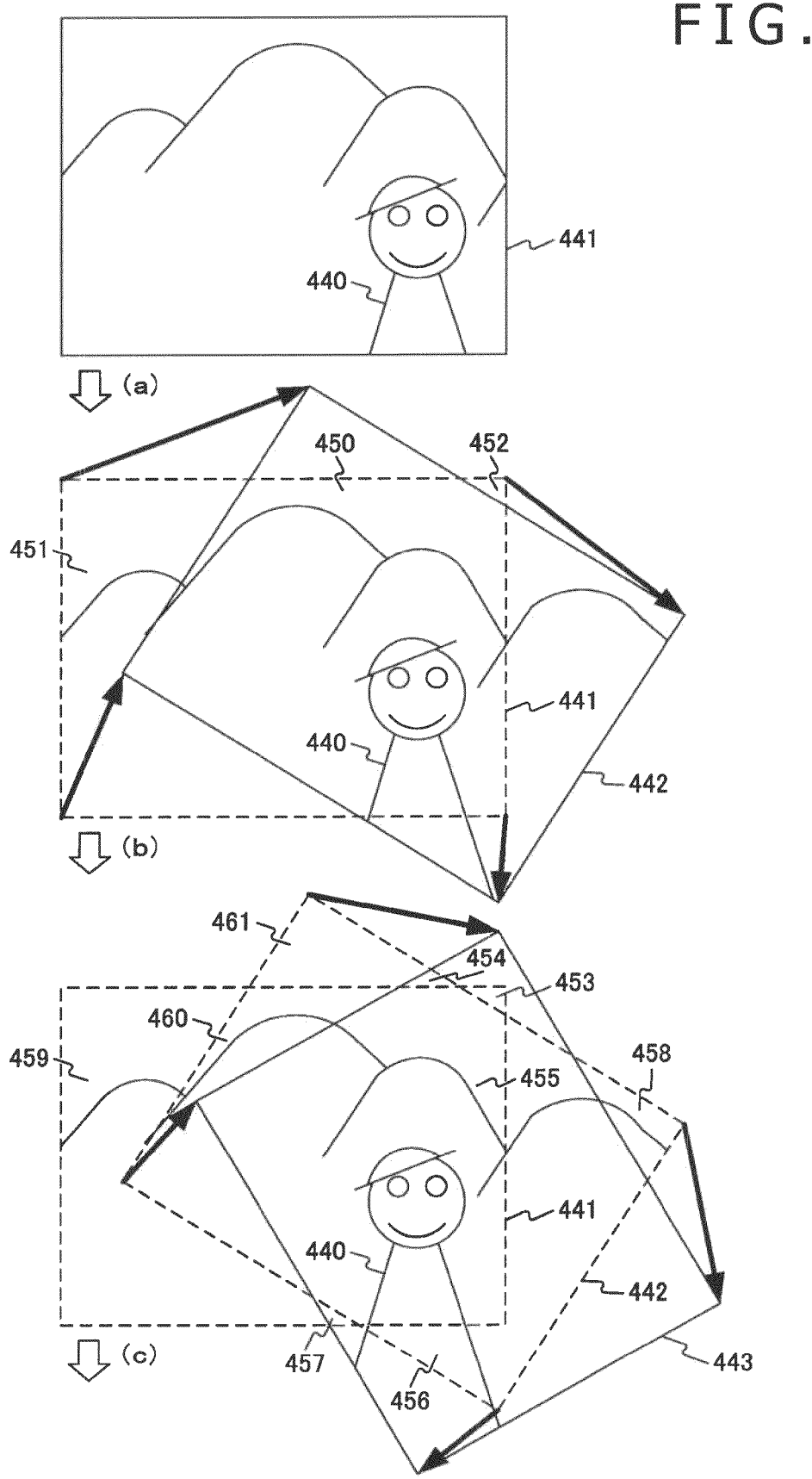
FIG. 17 shows diagrams illustrating an exemplary synthesis in the synthesis of images including images 441 through 443 shown in FIG. 15.

FIG. 17 shows an example of synthesis in the case where a moving image including the images 441 through 443 shown in FIG. 15 is synthesized.

As shown in FIG. 17(a), first, no synthesis is executed because there is only the image 441 corresponding to the start frame. Next, if the image 442 corresponding to the following frame is synthesized, the image 442 is affine-transformed by use of the affine transformation parameters related with this frame. In an image shown in FIG. 17(b), only the angle of the image 442 is converted. Then, the image 442 affine-transformed by affine transformation parameters is written over the image 441 corresponding to the immediately preceding frame. Namely, of the areas of the image 441, an area 450 overlapping the image 442 is overwritten with the image of the image 442. Also, of the areas of image 441, the areas 451 and 452 not overlapping the image 442 are synthesized with the image of the image 441. Namely, if the image 442 corresponding to the second frame is displayed, the whole portion of the image 442 and portions corresponding to the areas 451 and 452 of the image 441 are synthesized as shown in FIG. 17(b). Also, the affine transformation parameters used for affine-transforming the image 442 are held in the image conversion block 150.

Next, if the image 443 corresponding to the following frame is synthesized, the image 443 is affine-transformed by use of the affine transformation parameters related with this frame. Namely, the image 443 is affine-transformed by the affine transformation parameters obtained by use of the matrix of affine transformation parameters corresponding to the image 443 and the matrix of affine transformation parameters corresponding to the image 442 used for the immediately preceding affine transformation. In the image shown in FIG. 17(c), only the angle of the image 443 is converted. Then, the affine-transformed image 443 is written over the synthesized image of the images 441 and 442 corresponding to the preceding frame. Namely, of the areas of the synthesized image of the images 441 and 442, the areas 453 through 457 overlapping the image 443 are overwritten with the image of image 443. Also, of the areas of the synthesized image of the images 441 and 442, the areas 458 through 461 not overlapping the image 443 are further synthesized with the synthesized image of the images 441 and 442. Namely, if the image 443 corresponding to the third frame is synthesized, the whole portion of the image 443, a portion corresponding to the area 459 of the image 441, and portions corresponding to the areas 458, 460, and 461 of the image 442 are synthesized as shown in FIG. 17(c). Also, the affine transformation parameters used for affine-transforming the image 443 are held in the image conversion block 150. Namely, the affine transformation parameters obtained by use of the affine transformation parameters for each of the images 442 and 443 are held in the image conversion block 150.

So far, cases have been described in which the positions, magnifications, and angles of each of the images configuring a moving image are sequentially changed; it holds the same with a case in which these changes are combined.

The following shows an example of synthesis in which moving images actually taken by a camera are synthesized. In image synthesis examples shown below, a synthesized image is displayed only in an area in which images corresponding to a current frame and a preceding frame are synthesized and other areas are indicated black. An image corresponding to a current frame is framed. Further, in the image synthesis examples shown below, synthesized images being created are shown. With reference to FIGS. 18 through 21, examples in which images are synthesized in the direction from the start frame to the last frame that configure a moving image will be described.

FIG. 18 through FIG. 21 show an example of transitions of a moving image taken by the camera. FIG. 18 and FIG. 19 show images 500 through 505 configuring a moving image in which a parent and a child playing in a an open space of a condominium were taken with the camera moving.

In the images 500 through 505 shown in FIG. 18 and FIG. 19, the images corresponding to the current frame are images 506 through 511. Also, synthesized images that are images synthesized in correspondence with each preceding frame are images 512 through 517. As shown in FIG. 18 and FIG. 19, subjects of image taking (the open space of the condominium and so on) included in the taken images are fixed on the screen and the images 506 through 511 corresponding to the current frame move on the screen in match with the movement of the camera.

FIG. 20 and FIG. 21 show images 520 through 525 corresponding to a frame configuring a moving image in the case where the parent and the child playing in the open space of the condominium were taken while performing a zoon-in operation.

In the images 520 through 525 shown in FIG. 20 and FIG. 21, the images corresponding to the current frame are images 526 through 531. Also, synthesized images that are images synthesized in correspondence with each preceding frame are images 532 through 537. As shown in FIG. 20 and FIG. 21, subjects of image taking (the open space of the condominium and so on) included in the taken images are fixed on the screen and the images 526 through 531 corresponding to the current frame move on the screen in match with the movement of the camera.

Thus, in the image synthesis example shown in FIG. 18 through 21, a wide image is created by moving, on the display, the images corresponding to the current frame that are zoomed-in or zoomed-out. It should be noted that, in the above, examples have been described in which a synthesized image is created by repeating the image synthesis processing in the direction from the start frame to the end frame that configure a moving image; it is also practicable to create a synthesized image by repeating the image synthesis processing in the direction from the end frame to the start frame that configure a moving image. Thus, in repeating the image synthesis processing in the direction from the end frame to the start frame configuring a moving image, affine transformation is executed by use of not the matrix of affine transformation parameters related to each frame but the inverse matrix to the matrix of affine transformation parameters related to each frame.

The following describes in detail an image transparency conversion method of converting transparency of an image affine-transformed by the image conversion block 150 with reference to drawings.

Figure 22:
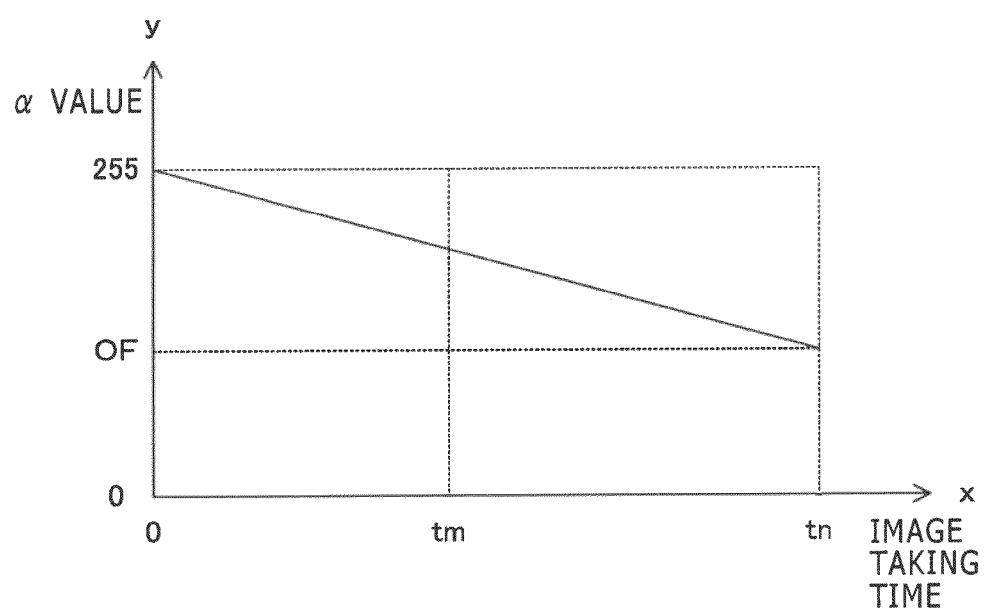
FIG. 22 is a graph showing a relation between an α value (alpha value) for use in changing the transparency of an image affine-transformed by an image conversion block 150 and image taking time.

FIG. 22 is a diagram illustrating a relation between a value (alpha value) for use in changing transparencies of an image affine-transformed by the image conversion block 150 and an image taking time. Here, α value is a numeric value indicative of transparency that changes the transparency of RGB (Red, Green, Blue) within a range of 0 to 255. For example, if the maximum value 255 is set, a subject image is opaque; as the numeric value becomes smaller, the transparency of the subject image increases. Then, if 0 is set for a value, the subject image becomes completely transparent. Namely, in the case of changing the transparency of an image, the transparency of the image can be changed to a desired level by changing the α values. In this example, image synthesis is described in which, in repeating image synthesis processing in the direction from the end frame to the start frame configuring a moving image, the transparency of an image taken earlier is increased while the transparency of an image taken later is decreased. It should be noted that it is also practicable to synthesize an image by increasing the transparency of an image taken later and decreasing the transparency of an image taken earlier. An image taking time is identified in accordance with frames configuring a moving image.

In the graph shown in the above-mentioned figure, x-axis is an axis indicative of image taking time and y-axis is an axis indicative of numeric value of α value. Here, assume that the image taking time of the start frame is t0 (=0), the image taking time of the end frame is tn, and the image taking time of the frame subjected to transparency change is tm, then α value indicative of transparency is defined by an equation below.

$$\alpha = (OF - 255)/tn \times tm + 255$$

where, OF is an offset component for preventing an image from becoming completely transparent. This transparency change is sequentially executed for each frame by the transparency conversion block 160. Examples of panorama images created with transparency thus changed are shown in FIG. 23 and FIG. 24.

Figure 24:
FIG. 24 shows a diagram illustrating one example of a panorama image synthesized by the image synthesis block 170.

FIG. 23 and FIG. 24 show examples of panorama images synthesized by the image synthesis block 170. The panorama images shown in FIG. 23 and FIG. 24 are panorama images obtained by synthesizing images by increasing the transparency of an image taken earlier and decreasing the transparency of an image taken later in the repetition of the image synthesis processing in the direction from the end frame to the start frame configuring a moving image.

The panorama image shown in FIG. 23(a) is a panorama image created from a moving image taken on the street by panning the camera horizontally. The moving image corresponding to the panorama image shown in the figure is high in transparency on the left and lower in transparency toward the right. Hence, it can be easily recognized that the left side in the figure is earlier in image taking and the right side is later in image taking.

The panorama image shown in FIG. 23(b) is a panorama image created from a moving image taken in a wedding hall by panning the camera horizontally. The moving image corresponding to the panorama image shown in the figure is high in transparency on the right and lower in transparency toward the left. Hence, it can be easily recognized that the right side in the figure is earlier in image taking and the left side is later in image taking.

The panorama image shown in FIG. 24 is a panorama image created from a moving image taken on a mountain by panning the camera horizontally. With the moving image corresponding to the panorama image shown in the figure, the transparency on the left side is low and the transparency in a part of the right side is also low because the horizontal panning was repeated several times. Thus, the contents of the moving image corresponding to a panorama image can be easily understood and the space in which the moving image was taken can be quickly understood. In addition, changing transparencies in accordance with image taking time allows the easy visual recognition of image taking times at which the images displayed on a panorama image were recorded. In these examples, the changing of transparencies in accordance with image taking time has been described; it is also practicable to change image color information in accordance with image taking time by use of other methods. For example, contrast in monochrome or sepia may be changed in accordance with image taking time. For example, a method to decrease resolution from the start frame toward the last frame or to change from color to monochrome, or the like methods may be also practicable. In addition, for example, it is also practicable not only to change the color information of the subject image but also to make a change for the subject image by using the other method in accordance with the image taking time. For example, the image corresponding to frames at a predetermined interval may be framed to change the types (for example, color, thickness, transmissivity) of this frame in accordance with a value. It should be noted that an example in which an index image is framed to be displayed will be detailed with reference to FIG. 44.

The following describes in detail an index image extraction method of extracting an index image with reference to drawings.

Figure 25:
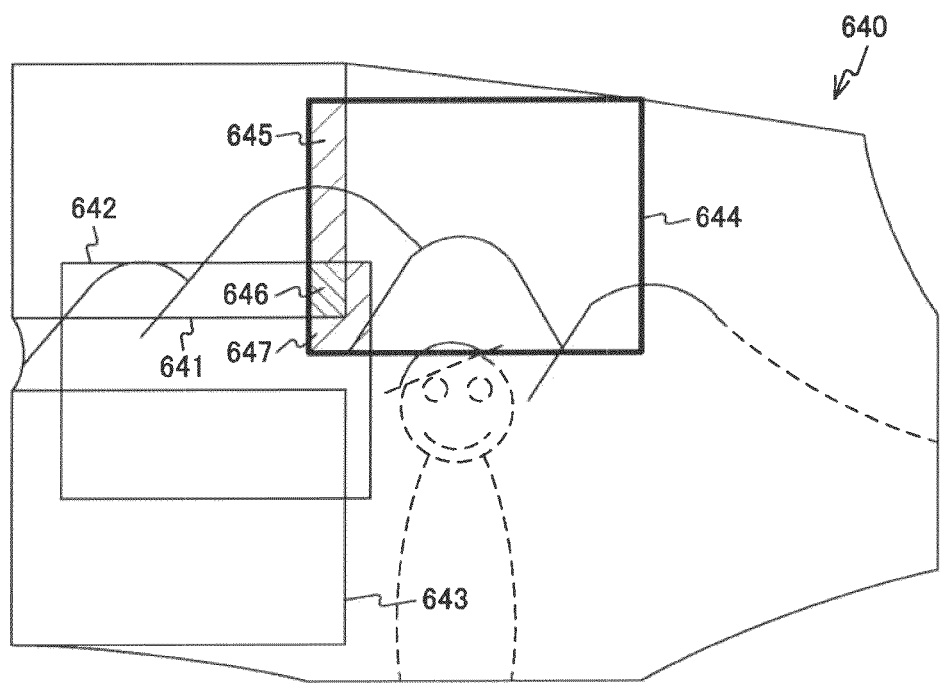
FIG. 25 shows a diagram schematically illustrating one example of an extracting method in the case where an index image is extracted in the embodiment of the present invention.

FIG. 25 shows an overview of an example of an extraction method for use in extracting an index image in the embodiment of the present invention. A synthesized image 640 shown in FIG. 25 is the simplified presentation of a synthesized image halfway in the creation by the image synthesis block 170. In this example, it is assumed that, in the synthesized image 640, images 641 through 643 have been extracted as index images.

Extraction of an index image is determined on the basis of an overlap ratio between an index image (an image already extracted as an index image) stored in the index information storage block 230 and an image corresponding to an affine-transformed current frame. To be more specific, an overlap ratio is computed between an index image (an image already extracted as an index image) stored in the index information storage block 230 and an image corresponding to an affine-transformed current frame. For example, it is assumed that an image 644 shown in FIG. 25 be an image corresponding to an affine-transformed current frame. In this case, an overlap ratio between the image 644 and the images 641 through 643 that are index images is computed. The image 644 is an area in which an overlap area 645 with only the image 641, an overlap area 646 with the images 641 and 642, and an overlap area 647 with the only the image 642 overlap the images 641 through 643. In FIG. 25, the overlap areas 645 through 647 are indicated by hatching. Then, the areas of the overlap areas 645 through 647 are added and a comparison is made between an added area (a total area of the overlap areas 645 through 647) value and a preset threshold value; if a value of overlap ratio that is a ratio of a total area of the overlap areas 645 through 647 to an area of the entire image 644 is found to be below the threshold value, it indicates that this image is an image that is low in overlapping with other index images. Thus, an image low in overlapping with other index images is extracted as an index image. Then, the frame number corresponding to the extracted index image, the value of coordinates corresponding to four apexes of the index image, and the index image are stored in the index information storage block 230 as related with a moving image ID.

Thus, when an index image has been extracted, the index image extraction block 190 outputs information that the image corresponding to the current frame is an index image to the given interval moving image audio information extraction block 250. In the embodiment of the present invention, an example is described in which a new index image is extracted on the basis of an overlap ratio between all images already extracted as index images and the image corresponding to the affine-transformed current frame; for example, a new index image may be extracted on the basis of an overlap ratio between one or the predetermined number of index images extracted immediately before and the image corresponding to the affine-transformed current frame. Thus, by use of one or the predetermined number of index images extracted immediately before as the object of comparison, an image comparatively early in image taking time and an image comparatively later in image taking time can be extracted as index images from the images existing comparatively near position on the image-taking space.

It should be noted that an index image marker indicative that the image corresponding to the current frame is an index image may be attached around the image corresponding to the current frame in a synthesized image to be synthesized by the image synthesis block 170. For example, as shown in FIG. 25, an image 644 in the synthesized image 640 may be thickly framed. It should be noted that, if two or more index images overlap, an index image marker latest in image taking time may be written over another index image marker. For example, the index image marker of the image 644 is written over the index image markers of index images 641 through 643. Alternatively, for example, the index image marker of each index image may be drawn on different image layers without overwriting, so that each index image marker is displayed on a panorama image.

The following describes in detail a panorama image arrangement position decision method for use in list displaying panorama images stored in the panorama image storage block 240 on the display block 292 with reference to drawings.

FIG. 26 schematically shows a display screen in the display block 292 on which a panorama image arrangement area for displaying a list of panorama images and the list of panorama images. As shown in FIG. 26(a), if a list of panorama images is displayed on the display block 292, a panorama image arrangement area 550 in which a panorama image to be displayed is arranged is set and each panorama image is arranged in the panorama image arrangement area 550. Also, if panorama images arranged in the panorama image arrangement area 550 are displayed on the display block 292, the panorama images included in a display subject area 551 on the panorama image arrangement area 550 are displayed.

FIG. 26(b) shows an example of a display screen in the case where a list of panorama images is displayed on the display block 292. It should be noted that, in the figure, the display of panorama images is omitted. A display screen 560 shown in the figure includes a panorama image list display areas 561 for displaying a list of panorama images, a zoom-in/zoom-out bar 562, an up/down scroll bar 563, and a left/right scroll bar 564. Each bar can be operated to move by means of a cursor operated with a mouse on the operation acceptance block 280, for example.

The panorama image list display area 561 is an area in which panorama images included in the display subject area 551 shown in FIG. 26(a) are displayed. Sliding the up/down scroll bar 563 or the left/right scroll bar 564 allows the moving of the display subject area 551, changing panorama images to be displayed in the panorama image list display area 561 in accordance with the movement of the display subject area 551. Also, sliding the zoom-in/zoom-out scroll bar 562 allows changes the size of a panorama image displayed in the panorama image list display area 561. Thus, when the size of a panorama image is changed by sliding the zoom-in/zoom-out scroll bar 562, the arrangement of the panorama image is changed and each panorama image after the change of arrangement is redisplayed in the panorama image list display area 561.

The zoom-in/zoom-out scroll bar 562 is used to change the size of a panorama image to be displayed in the panorama image list display area 561. For example, in order to zoom-out the size of a panorama image to be displayed in the panorama image list display area 561, the zoom-in/zoom-out scroll bar 562 is slid to the left side. In order to zoom-in the size of a panorama image to be displayed in the panorama image list display area 561, the zoom-in/zoom-out scroll bar 562 is slid to the right side.

The up/down scroll bar 563 is a scroll bar for moving up/down a panorama image to be displayed in the panorama image list display area 561. Namely, the display subject area 551 shown in FIG. 26(a) is moved up or down in accordance with the up/down movement of the up/down scroll bar 563.

The left/right scroll bar 564 is a scroll bar for moving a panorama image to be displayed in the panorama image list display area 561 to the left or right side. Namely, the display subject area 551 shown in FIG. 26(a) is moved to the left or right side in accordance with the left/right movement of the left/right scroll bar 564.

Figure 27:
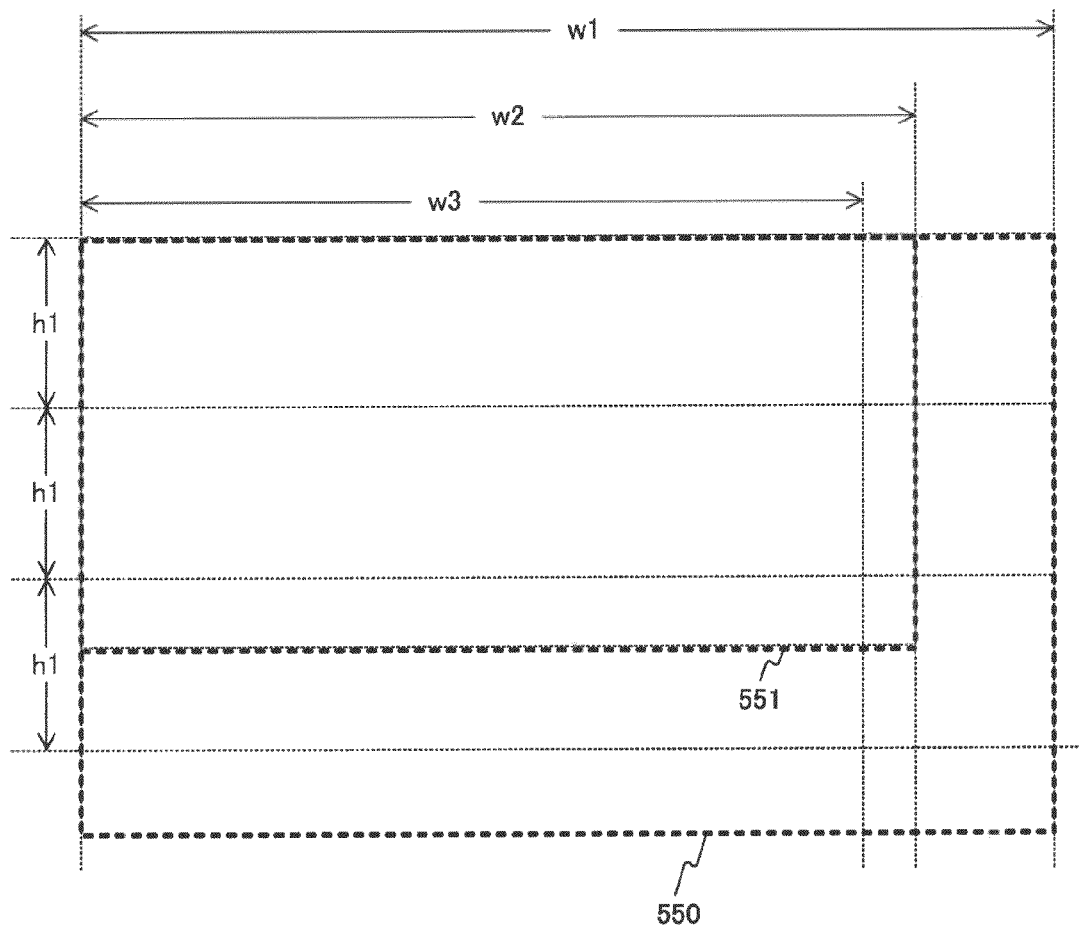
FIG. 27 is a diagram schematically illustrating a panorama image arrangement area 550 in the case where each panorama image with vertical width aligned.

FIG. 27 schematically shows a panorama image arrangement area 550 in the case where panorama images are arranged with vertical width aligned. This panorama image arrangement area 550 is the same as the panorama image arrangement area 550 shown in FIG. 26(a), to which maximum horizontal width threshold value w1, horizontal width threshold value w2, line-feed threshold value w3, and vertical width h1 for use in arranging panorama images with vertical width aligned are set. Maximum horizontal width threshold value w1, horizontal width threshold value w2 and line-feed threshold value w3 are threshold values for use in determining a position at which to arrange each panorama image.

Maximum horizontal width threshold w1 is the same in value as the horizontal width of the panorama image arrangement area 550 and, in arranging panorama images on a same row, provides a threshold value for specifying a total value of the horizontal widths of panorama images that can be arranged on a same row.

Horizontal width threshold value w2 is the same in value as the horizontal width of the display subject area 551 and, in arranging panorama images on a same row, provides a threshold value for use in determining whether or not to arrange panorama images on a same row.

Line-feed threshold value w3 is a value smaller than the horizontal width of the display subject area 551 and, in arranging panorama images on a same row, provides a threshold value for use in determining whether or not to change rows on which panorama images are to be arranged. It should be noted that these threshold values will be detailed with reference to FIG. 29 and FIG. 30. Here, vertical width h1 is a length providing a reference in the case where each panorama image to be arranged in the panorama image arrangement area 550 is zoomed out or zoomed in; a same value is set for each.

Figure 28:
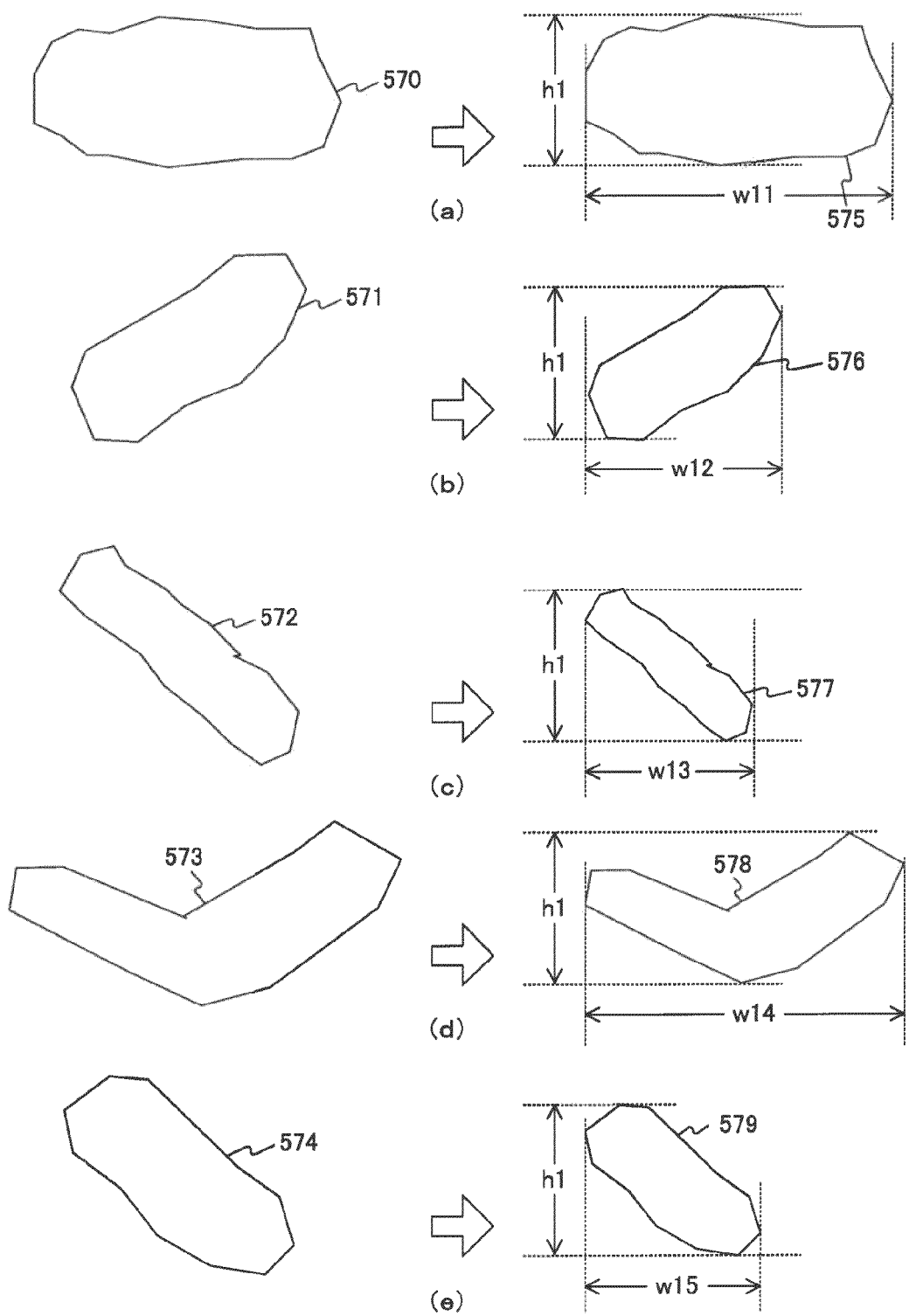
FIG. 28 shows diagrams schematically illustrating panorama images stored in a panorama image storage block 240 and panorama images obtained by reducing or enlarging these panorama images.

FIG. 28 schematically shows panorama images stored in the panorama image storage block 240 and displays these panorama images as each panorama image zoomed out or zoomed in with a ratio of vertical width and horizontal width kept constant in match with the vertical width of vertical width h1 shown in FIG. 27. As shown in this figure, with the panorama images 570 through 574 that are created by the image synthesis block 170, the ratio of vertical width (length in up/down direction) and horizontal width (length in left/right direction) is not constant in many cases. For example, if a taken moving image is recorded while the user moves the camera in the horizontal direction, a panorama image long in horizontal width and short in vertical width is created. However, if the camera attitude is changed by the user in various ways, a panorama image other than a panorama image that is long in horizontal width and short in vertical width. Therefore, in what follows, an example will be described in which the panorama images 570 through 574 are arranged in the panorama image arrangement area 550 after matching the vertical widths of the panorama images 570 through 574 having various shapes.

As shown in the figure, the panorama images 570 through 574 are zoomed out or zoomed in match with the vertical width of vertical width h1 to create panorama images 575 through 579. Then, the horizontal width of each panorama image after zoom-out or zoom-in is computed on the basis of both ends in the left/right direction of the panorama images 575 through 579. For example, let the horizontal widths of the panorama images 575 through 579 be horizontal widths w11 through w15.

FIG. 29 and FIG. 30 show examples of arrangement in the case where the panorama images 575 through 579 are arranged in the panorama image arrangement area 550 shown in FIG. 27. If the panorama images 575 through 579 are arranged in the panorama image arrangement area 550, the panorama images 575 through 579 are sequentially selected one by one and the selected panorama images are arranged on each row of the panorama image arrangement area 550, from the left end sequentially. In this case, the arrangement is made from the top row sequentially; on which row the arrangement is made is dependent on maximum horizontal width threshold value w1, horizontal width threshold value w2, and line-feed threshold value w3 of each panorama image.

For example, a subject panorama image that is one panorama image as a subject of arrangement position determination is arranged on the right side of the panorama image arranged at the left end of the panorama images arranged on the top row, and it is determined whether or not a total value of the horizontal widths of the panorama images including the subject image arranged on the top row is in excess of horizontal width threshold value w2. If the total value of the horizontal widths of the panorama images arranged on this same row is found to be not in excess of horizontal threshold value w2, then this position is determined to be arrangement position of the subject panorama image. On the other hand, if the total value of the horizontal widths of the panorama images arranged on this same row is found to be in excess of horizontal threshold value w2, then it is determined whether or not the total value is to be in excess of maximum horizontal width threshold value w1. If the total value is found to be in excess of maximum horizontal width threshold value w1, the arrangement position of the subject panorama image is changed down to the next row of the currently arranged row. On the other hand, if the total value is found to be not in excess of maximum horizontal width threshold value w1, it is determined whether a total value of the horizontal widths of the panorama images arranged to the left side of the subject panorama image is in excess of line-feed threshold value w3 or not. If the total value of the horizontal widths of the panorama images arranged to the left side of the subject panorama image is found to be not in excess of line-feed threshold value w3, then this position is determined to be the arrangement position of the subject panorama image. On the other hand, if the total value of the horizontal widths of the panorama images arranged on the left of the subject panorama image is found to be in excess of line-feed threshold value w3, then the arrangement position of the subject panorama image is changed down to the next row of the currently arranged row. Then, if the arrangement position of the subject panorama image has been changed down to the next row of the currently arranged row, the subject panorama image is arranged to the right side of the panorama image arranged on the left end of the row after change and the processing similar to the processing described above is executed, thereby sequentially determining the arrangement positions of the subject panorama image.

For example, the following describes a case in which the subject panorama images have been selected in the order of panorama images 575 through 579. In this case, as shown in FIG. 29(*a*), the panorama images 575 through 577 are sequentially arranged on the top row. Here, if the panorama image 578 is arranged to the right side of the panorama image 577 in the panorama image arrangement area 550, the right end of the panorama image 578 is in excess of maximum horizontal width threshold value w1 and horizontal width threshold value w2. Hence, the arrangement position of the panorama image 578 is changed down to the next row. If the change has been made as described above, the similar determination of arrangement position is executed on the row after change. Next, if the panorama image 579 is arranged to the right side of the panorama image 577 in the panorama image arrangement area 550, the right end of the panorama image 579 is in excess of horizontal width threshold value w2 but not in excess of maximum horizontal width threshold value w1. Further, a total value of the horizontal widths of the panorama images 575 through 577 arranged to the left side of the panorama image 579 is not in excess of line-feed threshold value w3. Hence, the position to the right side of the panorama image 577 in the panorama image arrangement area 550 is determined as the arrangement position of the panorama image 579. Namely, the arrangement position is determined as shown in FIG. 29(*b*).

The following describes a case in which subject panorama images are sequentially selected in the order of the panorama images 575, 578, 577, 576, and 579, for example. In this case, as shown in FIG. 30(*a*), the panorama images 575 and 578 are sequentially arranged on the top row. Here, if the panorama image 577 is arranged to the right side of the panorama image 578 in the panorama image arrangement area 550, the right end of the panorama image 577 is in excess of horizontal width threshold value w2 but not in excess of maximum horizontal width threshold value w1. In this case, it is determined whether or not a total value of the horizontal widths of the panorama images 575 and 578 arranged to the left side of the panorama image 577 is in excess of line-feed threshold value w3. In this case, the total value of the horizontal widths of the panorama images 575 and 578 arranged on the left of the panorama image 577 is not in excess of line-feed threshold value w3, so that this position is determined as the arrangement position of the panorama image 579. It should be noted that, for the panorama images 576 and 579, the right end of the top is in excess of maximum horizontal width threshold value w1 and horizontal width threshold value w2, so that the arrangement position of the panorama image 578 is changed down to the next row for sequential arrangement. Namely, the arrangement position is determined as shown in FIG. 30(*a*).

Further, the following describes a case in which the subject panorama images are sequentially selected in the order of the panorama images 578, 576, 579, 577, and 575. In this case, as shown in FIG. 30(*b*), the panorama images 578 and 576 are sequentially arranged on the top row. Here, if the panorama image 579 is arranged to the right side of the panorama image 576 in the panorama image arrangement area 550, the right end of the panorama image 579 is not in excess of horizontal width threshold value w2, so that this position is determined as the arrangement position of the panorama image 579. Next, if the panorama image 577 is arranged to the right side of the panorama image 579 in the panorama image arrangement area 550, the right end of the panorama image 577 is in excess of horizontal width threshold value w2 but not in excess of maximum horizontal width threshold value w1. In this case, it is determined whether or not a total value of the horizontal widths of the panorama images 578, 576, and 579 arranged on the left of the panorama image 577 is in excess of line-feed threshold value w3. In this case, the total value of the horizontal widths of the panorama images 578, 576, and 579 arranged on the left of the panorama image 577 is in excess of line-feed threshold value w3, so that the arrangement position of the panorama image 577 is changed down to the next row for sequential arrangement. If the panorama image 575 is arranged to the right side of the panorama image 579 in the panorama image arrangement area 550, the right end of the panorama image 575 is in excess of maximum horizontal width threshold value w1 and horizontal width threshold value w2, so that the arrangement position of the panorama image 575 is changed down to the next row. Namely, the arrangement position is determined as shown in FIG. 30(b).

Thus, the row on which each subject panorama image is arranged is determined by use of maximum horizontal width threshold value w1, horizontal width threshold value w2, and line-feed threshold value w3, so that, if each panorama image is displayed in the panorama image list display area 561 on the display block 292, at least a part of the panorama image at the right side on the same row. This configuration can enhance the listing capability.

The following describes in detail an arrangement position determination method in the case where panorama images are arranged without changing the sizes of panorama images with reference to drawings.

Figure 31:
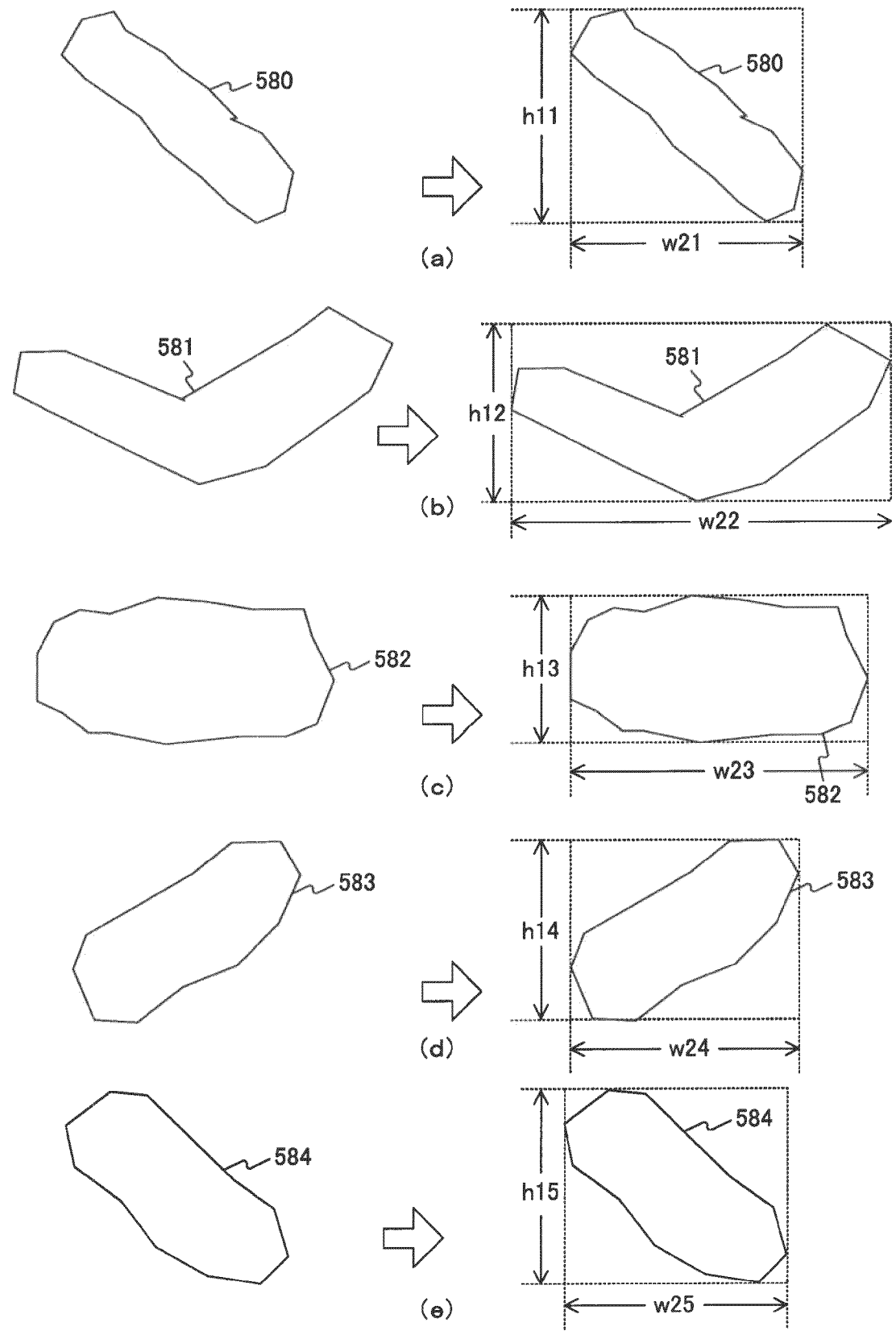
FIG. 31 shows diagrams illustrating arrangement examples in the case where panorama images 580 through 584 are arranged in the panorama image arrangement area 550.

FIG. 31 schematically shows panorama images stored in the panorama image storage block 240 and shows the vertical widths and the horizontal width of these panorama images. As shown in the figure, for panorama images 580 through 584 having various shapes, horizontal width w21 through w25 and vertical widths h11 through h15 are computed. Also, the following arrangement positions are determined by use of the four apexes of rectangles (indicated by dotted lines) formed by the panorama images 580 through 584.

Figure 33:
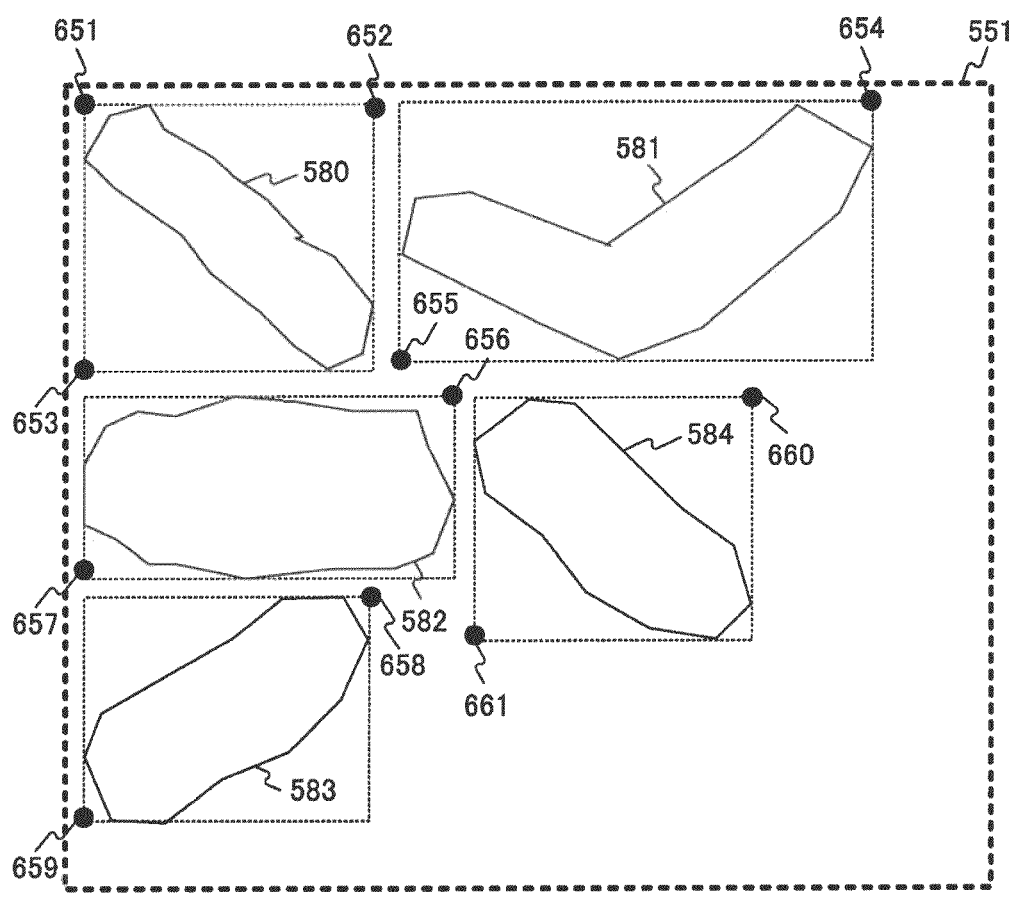
FIG. 33 shows diagrams illustrating arrangement examples in the case where panorama images 580 through 584 are arranged in the panorama image arrangement area 550.

FIG. 32 and FIG. 33 are diagrams showing examples of arrangement in which the panorama images 580 through 584 are arranged in the panorama image arrangement area 550 shown in FIG. 26(a). These examples describe the arrangement in which all of the panorama images are displayed in the display subject area 551 in the panorama image arrangement area 550.

If the panorama images 580 through 584 are arranged in the panorama image arrangement area 550, one of the panorama image is selected from the panorama images 580 through 584 and the selected panorama image is sequentially arranged from the upper left corner of the panorama image arrangement area 550. Thus, if at least one panorama image is arranged in the panorama image arrangement area 550, an arrangement position candidate for each panorama image to be subsequently arranged is determined on one of the lower left apex and the upper right apex of the four apexes of each rectangle formed by panorama images already arranged. And, the arrangement position candidates are sequentially selected starting from the top candidate to be determined for the arrangement position of the panorama image. Namely, the priority increases as the arrangement position candidates upper in arrangement.

Here, the determination of a panorama image arrangement position from the arrangement position candidates requires the satisfaction of three conditions. The first condition is that, if a subject panorama image is arranged at the selected arrangement position candidate, the rectangle area formed by a panorama image with an arrangement position thereof already determined and the rectangle area formed by the subject panorama image do not overlap each other. The second condition is that, if a subject panorama image is arranged at the selected arrangement position candidate, the subject panorama image will not get out of the right end of the display subject area 551. Further, the third condition is that, if a subject panorama image is arranged at the selected arrangement position candidate and the lower left apex of the subject panorama image is located at the bottom of the lower left apexes of the panorama images of which arrangement positions have already been determined, the lower left apex of the subject panorama image comes to the left end of the display subject area 551.

If these three conditions are not satisfied, the arrangement position candidate second from top of the apexes existing as arrangement position candidates is selected to determine the arrangement position of each panorama image. Then, if the above-mentioned three conditions are satisfied, this second arrangement position candidate is determined as the panorama image arrangement position. On the other hand, if the above-mentioned three conditions are not satisfied, the arrangement position candidates the third and subsequent from the top are sequentially selected to repeat the same decision processing.

For example, the following describes an example in which the panorama images 580 through 584 are selected in this order to determine arrangement positions.

As shown in FIG. 32(a), the panorama image 580 is arranged such that the upper left apex of the rectangle formed by the panorama image 580 is arranged in the upper left corner 651 of the panorama image arrangement area 550. In this case, one of the lower left apex 653 and the upper right apex 652 of the rectangle formed by the panorama image 580 is the arrangement position candidate. Next, if the panorama image 581 is arranged, the panorama image 581 is arranged such that the upper left apex of the rectangle formed by the panorama image 581 is arranged at one of the lower left apex 653 and the upper right apex 652 of the rectangle formed by the panorama image 580 as shown in FIG. 32(b). Thus, if there are two or more arrangement positions candidates, the arrangement candidate located on top is selected from the two or more arrangement position candidates. Namely, in the case shown in FIG. 32(b), the panorama image 581 is arranged such that the upper left apex of the rectangle formed by the panorama image 581 is positioned at the upper right apex 652 of the rectangle formed by the panorama image 580.

Also, if a panorama image is arranged at any one of the lower left apex and the upper right apex of the four apexes of a rectangle formed by the panorama image, then the apex at which the panorama image is arranged is excluded from the subsequent arrangement position candidates. Namely, in the case shown in FIG. 32(b), the panorama image 581 is arranged such that the panorama image 581 is arranged at the upper right apex 652 of the rectangle formed by the panorama image 580, so that the upper right apex 652 is excluded from the subsequent arrangement position candidates. Hence, the apexes 653 through 655 remain as the subsequent arrangement position candidates. Subsequently, as with described above, selection is sequentially made starting from the arrangement position candidate located on top of the apexes existing as arrangement position candidates, thereby determining the arrangement positions of panorama images.

For example, a case in which the panorama images 580 through 584 are selected in this order is shown in FIG. 33. As shown in FIG. 32(b), for the panorama images 580 and 581, the arrangement positions are determined so as to be located on the top of the display subject area 551. Next, for the panorama image 582, if the apex 654 on the top of the apexes 653 through 655 existing as arrangement position candidates is selected and this panorama image is arranged to the right side of the panorama image 581, the panorama image 582 gets out of the right end of the display subject area 551. Therefore, the arrangement position of the panorama image is determined by selecting the apex 653 existing in the second row from the top of the apexes 653 through 655 existing as the arrangement position candidates.

Next, for the panorama image 583, if the apex 654 existing on the top of the apexes 654 through 657 existing as the arrangement position candidates is selected and the panorama image 583 is arranged to the right side of the panorama image 581, the panorama image 583 gets out of the right end of the display subject area 551. If the apex 655 existing on the second row from the top is selected of the apexes 654 through 657 existing the arrangement position candidates, the rectangle area formed by the panorama image 582 and the rectangle area formed by the panorama image 583 overlap. Also, if the apex 656 existing on third row from the top is selected of the apexes 654 through 657 existing as the arrangement position candidates and the panorama image 583 is arranged to the right side of the panorama image 582, the lower left apex of the panorama image 583 comes to the bottom of the lower left apexes of the panorama images 580 through 582 with the arrangement positions already determined because vertical width h14 is longer than vertical width h13 and the lower left apex of the panorama image 583 will not located at the left end of the display subject area 551. Therefore, of the apexes 654 through 657 existing as the arrangement position candidates, the apex 657 existing on the fourth row from the top is selected to determine the arrangement position of the panorama image. Further, the arrangement position of the panorama image 584 is determined in the same manner. Thus, when, in an approximately rectangle identified by the display subject area 551, panorama images are sequentially arranged with the top of this approximate rectangle as high-priority arrangement positions and the panorama images are arranged under or to the right side of another panorama image at the position with the subject panorama image on the top and if the bottom apex of the lower apexes of the already arranged panorama images exists above the lower apex of the subject panorama image, then the position at which the lower left apex of the subject panorama image comes in contact with the left end of the display subject area 551 can be determined as the arrangement position of the subject panorama image.

In the above, the description has been made about the case in which each panorama image is arranged without changing the size thereof; however, if the above-mentioned three conditions are not satisfied, the subject panorama image may be rotated by predetermined angle (for example, 90 degrees) to determine whether or not the subject panorama image after rotation satisfies the three conditions and, if the three conditions are found satisfied, that position may be determined as the arrangement position, for example. In this case, the panorama image rotated by 90 degrees is displayed.

Also, the subject panorama image may be rotated on the basis of the position of a particular frame, thereby determining the arrangement position of the subject panorama image after rotation. For example, a particular frame may be made the start frame and the subject panorama image may be rotated on the basis of the up/down direction at the time of taking this start frame.

FIG. 34(*a*) shows a panorama image 673 and a position 674 of a start frame in the case where the panorama image was created by synthesizing images in the direction from the end frame to the start frame that configure a moving image. FIG. 34(*b*) shows the panorama image 673 after the rotation on the basis of up/down direction at the time of taking the start frame. Thus, if the up/down direction at the time of taking the start frame has been converted in the panorama image 673, the panorama image 673 may be rotated on the basis of the up/down direction at the time of taking the start frame to display the panorama images after rotation in a list. Further, it is also practicable to store the camera orientation information at the time of image taking detected by various sensors, such as an acceleration sensor, as related with a moving image and store this camera orientation information as related with a panorama image at the time of creating the panorama image, thereby converting the panorama image at the time of the determination of panorama image display position on the basis of this camera orientation information.

FIG. 35 shows a display example in which panorama images are arranged at arrangement positions determined by the above-mentioned arrangement position determination method. A display screen shown in FIG. 35(*a*) is a display screen in a case where a zoom-in/zoom-out bar 676 was slid so as to display comparatively large panorama images. In a panorama image list display area 675 included in this display screen, panorama images are displayed. A display screen shown in FIG. 35(*b*) is a display screen in a case where a zoom-in/zoom-out bar 678 was slid so as to display comparatively small panorama images. In a panorama image list display area 677 included in this display screen, panorama images are displayed.

The following describes in detail a case in which an index image is displayed on a panorama image with reference to drawings.

FIG. 36 shows a relation between a panorama image shown on display block 292 and an index image. In the embodiment of the present invention, an index image stored in the index information storage block 230 is displayed on a panorama image displayed on the display block 292 in accordance with a predetermined operation. FIG. 36(*a*) shows a display example in which an index image 681 is displayed on a panorama image 680. FIG. 36(*b*) schematically shows a panorama image layer 682 that is layer on which the panorama image 680 shown in FIG. 36(*a*) is drawn and an index image layer 683 that is layer on which the index image 681 shown in FIG. 36(*a*) is drawn. Here, in the embodiment of the present invention, a case in which images drawn on the index image layer 683 and the panorama image layer 682 are displayed as overlapped with each other is described. It should be noted that the index image layer 683 is a layer on which index images stored in the index information storage block 230 are drawn and the panorama image layer 682 is a layer on which a panorama image with an arrangement position thereof determined by the panorama image arrangement position decision block 260 is drawn. Here, an index image selected by the selection block 270 in accordance with an operation input through the operation acceptance block 280 of the index images stored in the index information storage block 230 is drawn on the index image layer 683. This selection method will be described in detail with reference to FIG. 37.

Figure 37:
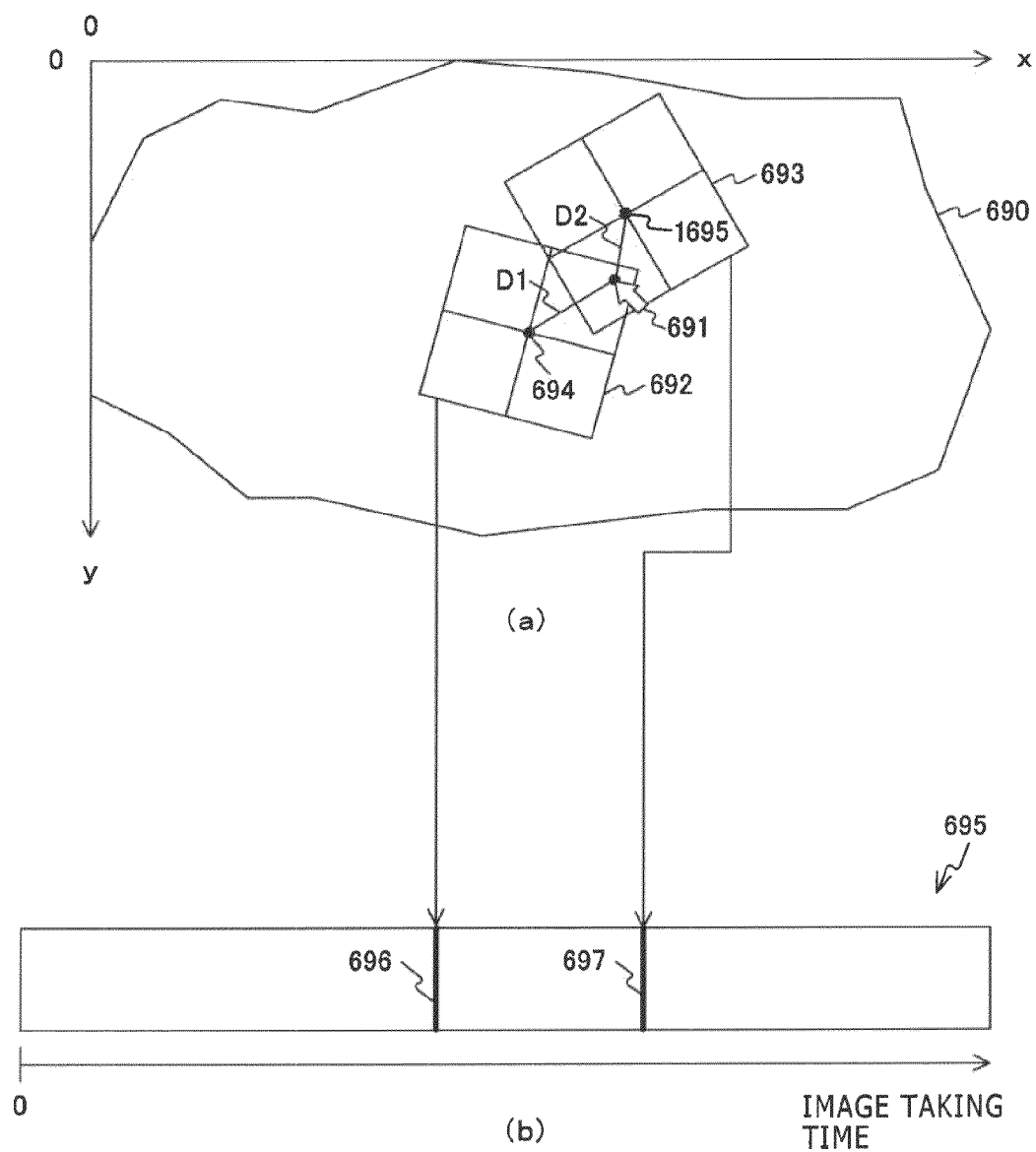
FIG. 37 shows diagrams schematically illustrating a method of selecting an index image to be displayed on a panorama image displayed on the display block 292 and a recording position in a moving image including the index image.

FIG. 37(*a*) shows an overview of a selection method of selecting index images to be displayed on a panorama image displayed on the display block 292. FIG. 37(*b*) shows an overview of recording positions in a moving image including index images. A panorama image 690 shown in FIG. 37(*a*) is a panorama image displayed on the display block 292 and the up/down direction on the display block 292 is x-axis while the horizontal direction is y-axis, for example.

In the panorama image 690 displayed on the display block 292, the user moves a cursor 691 by an operation input through the operation acceptance block 280. On the basis of a position of the cursor 691 after the movement by this move operation, an index image is selected.

To be more specific, of the center coordinates identified by coordinates recorded to positional information 233 in the index information storage block 230, a coordinate point existing at the shortest distance from the position of the cursor 691 after movement on the panorama image 690 is detected and the frame number 232 and moving image ID 231 corresponding to this coordinate point are selected. For example, if the cursor 691 is moved to a position corresponding to the index images 692 and 693 in the panorama image 690, distance D1 between the position of the cursor 691 and position 694 of the center coordinate of the index image 692 and distance D2 between the position of the 691 and position 1695 of the center coordinate of the index image 693 are computed. Then, when a comparison is made between the computed distance D1 and distance D2, distance D2 is shorter than distance D1, so that the index image 693 is selected as an index image to be displayed. Next, when the selected frame number 323 and moving image ID 231 are outputted to the display control block 291, the display control block 291 searches for an index image stored in the index information storage block 230 as related with the selected frame number 2322 and moving image ID 231 and draws the retrieved index image on the index image layer. In this case, on the basis of the positional information 233 stored in the index information storage block 230 as related with the retrieved index image, a position at which the index image is drawn is determined. Also, if of the center coordinates identified by the coordinates stored in the positional information 233 in the index information storage block 230, two or more coordinate points existing at the shortest distance from the position selected by a selection operation on the panorama image 690 are detected, an index image having a large area computed from the coordinates recorded to the positional information 233 may be selected, for example. Alternatively, an index image having a high frame number may be selected. It should be noted that proper frame numbers and moving image IDs may be selected on the basis of other evaluation functions.

Further, as described above, if a left-click operation is executed on the index image 693 with the mouse by user's operating the cursor 691 through an operation input from the operation acceptance block 280, for example, with the index image 693 selected, the audio control block 293 obtains audio information 235 stored in the index information storage block 230 as related with the selected frame number 232 and moving image ID 231 and outputs this obtained audio information from the audio output block 294. Also, the display control block 291 obtains moving image information 236 stored in the index information storage block 230 as related with these selected frame number 232 and moving image ID 231 to make the display block 292 reproduce this obtained moving image information. This reproduction may be displayed near the panorama image for example or in a moving image reproducing area by arranging this area outside the panorama image list display area.

In addition, as described above, if double-click operation is executed on the index image 693 by the mouse by user's operating the cursor 691 through an operation input from the operation acceptance block 280, for example, with the index image 693 selected, the reproduction from the recording position of a moving image 695 corresponding to the index image 693 can be started. In this reproduction, the display control block 291 searches for the position of the moving image 695 corresponding to the index image 693 from the moving image files stored in the moving image storage block 200 on the basis of the selected frame number 232 and moving image ID 231 and reproduces the moving image from the retrieved position of the moving image. For example, let the recording position of the moving image 695 corresponding to the index image 693 be 697 and the recording position of the moving image 695 corresponding to the index image 692 be 696, then the moving image reproduction starts from the recording position 697 of the moving image 695.

FIG. 38 through FIG. 42 shows display examples in which selected index images are displayed on panorama images. The panorama images shown in FIG. 38 and FIG. 39 are panorama images created from a moving image in which a snowboarder boarding on a ski slope was taken, these panorama images being created by increasing transparency in the direction from an image later in image taking time to an image earlier in image taking time. Index image 701 through 705 may be displayed on these panorama images by moving a cursor 706 to each part.

FIG. 40 through FIG. 42 show examples in which the panorama images shown in FIG. 38 and FIG. 39 are displayed in the panorama image list display area. Thus, by moving a cursor 716 to each part on the panorama image 710 displayed in the panorama image list display are, index images 711 through 715 can be displayed.

Figure 43:
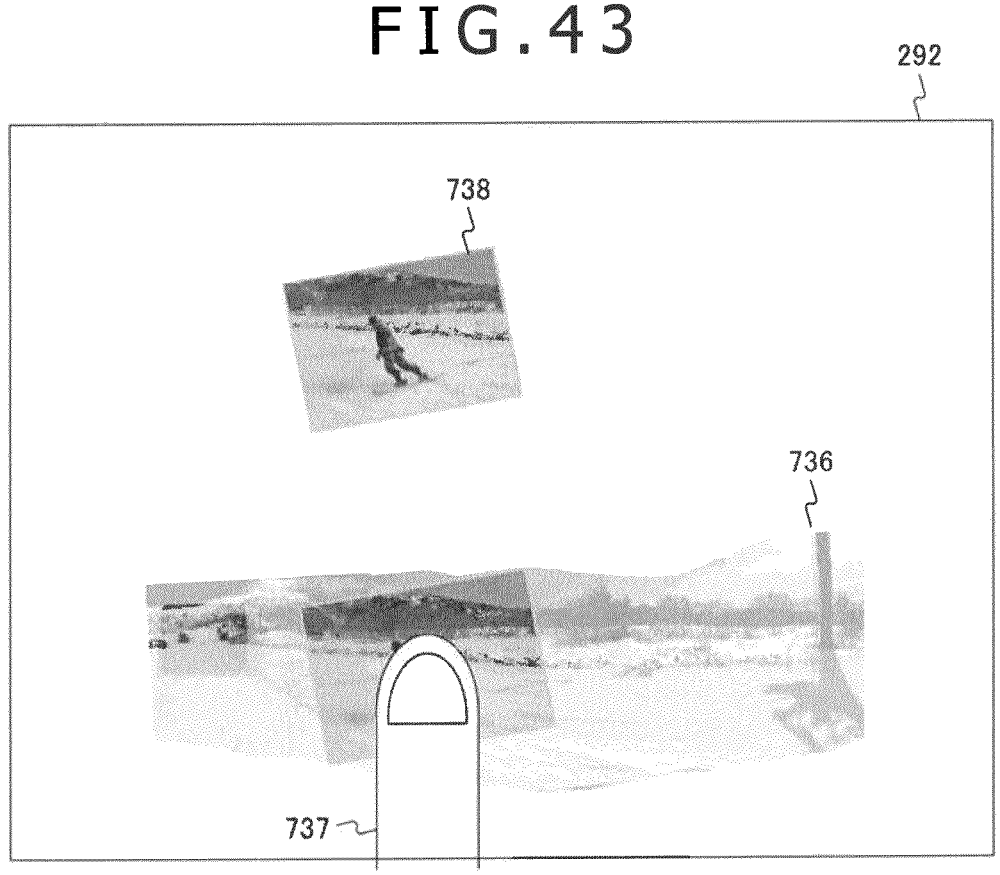
FIG. 43 shows diagrams illustrating display examples of an index image in the case where the display block 292 is formed by a touch panel.

FIG. 43 shows a display example in which an index image in the case where the display block 292 is configured by a touch panel. As shown in the figure, if the display block 292 is configured by a touch panel, each operation input can be executed by user's pressing a desired part with the finger. For example, if a panorama image 736 is displayed on the display block 292, the user presses a desired part with a finger 737. In this case, as described above, an index image can be displayed in accordance with the pressed position. However, in the above-mentioned display method, the display index image is covered with the user's finger 737, thereby possibly hiding the index image. Hence, in this example, the selected index image 738 is displayed over the panorama image 736 in accordance with the position of the index image. This way of displaying allows the easy-to-see displaying of index images even if the display block 292 is configured by the touch panel. It should be noted that the position at which to display an index image may be in another area, such as a part below a panorama image or a predetermined display area.

The following describes in detail an example in which an image taking time is expressed in a panorama image on the basis of the frame number and positional information stored in the index information storage block 230 related with an index image, with reference to drawings.

Figure 44:
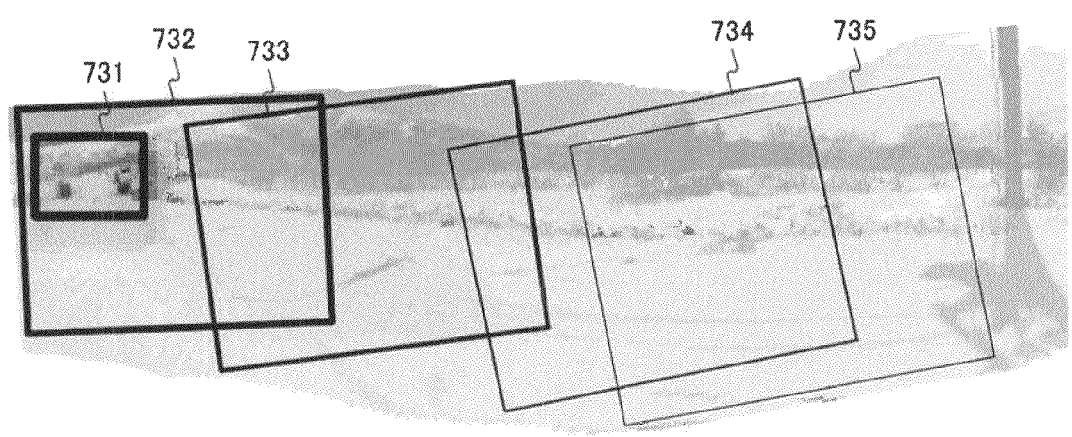
FIG. 44 shows a diagram illustrating an example in which frames are attached to positions corresponding to index images on a panorama image and the thicknesses of the frames are changed in accordance with image taking times.

FIG. 44 shows an example in which positions corresponding to index images are framed and the thickness of each frame is changed in accordance with a time of image taking. A panorama image shown in the figure is the same as the panorama images shown in FIG. 38 through FIG. 42. As shown in FIG. 44, on the basis of the positional information stored in the index information storage block 230 as related with index images, the display control block 291 is able to provide a frame at the position of an index image to be displayed on the panorama images shown in FIG. 38 through FIG. 42. Also, on the basis of frame numbers stored in the index information storage block 230 as related with index images, the display control block 291 is able to change the thickness of frames to be given to a panorama image. For example, as shown in FIG. 44, frame 731 corresponding to an index image taken earlier can be thickened while a frame 735 corresponding to an index image taken later can be thinned. It should be noted that, rather than changing the frame thicknesses, other changes may be performed, such as changing frame colors, frame transmissivity, and so on in accordance with image taking times. Alternatively, by sequentially recording the positional information and frame numbers of the frames configuring a moving image corresponding to a panorama image, the frame display corresponding to each frame may be executed on the basis of these items of information. Alternatively, a frame may be provided for each frame or index image at the time of creating a panorama image.

In addition, a panorama image may be created by two or more moving images. In displaying a panorama image thus created, an indicator indicative of the creation from two or more moving images may be attached to the panorama image.

FIG. 45 shows a display example in which an indicator indicative of the number of moving images used for the creation is attached near a panorama image created from two or more moving images and the panorama image is displayed. For example, indicators 764 through 766 indicative that these panorama images are created from two moving images are displayed near the panorama images 761 through 763. Here, the indicators 764 through 766 are indicators expressing the number of moving images in the number of cameras. In this example, the indicators expresses that the panorama images were created from the two moving images taken by two cameras.

The following describes an operation of the image processing apparatus 100 in the embodiment of the present invention with reference to drawings.

Figure 46:
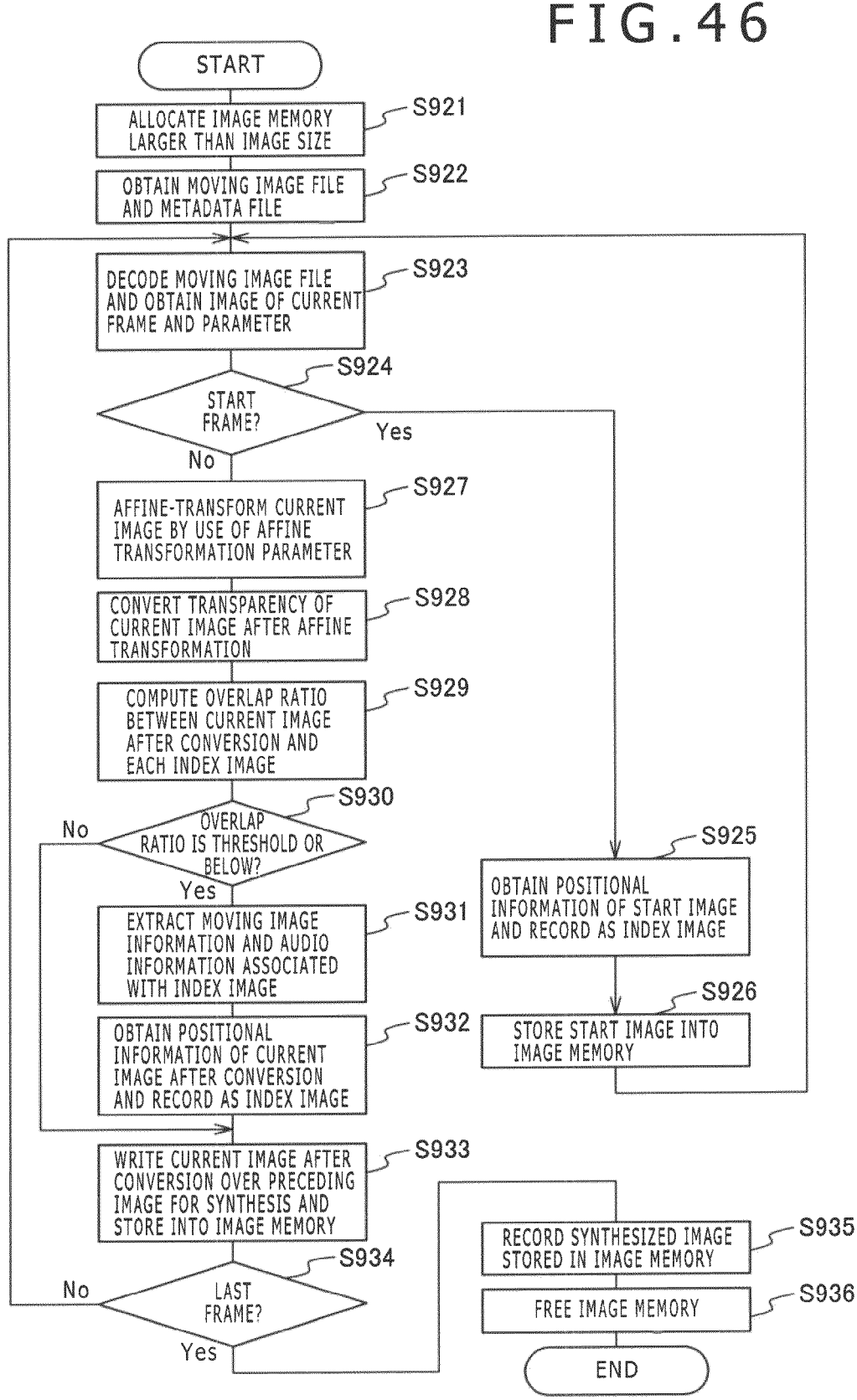
FIG. 46 is a flowchart indicative of a processing procedure of panorama image creation processing by the image processing apparatus 100 in the embodiment of the present invention.

FIG. 46 is a flowchart indicative of a processing procedure of the panorama image creation processing by the image processing apparatus 100 in the embodiment of the present invention. In this example, a panorama image is created by synthesizing each image in the direction from the start frame to the end frame configuring a moving image.

First, a work buffer greater than the size of an image configuring a moving image is allocated in the image memory 180 (step S921). Next, a moving image file stored in the moving image storage block 200 is obtained and a metadata file stored in the metadata storage block 210 as related with this moving image file is obtained (step S922). Next, the obtained moving image file is decoded to obtain a current frame that is one frame and affine transformation parameters corresponding to the obtained current frame are obtained (step S923).

Next, it is determined whether the obtained current frame is the start frame of the frames configuring a moving image (step S924). If the current frame is found to be the start frame (step S924), then the positional information of an image corresponding to the current frame in the work buffer of the image memory 180 is obtained and this image (the image converted by unit matrix) and the positional information, frame number "1," and moving image ID of this image are recorded to the index information storage block 230 (step S925). In this case, moving mage information and audio information existing in a certain interval from the start frame are extracted and stored in the index information storage block 230 as related with the image corresponding to the start frame. Next, transparency conversion is executed on the image corresponding to the start frame and the image corresponding to the start frame is stored in the image memory 180 (step S926). On the other hand, if the current frame is not the start frame (step S924), then the procedure goes to step S927.

Next, by use of the obtained affine transformation parameters, the image corresponding to the current frame is affine-transformed (step S927). Next, transparency conversion is executed on the affine-transformed current frame (step S928).

Next, an overlap ratio between the image corresponding to the affine-converted current frame and the index image stored in the index information storage block 230 is computed (step S928). Next, it is determined whether the value of overlap ratio obtained by computation is under a threshold value (step S930). If the value of overlap ratio obtained by computation is found to be under the threshold value (step S930), moving image information and audio information existing in a certain interval from the current frame are extracted (step S931). Next, the positional information of the image corresponding to the current frame in the work buffer of the image memory 180 is obtained and this image, the positional information, frame number if the moving image ID of this image, and the extracted moving image information and audio information are recorded to the index information storage block 230 (step S932). When this recording has ended (step S932) or if the value of overlap ratio obtained by computation is not under the threshold value (step S930), the affine-transformed and transparency-converted image corresponding to the current frame is written over, for synthesis, an synthesized image of each image corresponding to frames before this current frame and the image synthesized with the image corresponding to this current frame is stored in the image memory 180 (step S933).

Next, of the frames configuring the entered moving image film, it is determined whether the current frame is the end frame or not (step S934). If the current frame is found to be not the end frame (step S934), then the procedure returns to step S923 to repeat the synthesized image creation processing (steps S923 through S933).

On the other hand, if the current frame is found to be the end frame (step S934), then the synthesized image stored in the image memory 180 is outputted to the panorama image storage block 240 for recording (step S935). Next, the allocated work buffer is freed (step S936), upon which the panorama image creation processing ends.

Figure 47:
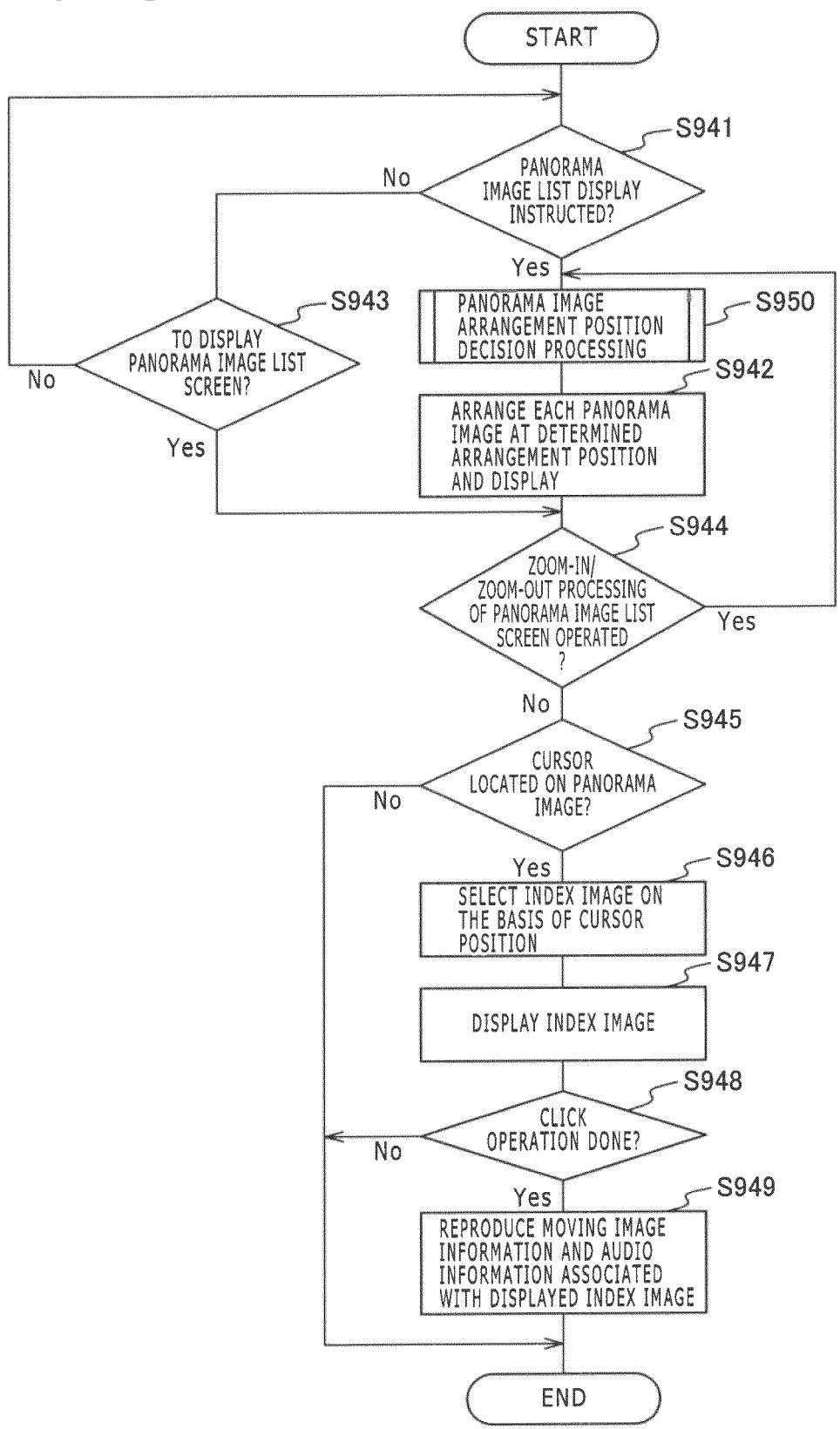
FIG. 47 is a flowchart indicative of a processing procedure of panorama image display processing by the image processing apparatus 100 in the embodiment of the present invention.

FIG. 47 is a flowchart indicative of a processing procedure of panorama image display processing by the image processing apparatus 100 in the embodiment of the present invention. In this processing procedure, the description is made by use of an example in which a panorama image stored in the panorama image storage block 240 is displayed, an index image is displayed by moving the cursor on this panorama image, and a moving image and audio are reproduced by a click operation.

First, it is determined whether an operation input for displaying a panorama image list display screen has been accepted by the operation acceptance block 280 (step S941). If an operation input for displaying a panorama image list display screen is found accepted (step S941), then panorama image arrangement position decision processing is executed (step S950). It should be noted that this panorama image arrangement position decision processing will be described in detail with reference to FIG. 48 through FIG. 50.

Next, each panorama image list display screen including each panorama image arranged at a determined arrangement position is displayed on the display block 292 (step S942). On the other hand, if an operation input for displaying a panorama image list display screen is found not accepted (step S941), then it is determined whether a panorama image list display screen is displayed on the display block 292 (step S943). If a panorama image list display screen is found displayed (step S943), then the procedure goes to step S944; if a panorama image list display screen is found not displayed (step S943), then the procedure returns to step S941.

Next, it is determined whether an operation input for specifying zoom-in/zoom-out of a panorama image included in the panorama image list display screen shown on the display block 292 has been executed or not (step S944). If an operation input for specifying zoom-in/zoom-out of a panorama image included in the panorama image list display screen is found executed (step S944), then the procedure returns to step S950 to execute the panorama image arrangement position decision processing. On the other hand, if an operation input for specifying zoom-in/zoom-out of a panorama image included in the panorama image list display screen is found not executed (step S944), then it is determined whether the cursor exists on the panorama image displayed on the display block 292 (step S945). If no cursor is found on the panorama image displayed on the display block 292 (step S945), then the operation of the panorama image display processing ends.

On the other hand, if the cursor is found existing on the panorama image displayed on the display block 292 (step S945), then an index image is selected on the basis of the position of the cursor (step S946). Next, the selected index image is displayed on the panorama image (step S947). Next, it is determined whether a left-click operation has been done with the index image displayed (step S948). If a left-click operation is found not done (step S948), then the operation of the panorama image display operation ends. Here, if the cursor has been moved from a position corresponding to the displayed index image, the displayed index image is deleted.

If a left-click operation has been done with the index image displayed (step S948), the moving image information and audio information corresponding to the displayed index image are reproduced (step S949). It should be noted that if a double-click operation is done with the index image displayed, the moving image is reproduced from a recording position corresponding to the displayed index image.

Figure 48:
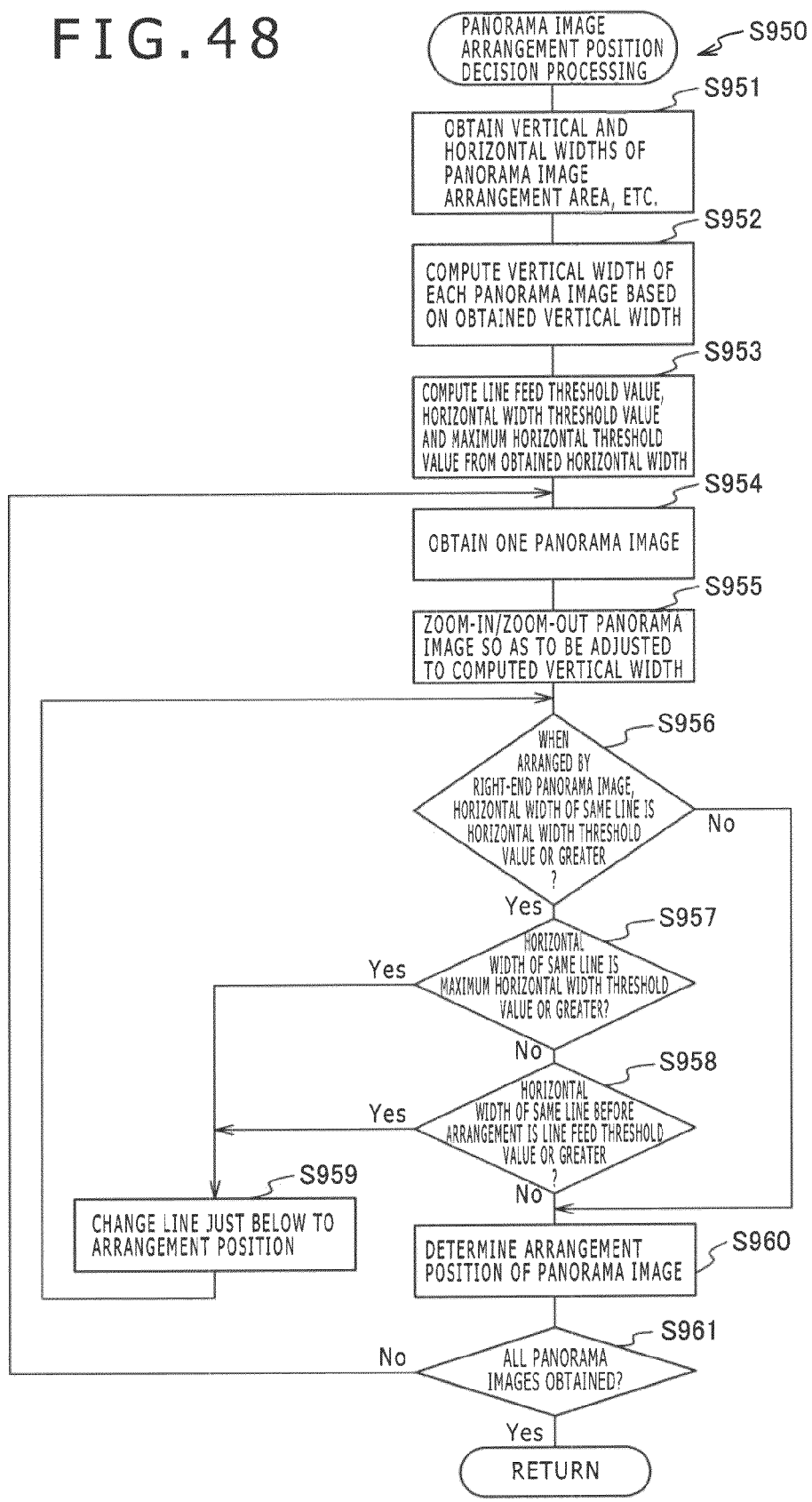
FIG. 48 is a flowchart indicative of a processing procedure of panorama image arrangement position decision processing of the processing procedure of the panorama image display processing by the image processing apparatus 100 in the embodiment of the present invention.

FIG. 48 is a flowchart indicative of a processing procedure of panorama image arrangement position decision processing (step S950 shown in FIG. 47) of the processing procedure of the panorama image display processing by the image processing apparatus 100 in the embodiment of the present invention. In this processing procedure, the description is made by use of an example in which an arrangement position is determined after zooming in or zooming out each panorama image so as to make constant the vertical width of each panorama image.

First, the vertical widths and the horizontal widths of a panorama image arrangement area and a display subject area are obtained (step S951). Next, on the basis of the obtained vertical widths, the vertical width of each panorama image is computed (step S952). Next, on the basis of the obtained horizontal widths, a maximum horizontal width threshold value, a horizontal width threshold value, and a line-feed threshold value are computed (step S953). Next, one panorama image is obtained from the panorama image storage block 240 (step S954). Next, the obtained panorama image is zoomed in or zoomed out so as to have the computed vertical width (step S955).

Then, it is determined whether, if the subject panorama image that is the zoomed in or zoomed out panorama image is arranged to the right side of a panorama image at the right end of the panorama images arranged on the top row, a total value of the horizontal widths of the panorama images arranged on the same row is in excess of the horizontal width threshold value (step S956). If a total value of the horizontal widths of the panorama images arranged on the same row is found not in excess of the horizontal width threshold value (step S956), the current position is determined to be the arrangement position of the subject panorama image (step S960).

On the other hand, if the total value of the horizontal widths of the panorama images arranged on the same row is found to be in excess of the horizontal width threshold value (step S956), it is determined whether a total value of the horizontal widths of the panorama images arranged on the same row is in excess of the maximum horizontal width threshold value (step S957). If a total value of the horizontal widths of the panorama images arranged on the same row is found to be in excess of the maximum horizontal width threshold value (step S957), the arrangement position is changed to the row down next to the current position (step S959), upon which the procedure goes to step S956. On the other hand, if a total value of the horizontal widths of the panorama images arranged on the same row is found to be not in excess of the maximum horizontal width threshold value (step S957), then it is determined whether a total value of the horizontal widths of the panorama images up to the left side of the subject panorama image is in excess of the line-feed threshold value (step S958).

If a total value of the horizontal widths of the panorama images up to the left side of the subject panorama image is found to be in excess of the line-feed threshold value (step S958), the arrangement position is changed to the row next down to the current position (step S959), upon which the procedure goes to step S956. If a total value of the horizontal widths of the panorama images up to the left side of the subject panorama image is found to be not in excess of the line-feed threshold value (step S958), then the current position is determined to be the arrangement position of the subject panorama image (step S960). Next, it is determined whether all panorama images stored in the panorama image storage block 240 have been obtained (step S961). If all panorama images stored in the panorama image storage block 240 have not been obtained (step S961), then the procedure returns to step S954 to repeat the panorama image arrangement position decision processing (steps S954 through S960). If all the panorama images stored in the panorama image storage block 240 have been obtained (step S961), then the operation of the panorama image arrangement position decision processing ends.

Figure 49:
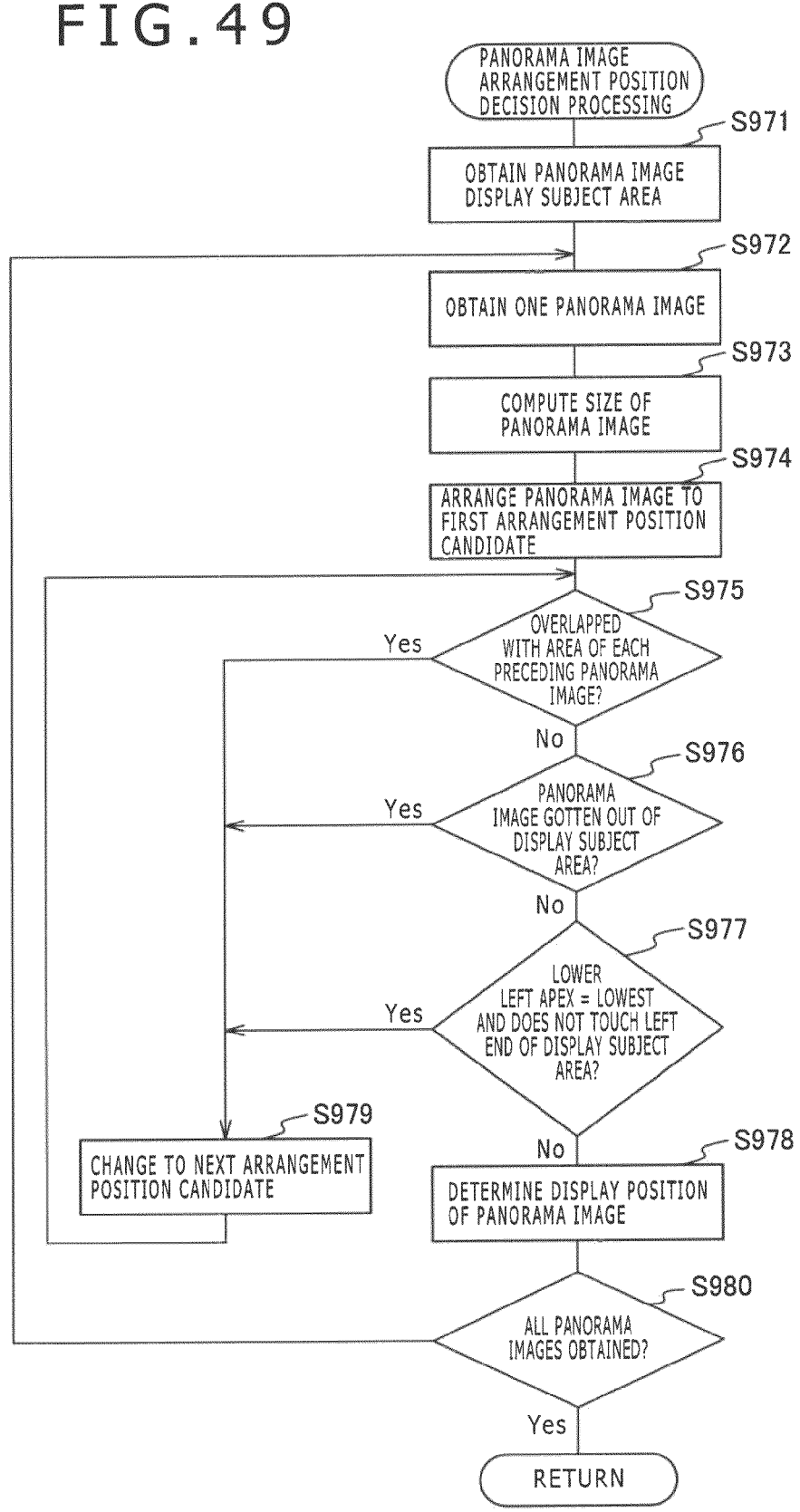
FIG. 49 is a flowchart indicative of a processing procedure of panorama image arrangement position decision processing of the processing procedure of the panorama image display processing by the image processing apparatus 100 in the embodiment of the present invention.

FIG. 49 is a flowchart indicative of a processing procedure of the panorama image arrangement position decision processing (step S950 shown in FIG. 47) of the procedure in the panorama image display processing by the image processing apparatus 100 in the embodiment of the present invention. In this processing procedure, the description is made by use of an example in which the arrangement position of each panorama image is determined without changing the sizes of each panorama image.

First, the size of a display subject area is obtained (step S971). Next, one panorama image is obtained from the panorama image storage block 240 (step S972). Next, the size of rectangle formed by the subject panorama image that is the obtained panorama image is computed (step S973). Next, the subject panorama image is arranged to an arrangement position candidate of high priority (step S974).

Next, it is determined whether there is any overlap between the rectangle area formed by the subject panorama image arranged at the arrangement position candidate and the rectangle area formed by the panorama image with the arrangement position thereof already determined (step S975). If an overlap is found between the rectangle area formed by the subject panorama image arranged at the arrangement position candidate and the rectangle area formed by the panorama image with the arrangement position thereof already determined (step S975), then an arrangement position of next higher priority is selected (step S979), upon which the procedure returns to step S975.

If no overlap is found between the rectangle area formed by the subject panorama image arranged at the arrangement position candidate and the rectangle area formed by the panorama image with the arrangement position thereof already determined (step S975), then it is determined whether the subject panorama image arranged at the arrangement position candidate gets out of the right end of the display subject area (step S976). If the subject panorama image arranged at the arrangement position candidate is found to be out of the right end of the display subject area (step S976), the procedure goes to step S979.

If the subject panorama image arranged at the arrangement position candidate is found to be not out of the right end of the display subject area (step S976), then it is determined whether the lower left apex of the subject panorama image arranged at the arrangement position candidate exists at the bottom of the lower left apexes of the panorama images with the arrangement positions already determined and the lower left apex of the subject panorama image is in contact with the left end of the display subject area (step S977). If the lower left apex of the subject panorama image arranged at the arrangement position candidate exists at the bottom of the lower left apexes of the panorama images with the arrangement positions already determined and the lower left apex of the subject panorama image is found to be no in contact with the left end of the display subject area (step S977), then the procedure goes to step S979.

If the lower left apex of the subject panorama image arranged at the arrangement position candidate is found not existing at the bottom of the lower left apexes of the panorama images with the arrangement positions already determined or the lower left apex of the subject panorama image is in contact with the left end of the display subject area (step S977), then the current arrangement position candidate is determined to be the arrangement position of the subject panorama image (step S798). Next, it is determined whether all panorama images stored in the panorama image storage block 240 have been obtained (step S980). If all panorama images stored in the panorama image storage block 240 have not been obtained (step S980), then the procedure returns to step S972 to repeat the panorama image arrangement position decision processing (steps S972 through S979). If all panorama images stored in the panorama image storage block 240 have been obtained (step S980), the operation of the panorama image arrangement position decision processing ends.

Figure 50:
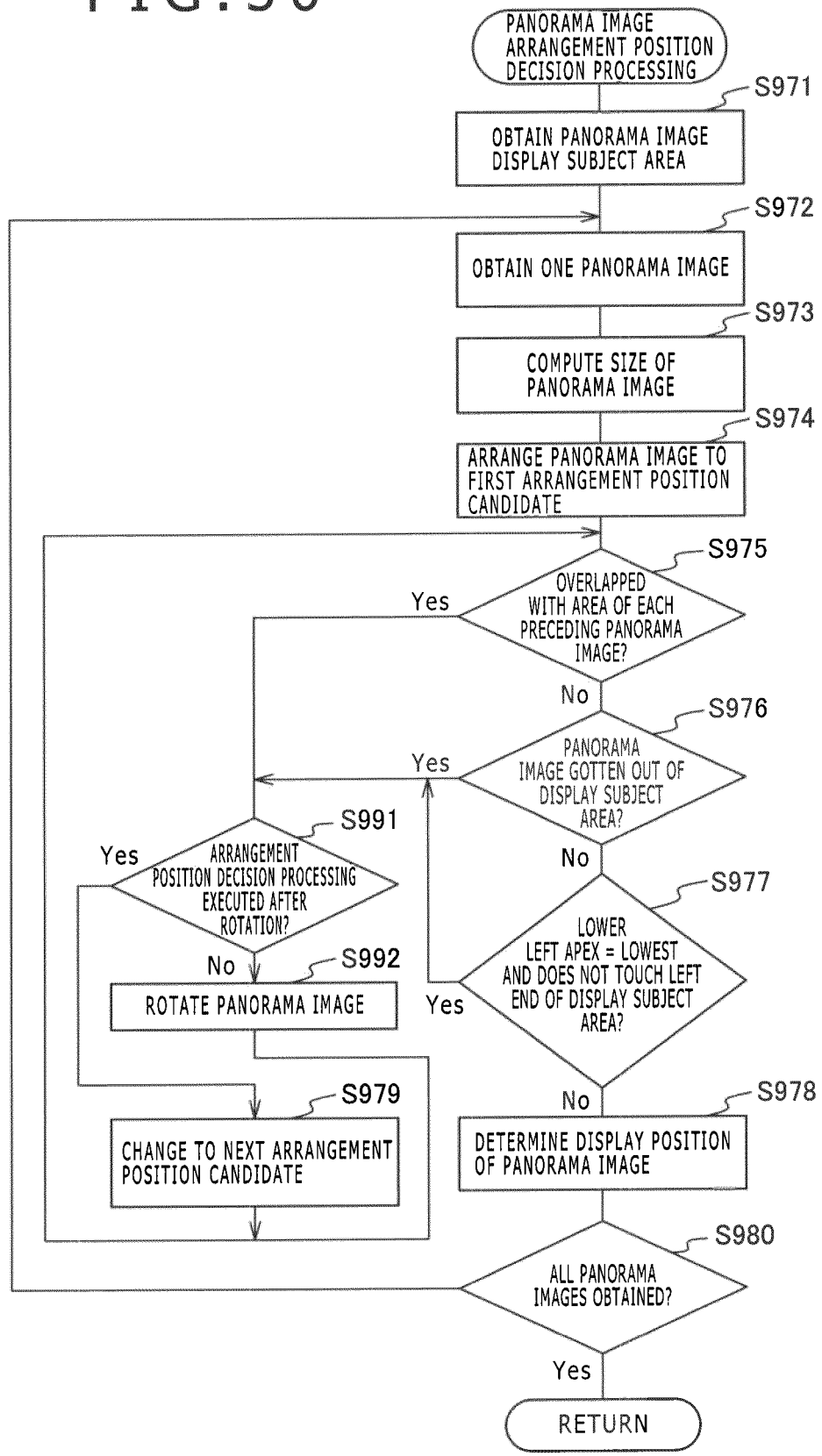
FIG. 50 is a flowchart indicative of a processing procedure of panorama image arrangement position decision processing of the processing procedure of the panorama image display processing by the image processing apparatus 100 in the embodiment of the present invention.

FIG. 50 is a flowchart indicative of a processing procedure of the panorama image arrangement position decision processing (step S950 shown in FIG. 47) of the processing procedure of the panorama image display processing by the image processing apparatus 100 in the embodiment of the present invention. This processing procedure is the same as the processing procedure shown in FIG. 49 except for steps S991 and S992 in the processing procedure shown in FIG. 49. Therefore, the following description omits the processing procedure other than steps S991 and S992.

If an overlap is found between the rectangle area formed by the subject panorama image arranged at the arrangement position candidate and the rectangle area formed by the panorama image with the arrangement position thereof already determined (step S975) or if the subject panorama image arranged at the arrangement position candidate gets out of the right end of the display subject area (step S976) or the lower left apex of the subject panorama image arranged at the arrangement position candidate exists at the bottom of the lower left apexes of the panorama images with the arrangement positions already determined and the lower left apex of the subject panorama image is found to be no in contact with the left end of the display subject area (step S977), it is determined whether the panorama image arrangement position decision processing (steps S975 through S977) has been executed at the current arrangement position candidate after the rotation processing of the subject panorama image (step S991); if the panorama image arrangement position decision processing is found not executed at the current arrangement position candidate after the rotation processing, then the rotation processing is executed on the subject panorama image (step S992), upon which the procedure returns to step S975. For example, the subject panorama image is rotated by 90 degrees.

The following describes in detail feature point extraction processing and optical flow computation processing by a multi-core processor in the embodiment of the present invention with reference to drawings.

Figure 51:
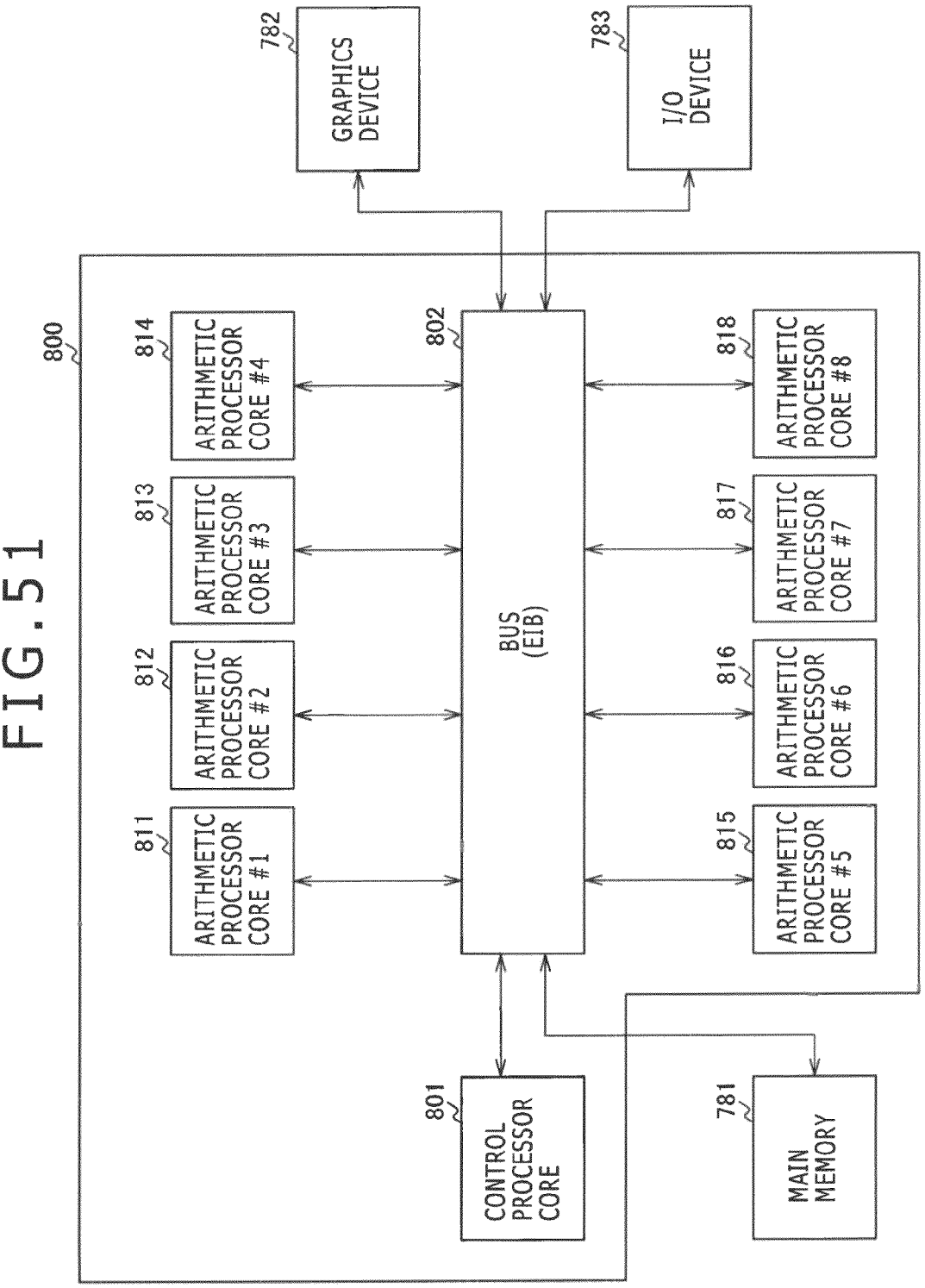
FIG. 51 is a diagram illustrating an exemplary configuration of a multi-core processor 800 in the embodiment of the present invention.

FIG. 51 is an exemplary configuration of a multi-core processor 800 in the embodiment of the present invention. The multi-core processor 800 is a processor in which two or more processor cores of different types are mounted on one CPU (Central Processing Unit). Namely, in order to maintain the processing performance of each discrete processor core and achieve a simple configuration, the multi-core processor 800 has two types of processor cores, one type for coping with all uses (applications) and the other type optimized, to a certain degree, for predetermined uses.

The multi-core processor 800 has a control processor core 801, arithmetic processor cores (#1) 811 through (#8) 818, and a bus 802 and is connected to a main memory 781. Also, the multi-core processor 800 is connected to other devices, such as a graphics device 782 and an I/O device 783. For the multi-core processor 800, "Cell (Cell Broadband Engine)" that is a microprocessor developed by the applicant hereof and so on, for example, may be used.

The control processor core 801 is a control processor core that mainly executes frequent thread switching, such as an operating system, for example. It should be noted that the control processor core 801 is described in detail with reference to FIG. 52.

The arithmetic processor cores (#1) 811 through (#8) 818 are simple and small arithmetic processor cores good at multimedia processing. It should be noted that the arithmetic processor cores (#1) 811 through (#8) 818 are described in detail with reference to FIG. 53.

The bus 802 is a fast bus called EIB (Element Interconnected Bus) to which the control processor core 801 and each of the arithmetic processor cores (#1) 811 through (#8) 818 are connected, data access by each processor core being executed via the bus 802.

The main memory 781, connected to the bus 802, stores various kinds of programs to be loaded into each processor core and data necessary for the processing of each processor core and data processed by each processor core.

The graphics device 782 is a graphics device connected to the bus 802 and the I/O device 783 is an external input/output device connected to the bus 802.

Figure 52:
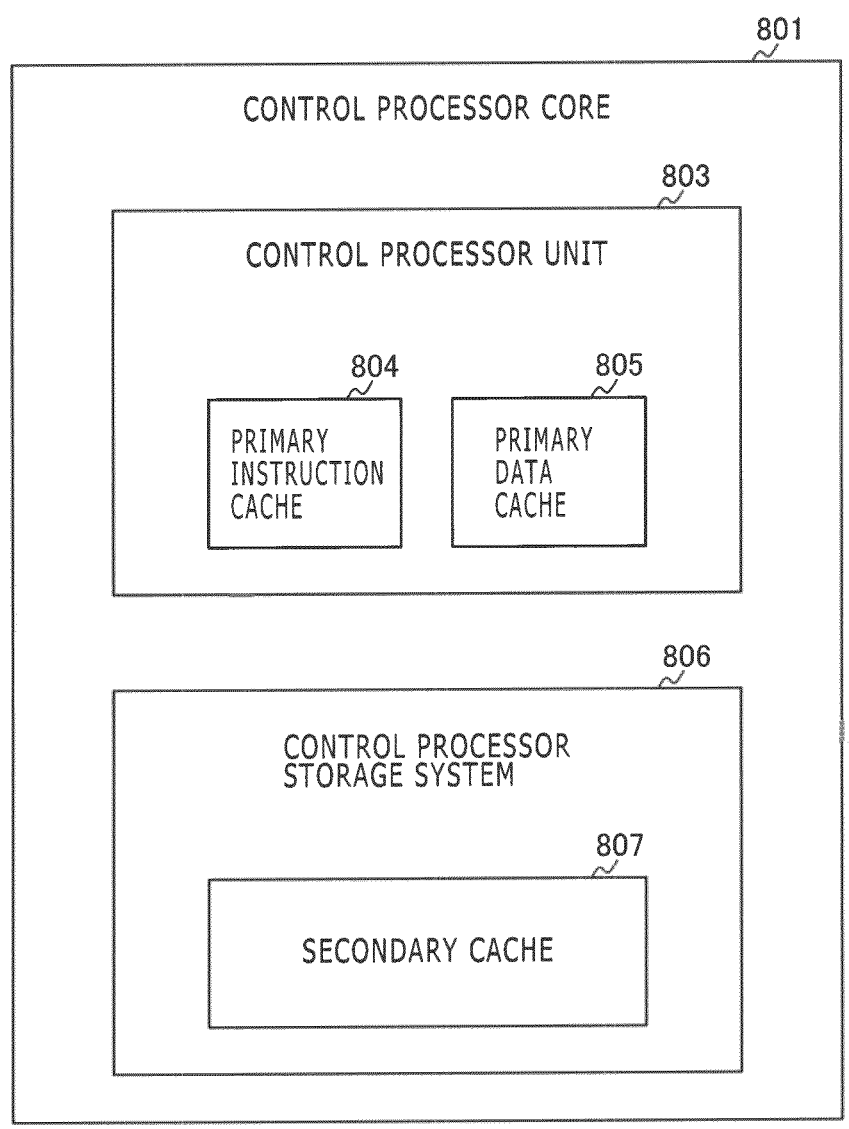
FIG. 52 is a diagram illustrating an exemplary configuration of a control processor core 801 in the embodiment of the present invention.

FIG. 52 shows an exemplary configuration of the control processor core 801 in the embodiment of the present invention. The control processor core 801 has a control processor unit 803 and a control processor storage system 806.

The control processor unit 803 is a unit providing a core for executing the arithmetic operation processing of the control processor core 801, has an instruction set based on the architecture of a microprocessor, and has an instruction cache 804 and a data cache 805 as primary caches. The instruction cache 804 is a 32 KB instruction cache and the data cache 805 is 32 KB data cache, for example.

The control processor storage system 806 is a unit for controlling the data access from the control processor unit 803 to the main memory 781 and has a secondary cache 807 of 512 KB for speeding memory access from the control processor unit 803.

Figure 53:
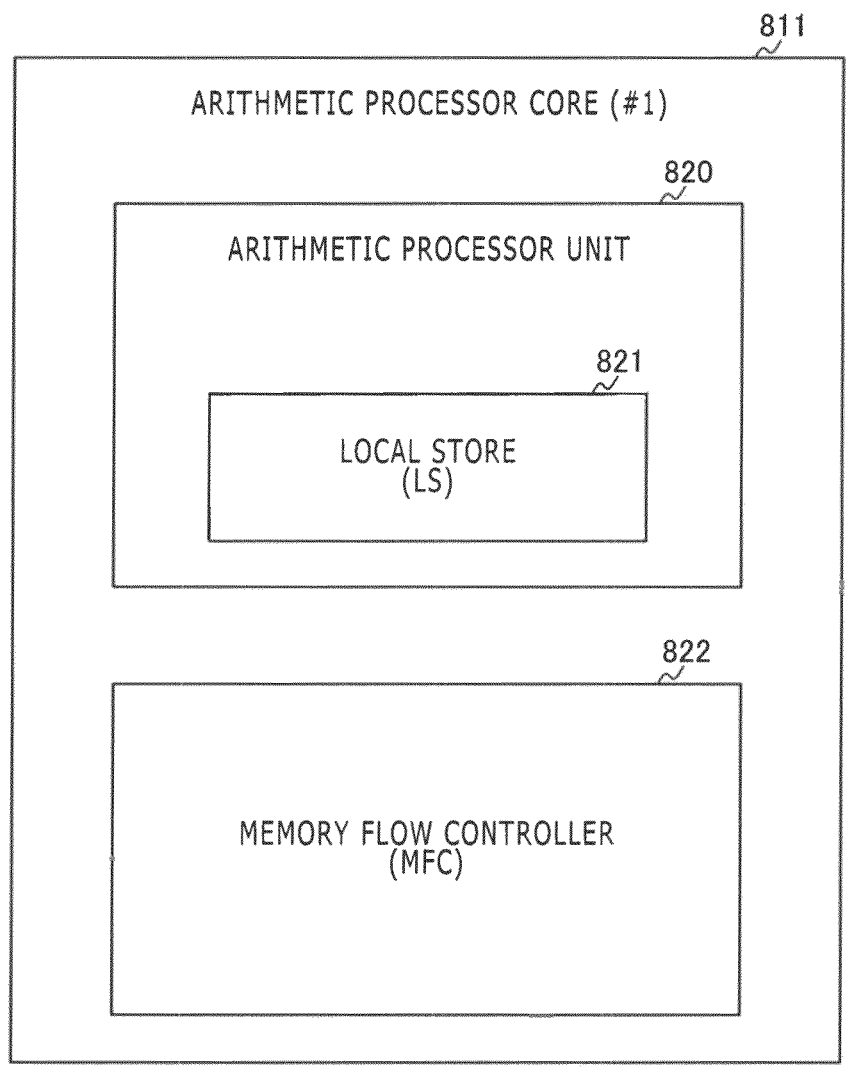
FIG. 53 is a diagram illustrating an exemplary configuration of an arithmetic processor core (#1) 811 in the embodiment of the present invention.

FIG. 53 shows an exemplary configuration of the arithmetic processor core (#1) 811 in the embodiment of the present invention. The arithmetic processor core (#1) 811 has an arithmetic processor unit 820 and a memory flow controller 822. It should be noted that the arithmetic processor core (#2) 812 through the arithmetic processor core (#8) 818 are the same in configuration as the arithmetic processor core (#1) 811, so that the description of arithmetic processor cores is omitted.

The arithmetic processor unit 820 is a unit providing a core for the arithmetic processing of the arithmetic processor core (#1) 811 and has a unique instruction set different from that of the control processor unit 803 of the control processor core 801. Also, the arithmetic processor unit 820 has a local store (LS: Local Store) 821.

The local store 821 is a memory dedicated to the arithmetic processor unit 820 and the only memory that can be directly referenced from the arithmetic processor unit 820. For the local store 821, a memory of 256 K bytes in storage size may be used for example. It should be noted that, for the arithmetic processor unit 820 to access the main memory 781 or the local store on the other arithmetic processor cores (arithmetic processor cores (#2) 812 through (#8) 818), the arithmetic processor unit 820 must use the memory flow controller 822.

The memory flow controller 822 is a unit for transferring data with the main memory 781 and other arithmetic processor cores and is called an MFC (Memory Flow Controller). Here, the arithmetic processor unit 820 requests the memory flow controller 822 for data transfer and so on via an interface called a channel.

For programming models of the multi-core processor 800 described above, various models are proposed. For a most basic model of these programming models, a model is known in which a main program is executed on the control processor core 801 and sub programs are executed on the arithmetic processor cores (#1) 811 through (#8) 818. In the embodiment of the present invention, an arithmetic operation method of the multi-core processor 800 using this model is described in detail with reference to drawings.

Figure 54:
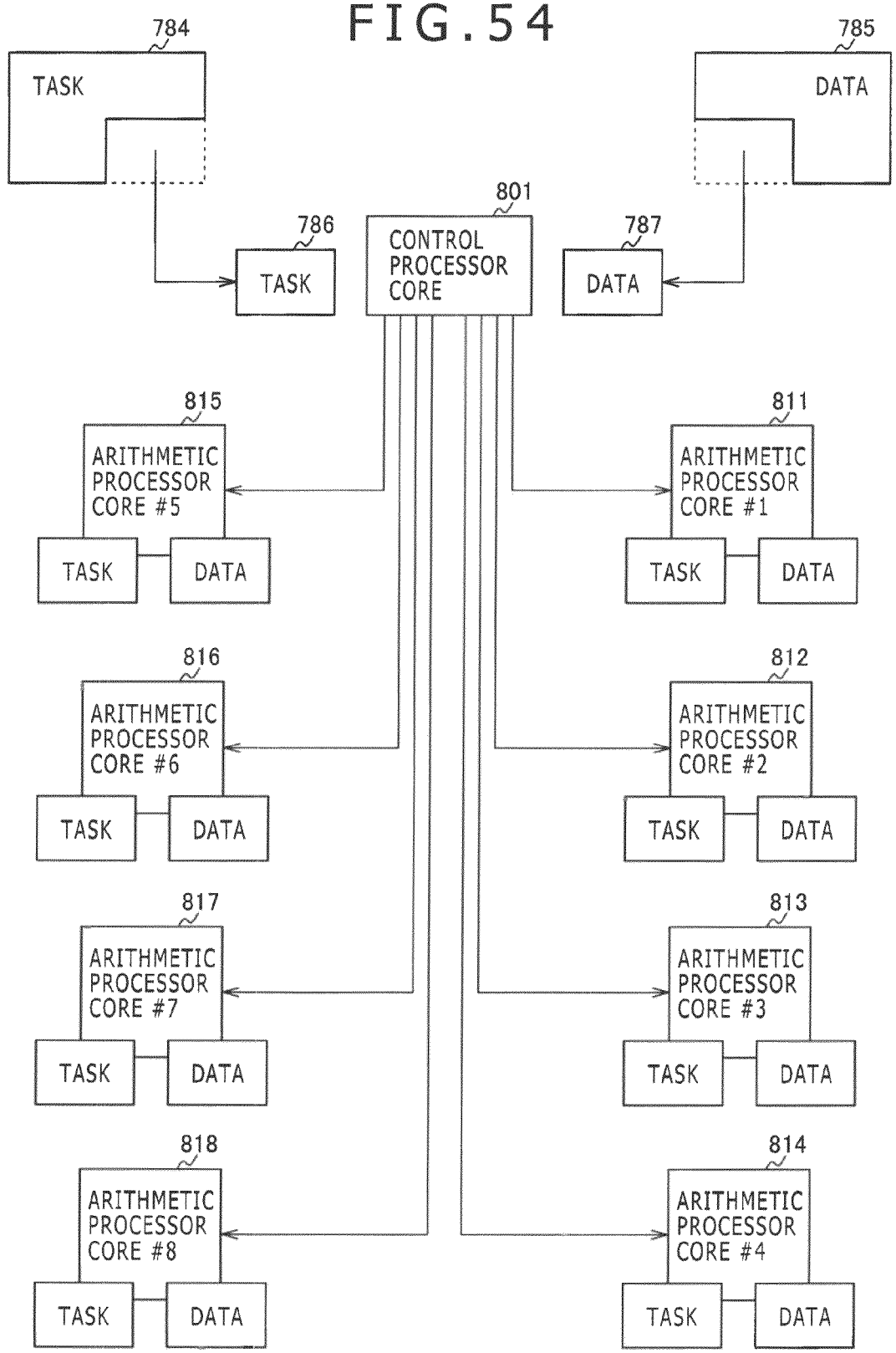
FIG. 54 is a diagram schematically illustrating an operation method of the multi-core processor 800 in the embodiment of the present invention.

FIG. 54 schematically shows the arithmetic operation method of the multi-core processor 800 in the embodiment of the present invention. In this example, in executing a task 784 by the control processor core 801 by use of data 785, each arithmetic processor core executes a task 786 that is a part of the task 784 by use of data 787 (a part of the data 785) necessary for the processing of the task 786.

As shown in the figure, if the control processor core 801 executes the task 784 by use of the data 785, each arithmetic processor core executes the task 786 by use of the data 787 (a part of the data 785) necessary for the processing of the task 786 that is a part of the task 784. In the embodiment of the present invention, the arithmetic operation processing is executed by each arithmetic processor core for each frame configuring a moving image.

As shown in the figure, the arithmetic operation by the multi-core processor 800 allows the parallel use of the arithmetic processor cores (#1) 811 through (#8) 818 to execute comparatively a large number of arithmetic operations in a comparatively short time and the use of SIMD (Single Instruction/Multiple Data) operation on the arithmetic processor cores (#1) 811 through (#8) 818 allows a comparatively large number of arithmetic operations with a small number of instructions. It should be noted that the SIMD operation is described in detail with reference to FIG. 58 through FIG. 61.

Figure 55:
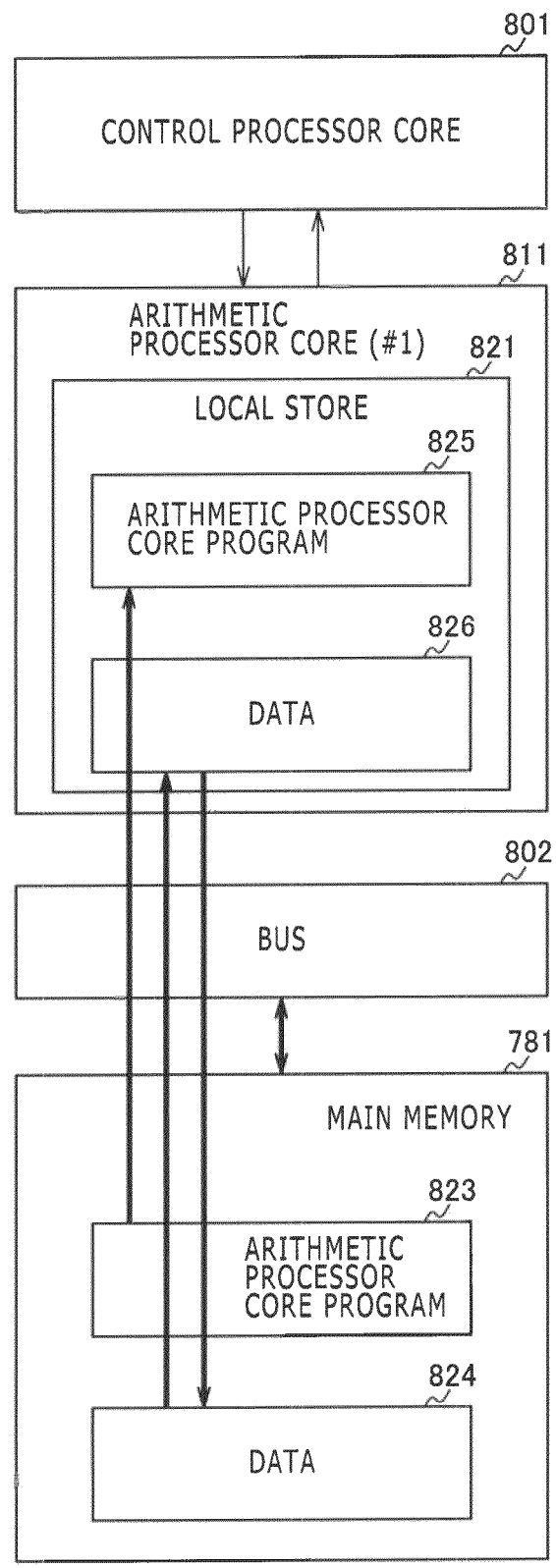
FIG. 55 shows diagrams schematically illustrating a program and a data flow in the case where an arithmetic operation is executed by the multi-core processor 800 in the embodiment of the present invention.

FIG. 55 schematically shows program and data flows in an arithmetic operation by the multi-core processor 800 in the embodiment of the present invention. Here, the arithmetic processor core (#1) 811 is used for an example of description among the arithmetic processor cores (#1) 811 through (#8) 818; the same holds true with the arithmetic processor cores (#2) 812 through (#8) 818.

First, the control processor core 801 sends an instruction to the arithmetic processor core (#1) 811 to load an arithmetic processor core program 823 stored in the main memory 781 into the local store 821 of the arithmetic processor core (#1) 811. Consequently, the arithmetic processor core (#1) 811 loads the arithmetic processor core program 823 stored in the main memory 781 into the local store 821.

Next, the control processor core 801 instructs the arithmetic processor core (#1) 811 to execute an arithmetic processor core program 825 stored in the local store 821.

Next, the arithmetic processor core (#1) 811 transfers data 824 necessary for the execution of the arithmetic processor core program 825 stored in the local store 821 from the main memory 781 to the local store 821.

Next, on the basis of the arithmetic processor core program 825 stored in the local store 821, the arithmetic processor core (#1) 811 manipulates data 826 transferred from the main memory 781 and executes processing in accordance with conditions, storing a processing result into the local store 821.

Next, the arithmetic processor core (#1) 811 transfers the result of the processing executed on the basis of the arithmetic processor core program 825 stored in the local store 821 from the local store 821 to the main memory 781.

Next, the arithmetic processor core (#1) 811 notifies the control processor core 801 of the end of the arithmetic operation processing.

The following describes in detail an SIMD arithmetic operation that is executed by use of the multi-core processor 800 with reference to drawings. Here, the SIMD arithmetic operation denotes an arithmetic operation method for executing the processing of two or more pieces of data with one instruction.

FIG. 56(a) schematically shows an overview of an arithmetic operation method for executing the processing of two or more pieces of data with each instruction. The arithmetic operation method shown in FIG. 56(b) is an ordinary arithmetic operation method, which is called a scalar arithmetic operation, for example. An instruction for adding data "A1" to data "B1" provides a processing result data "C1" for example. Also, the other three arithmetic operations are executed in the same manner; namely, data "A2," "A3" and "A4" in the same column are added to data "B2," "B3" and "B4" in the same column respectively by add instructions, providing data "C2," "C3" and "C4" as processing results. Thus, in a scalar operation, the processing of two or more pieces of data requires to issue respective instructions.

FIG. 56(b) schematically shows an overview of an SIMD arithmetic operation in which the processing of two or more pieces of data is executed with a single instruction. Here, a collection of data (the pieces of data enclosed by dotted lines 827 and 828) for an SIMD arithmetic operation are sometimes referred to as vector data. And an SIMD arithmetic operation that is executed by use of such vector data may be called a vector operation.

For example, a single instruction for adding vector data ("A1," "A2," "A3" and "A4") enclosed by a dotted line 827 to vector data ("B1," "B2," "B3" and "B4") enclosed by a dotted line 828 provides processing results "C1," "C2," "C3" and "C4" (data enclosed by a dotted line 829). Thus, in an SIMD operation, the processing of two or more pieces of data can be executed with a single instruction, thereby executing arithmetic operation processing at high speeds. Also, an instruction associated with these SIMD operations is executed by the control processor core 801 of the multi-core processor 800 and the arithmetic operation processing of two or more pieces of data for this instruction is executed in parallel by the arithmetic processor cores (#1) 811 through (#8) 818.

On the other hand, for example, an SIMD operation cannot execute such processing as addition of data "A1" and "B1," subtraction of data "A2" and "B2," multiplication of data "A3" and "B3," and division of data "A4" and "B4." Namely, the processing by an SIMD operation cannot be executed in which different types of processing are executed on two or more pieces of data.

The following describes in detail a specific arithmetic operation method of the SIMD operation in the execution of feature point extraction processing and optical flow computation processing, with reference to drawings.

Figure 57:
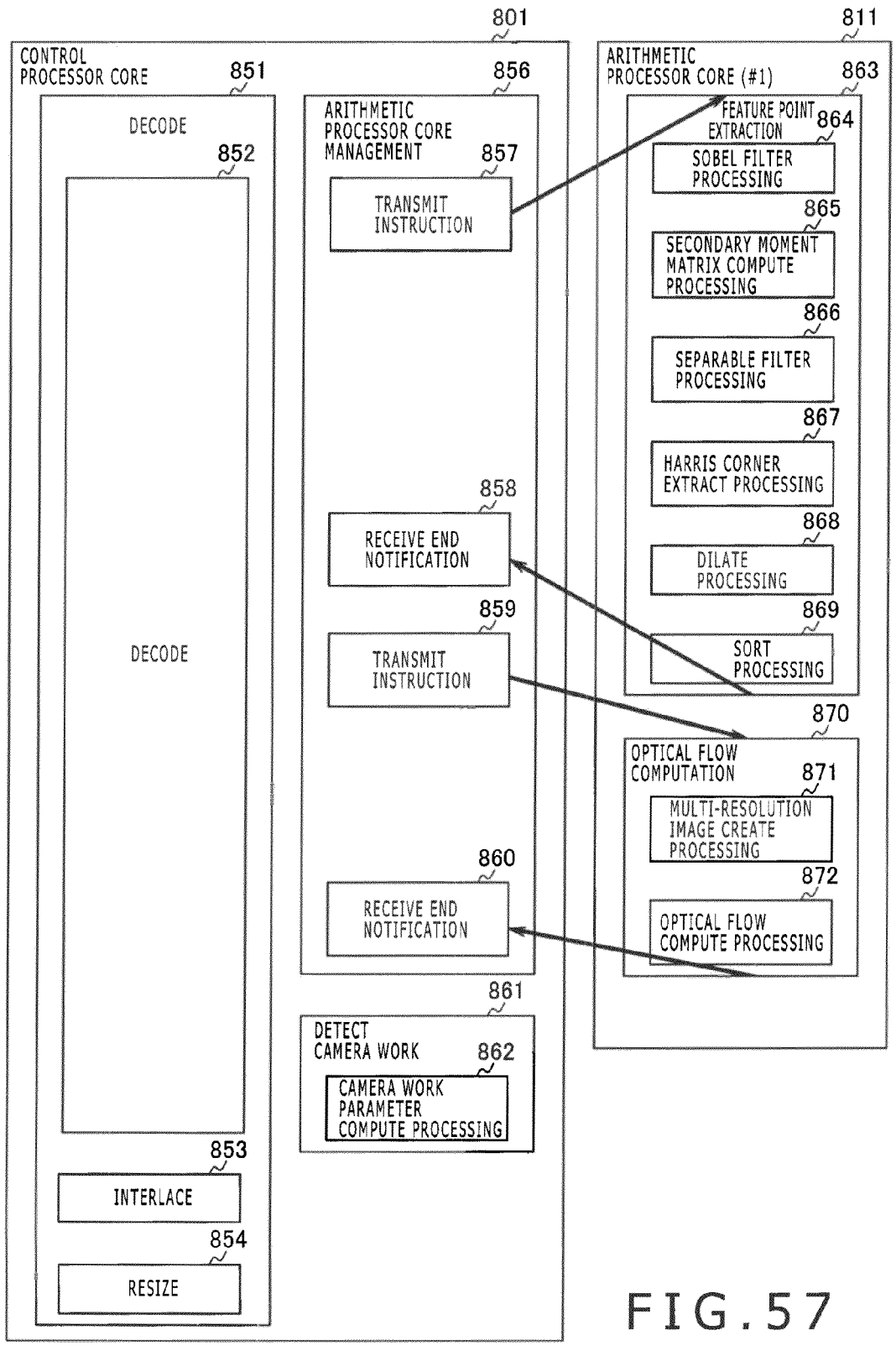
FIG. 57 is a diagram illustrating an exemplary configuration of a program that is executed by the arithmetic processor core (#1) 811 in the embodiment of the present invention.

FIG. 57 shows an exemplary configuration of a program that is executed by the control processor core 801 or the arithmetic processor core (#1) 811 in the embodiment of the present invention. Here, only the arithmetic processor core (#1) 811 is illustrated; the same processing is executed also in the arithmetic processor cores (#2) 812 through (#8) 818.

The control processor core 801 executes decode 852 as decode 851, interlace 853, and resize 854. The decode 852 is the processing of decoding a moving image file. The interlace 853 is the processing of removing an interlace for each decoded frame. The resize 854 is the processing of reducing each interlace-removed frame.

Further, the control processor core 801 executes transmit instruction 857 and 859 and receive end notification 858 and 860 as arithmetic processor core management 856. The transmit instruction 857 and 859 are the processing of transmitting SIMD operation execute instructions for the arithmetic processor cores (#1) 811 through (#8) 818 and the receive end notification 858 and 860 are the processing of receiving the end notification of an SIMD operation from the arithmetic processor cores (#1) 811 through (#8) 818 for the above-mentioned instruction. In addition, the control processor core 801 executes camera work parameter compute processing 862 as camera work detection 861. The camera work parameter compute processing 862 is the processing of computing affine transformation parameters for each frame on the basis of an optical flow computed by the SIMD operation by the arithmetic processor cores (#1) 811 through (#8) 818.

The arithmetic processor core (#1) 811 executes, as feature point extraction processing 863, Sobel filter processing 864, second moment matrix compute processing 865, separable filter processing 866, Calc Harris processing 867, dilation processing 868, and sort processing 869.

The Sobel filter processing 864 is the processing of computing x-direction value dx obtained by use of P2 filter (x-direction) and y-direction value dy obtained by use of a Y-direction filter. It should be noted that the computation of x-direction value dx is described in detail with reference to FIG. 58 through FIG. 61.

The second moment matrix compute processing is the processing of computing values $dx^2$, $dy^2$, and $dx \cdot dy$ by use of dx and dy computed by the Sobel filter processing 864.

The separable filter processing 866 is the processing of applying the Gaussian filter (blur processing) to an image of $dx^2$, $dy^2$, and $dx \cdot dy$ computed by the second moment matrix compute processing 865.

The Calc Harris processing 867 is the processing of computing Calc Harris score by use of values $dx^2$, $dy^2$, and $dx \cdot dy$ applied with blur processing by the separable filter processing 866. This Calc Harris score S is computed by the following equation for example.

$$S=(dx^2 \times dy^2 - dx \cdot dy \times dx \cdot dy)/(dx^2+dy^2+\epsilon)$$

The dilation processing 868 is the processing of executing blur processing on an image configured by Calc Harris score computed by the Calc Harris processing 867.

The sort processing 869 is the processing of sorting pixels in the descending order of Calc Harris scores computed by the Calc Harris processing 867, picking up the pixels by a predetermined number from the higher scores, and extracting the picked up points as feature points.

The arithmetic processor core (#1) 811 executes make pyramid image processing 871 and calc optical flow processing 872 as optical flow compute processing.

The make pyramid image processing 871 is the processing of sequentially creating images reduced to the predetermined number of steps from an image size at the time of image taking by camera, the created images being called as multiple resolution images.

The calc optical flow processing 872 is the processing of computing an optical flow for a smallest image among the multiple resolution images created by the make pyramid image processing 871 and, by use of this computation result, computing an optical flow again for an image that is one step higher in resolution, which is repeated until a largest image is reached.

Thus, for example, for the feature point extraction processing that is executed by the feature point extraction unit 121 shown in FIG. 2 and so on and the optical flow computation processing that is executed by the optical flow computation unit 122, processing results can be obtained by executing parallel processing by SIMD operation by use of the multi-core processor 800. It should be noted that the feature point extraction processing and the optical flow computation processing shown in FIG. 57 and so on are illustratively only, so that the SIMD operation by the multi-core processor 800 may be executed by use of other processing configured by various types of filter processing and threshold value processing for the images configuring a moving image.

FIG. 58 shows an overview of a data structure and a processing flow in the case of the filter processing by use of the Sobel filter 830 on the image data (the image data corresponding to one frame configuring a moving image taken by camera) stored in the main memory 781 in the embodiment of the present invention. It should be noted that the image data stored in the main memory 781 shown in the figure is shown in a simplified manner with the number of horizontal pixels being 32. Also, the Sobel filter 830 is a 3×3 edge extraction filter. As shown in the figure, the image stored in the main memory 781 is filtered by the Sobel filter 830 and filter processing results are outputted. This example is described by use of an example in which four filtering results are obtained at once by the use of SIMD operation.

FIG. 59 shows an overview of data flows in the case where an SIMD operation is executed by use of the Sobel filter 830 on the image data stored in the main memory 781 in the embodiment of the present invention. First, the predetermined number of lines (for example, 3 lines) including the first line of the image data stored in the main memory 781 are DMA (Direct Memory Access)—transferred to a first buffer 831 of the local store 821 of the arithmetic processor core and the predetermined number of lines obtained by shifting each line DMA-transferred to the first buffer 831 are DMA-transferred to a second buffer 832. Thus, the use of the double buffers can hide the delay caused by DMA transfer.

FIG. 60 shows an overview of a vector creating method in which, in the execution of filter processing by use of the Sobel filter 830 in the embodiment of the present invention, nine vectors are created from the image data stored in the first buffer 831. As shown in FIG. 59, after the DMA transfer, nine vectors are created from the image data stored in the first buffer 831. To be more specific, in line 1 of the image data stored in the first buffer 831, vector data 841 is created from four pieces of data from the left corner, vector data 842 is created from the four pieces of data obtained by shifting the preceding four pieces of data by one to the right side, and vector data 843 is created from the four pieces of data obtained by shifting the preceding four pieces of data by one to the right side. Also, likewise for line 2 and line 3, vector data 844 through 849 are created from four pieces of data.

FIG. 61 shows an overview of a vector computation method of executing vector computation for the vector data 841 through 849 by use of SIMD instructions in the filter processing by use of the Sobel filter 830 in the embodiment of the present invention. To be more specific, an SIMD operation is sequentially executed on the vector data 841 through 843 to obtain vector A. In this SIMD operation, an SIMD operation ""−1"ב"vector data 841"" is first executed. Next, an SIMD operation ""0"ב"vector data 842"" is executed and an SIMD operation ""1"ב"vector data 843"" is executed. Here, as for ""0"ב"vector data 842,"" the operation result is already determined to be "0," so that this operation can be omitted. As for ""1"ב"vector data 843,"" the operation result is already determined to be the same as "vector data 843," so that this operation can be omitted.

Next, add processing between operation result ""−1"× "vector data 841"" and operation result ""0"ב"vector data 842"" is executed by SIMD operation. Next, add processing is between the result of this add processing and operation result ""1"ב"vector data 843"" is executed by SIMD operation. Here, for example, a computation of a data structure "vector data 1"ב"vector data 2"+"vector data 3" can be executed by SIMD operation. Therefore, for the computation of vector A, the SIMD operations for ""0"ב"vector data 842"" and ""1"ב"vector data 843"" for example can be omitted and ""−1"ב"vector data 841"+"vector data 843"" may be executed by SIMD operations at once.

Also, likewise, an SIMD operation is executed on the vector data 844 through 846 to obtain vector B and an SIMD operation is executed on the vector data 847 through 849 to obtain vector C.

Next, an SIMD operation is executed on vectors A through C obtained by the SIMD operations to obtain vector D. Thus, executing SIMD operations can provide a collective acquisition of results equivalent to the number of vector elements (in this example, four pieces of data).

After the computation of vector D, the same processing is repeated on the data of the image stored in the first buffer 831 shown in FIG. 59 by shifting the position of data to be taken out by one to the right side, thereby sequentially executing computation of vector D of each data. And, when the processing up to the right end of the image data stored in the first buffer 831 shown in FIG. 59 has been completed, the processing results are DMA-transferred to the main memory 781.

Next, of the image data stored in the main memory 781, the predetermined number of lines obtained by shifting the lines transferred to the second buffer 832 by one line down are DMA-transferred to the first buffer 831 and the above-mentioned processing is repeated on the image data stored in the second buffer 832. Then, the same processing is repeated until the bottom line of the lines of the image data stored in the main memory 781 is reached.

Likewise, by executing the most processing of feature point extraction and optical flow computation by SIMD operations, the high-speed image processing can be realized.

Figure 62:
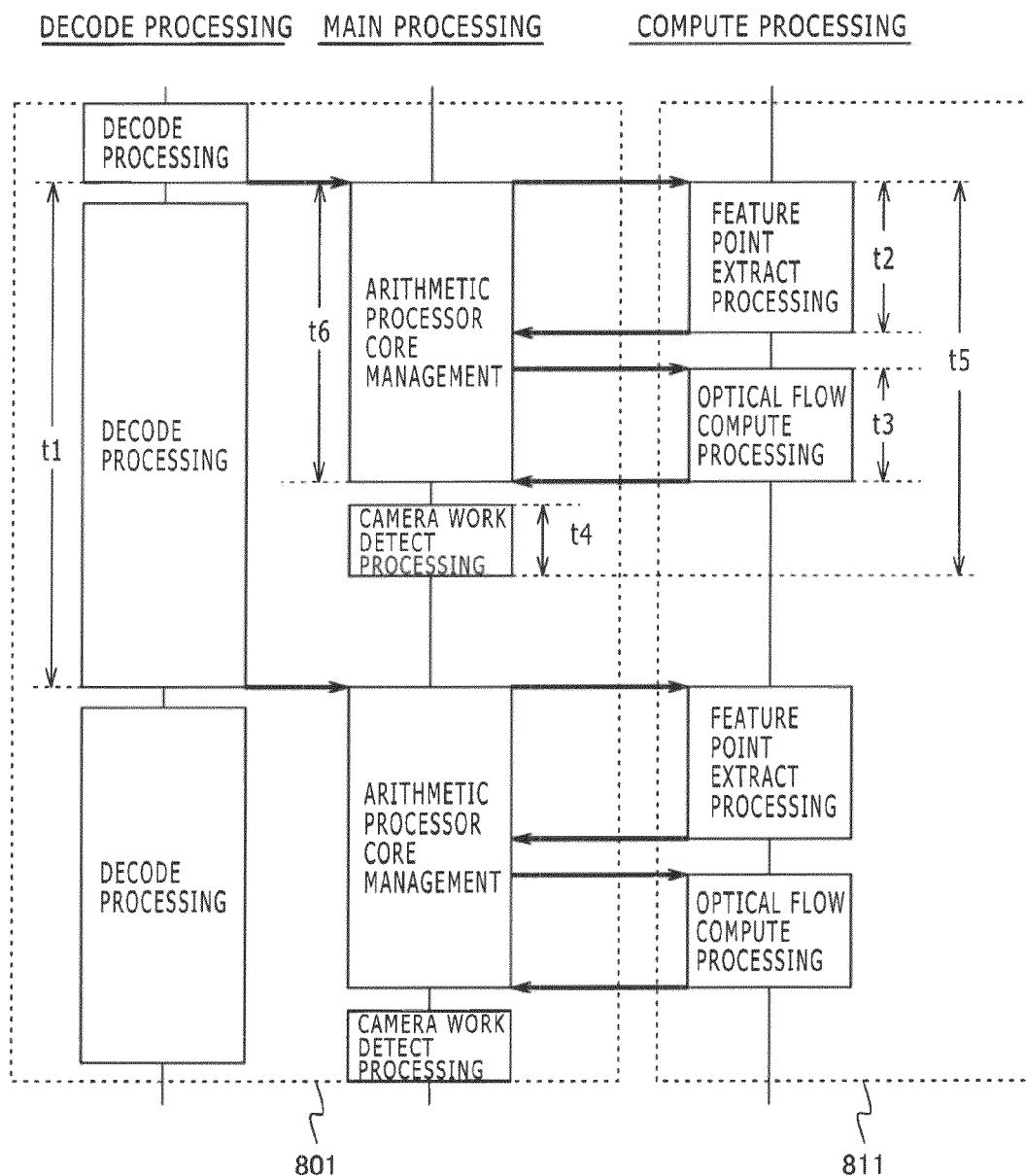
FIG. 62 is a diagram illustrating an overview of camera work parameter computation processing flows in time sequence in the embodiment of the present invention.

FIG. 62 shows an overview of camera work parameter computation processing in the embodiment of the present invention in a time sequence manner. As described above, executing SIMD operations by use of the multi-core processor 800, for example, allows the parallel execution of the decode and analysis processing for moving images. Hence, the analysis time for one frame configuring a moving image can be made shorter than the decode time.

For example, in the figure, t1 is indicative of a time required for the control processor core 801 to execute decode processing of one frame configuring a moving image, t2 is indicative of a time for the arithmetic processor cores (#1) 811 through (#8) 818 to execute feature point extraction processing of one frame configuring the moving image, t3 is indicative of a time required for the arithmetic processor cores (#1) 811 through (#8) 818 to execute optical flow computation processing of one frame configuring the moving image, and t4 is indicative of a time for the control processor core 801 to execute camera work parameter detection processing of one frame configuring the moving image. It should be noted that t5 is indicative of a time required for the arithmetic processor cores (#1) 811 through (#8) 818 to execute camera work detection processing of one frame configuring the moving image. Further, t6 is indicative of a time required for the control processor core 801 to execute management of the arithmetic processor cores (#1) 811 through (#8) 818. For example, t1 may be set to "25.0 ms," t2 to "7.9 ms," t3 to "6.7 ms," t4 to "1.2 ms," and t5 to "15.8 ms."

The following describes in detail reproduction of moving image content by use of a metadata file in the embodiment of the present invention with reference to drawings.

Figure 63:
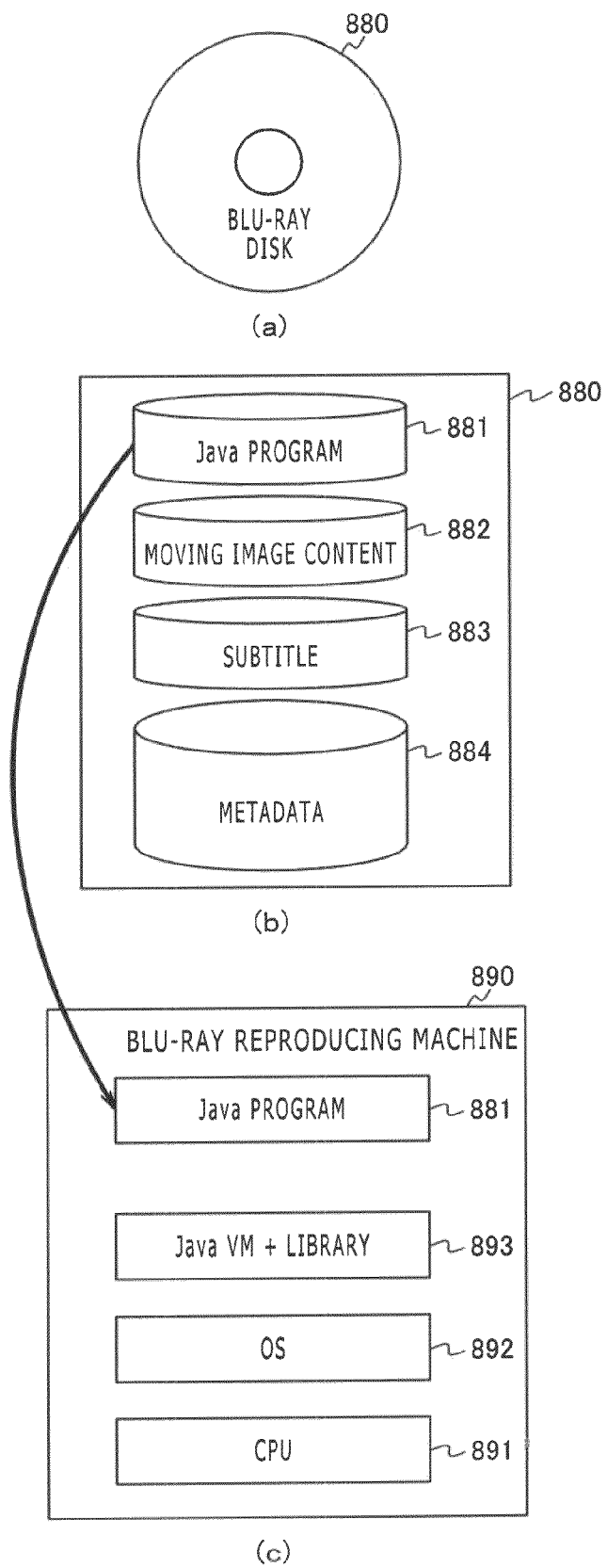
FIG. 63 shows diagrams schematically illustrating internal configurations of a Blu-ray disc 880 which is one example of recording media, data 881 through 884 recorded on the Blu-ray disc 880, and a Blu-ray reproducing machine 890 capable of reproducing the Blu-ray disc 880.

FIG. 63(a) is a top view schematically showing a Blu-ray Disc (registered trademark) 880 that is one example of recording media and FIG. 63(b) schematically shows data 881 through 884 recorded to the Blu-ray disc 880. Recorded to the Blu-ray Disc 880 are moving image content 882 that is a moving image taken by a camera or the like, a subtitle 883 of the moving image content 882, and metadata (for example, each item of information shown in FIG. 3 through FIG. 5) 884 obtained by analyzing the moving content 882, along with a Java (registered trademark) program 881 associated with the moving image reproduction in the embodiment of the present invention.

FIG. 63(c) schematically shows an internal configuration of a Blu-ray disc reproducing machine (Blu-ray Disc Player) 890 capable of reproducing the Blu-ray Disc 880. Here, the Blu-ray disc reproducing machine 890 capable of reproducing Blu-ray discs can execute Java (registered trademark) programs because a Java (registered trademark) VM (Java (registered trademark) Virtual Machine) and library 893 is installed as standard along with a CPU 891 and an OS 892. Hence, loading the Blu-ray Disc 880 on the Blu-ray disc reproducing machine 890 allows the Blu-ray disc reproducing machine 890 to load the Java (registered trademark) program 881 for execution. Consequently, when reproducing the moving content 882, the Blu-ray disc reproducing machine 890 can display a panorama image corresponding to a moving image and search for a moving image from among two or more moving images in the embodiment of the present invention. Namely, the moving image reproduction in the embodiment of the present invention can be realized on all Blu-ray reproducing machines without using dedicated PC software or the like.

As described above and according to the embodiment of the present invention, in viewing a moving image taken by an image taking apparatus, a panorama image corresponding to the moving image can be displayed, thereby providing the easy understanding of contents of each moving image. Also, in searching for a desired moving image from among two or more moving images, a list of panorama images can be referenced for searching, thereby allowing quick search for a desired moving image. Further, moving the cursor to a given position on a panorama image allows the displaying of an index image corresponding to the cursor position, thereby providing the easy understanding of contents of a moving image. Also, spatially arranging index images extracted from a moving image onto a panorama image for display allows the easy specification of a moving image reproducing position. Thus, searching can be done by use of an index image, so that the position of a desired frame in one moving image in an image taking space can be specified for searching the desired frame. In addition, in creating a panorama image, the color information of the image is converted in accordance with an image taking time for synthesizing the panorama image, so that the time axis of an entire moving image can be easily understood through the panorama image.

Also, according to the embodiment of the present invention, affine transformation parameters are computed by SIMD operation based on a multi-core processor, so that the affine transformation parameters for one frame can be computed within a processing time for decoding one frame. Consequently, the creation of panorama images and the extraction of index images can be executed at high speeds.

It should be noted that a synthesized image may be recorded to a recording media or the like for use in other reproduction display operations. Also, in the embodiment of the present invention, examples have been described in which image synthesis is executed by use of affine transformation parameters computed in advance; it is also practicable to compute affine transformation parameters at the time of image synthesis and execute image synthesis by use of these computed affine transformation parameters.

Further, in the embodiment of the present invention, examples have been described in which a synthesized image is created by repeating synthesized image creation processing on all frames configuring an entered moving image file; it is also practicable to create a synthesized image by repeating synthesized image creation processing on at least a certain number of frames among the frames configuring an entered moving image file and record the created synthesized image to the panorama image storage block 240.

Further, in the embodiment of the present invention, an image processing apparatus for displaying a synthesized image or an index image on a display block has been described for example; it is also practicable to apply the embodiment of the present invention to an image processing apparatus having image output means for to outputting image information for displaying a synthesized image or an index image onto other image processing apparatuses. Still further, the embodiment of the present invention is applicable to moving image reproducing apparatuses capable of reproducing moving images and image taking apparatuses, such as digital video cameras, capable of reproducing taken moving images.

Further, in the embodiment of the present invention, an image processing apparatus has been described for example; it is also practicable to apply the embodiment of the present invention to moving image reproducing apparatuses and the like cable of reproducing moving images. Still further, in the embodiment of the present invention, moving images taken by a camera have been described; it is also practicable to apply the embodiment of the present invention to edited moving images in the case where moving images taken by a camera have been edited and moving images with animation or the like partially synthesized.

Further, in the embodiment of the present invention, an example has been described in which an image affine-transformed by the index image extraction block 190 is extracted as an index image and this index image is displayed; it is also practicable to extract an image before being affine-transformed as an index image and display this index image.

It should be noted that, while preferred embodiments of the present invention having correlations with the inventive specified items in the scope of claims have been described using specific terms, such description is for illustrative purpose only, and it is to be understood that changes and variations may be made without departing from the spirit or scope of the following claims.

Namely, in claim 1, moving image storage means corresponds to the moving image storage block 200 for example. Conversion information storage means corresponds to the metadata storage block 210 for example. Also, image holding means corresponds to the image memory 180 for example. Also, image conversion means corresponds to the image conversion block 150 for example. Also, image synthesis means corresponds to the image synthesis block 170 for example. Also, index image extraction means corresponds to the index image extraction block 190 for example. Also, display control means corresponds to the display control block 291 for example. Also, operation acceptance means corresponds to the operation acceptance block 280 for example. Also, selection means corresponds to the selection block 270 for example.

Further, in claim 2, index information storage means corresponds to the index information storage block 230 for example.

Further, in claim 7, given interval information extraction means corresponds to the given interval moving image audio information extraction block 250 for example. Also, index information storage means corresponds to the index information storage block 230 for example.

Further, in claim 8, given interval information extraction means corresponds to the given interval moving image audio information extraction block 250 for example. Also, index information storage means corresponds to the index information storage block 230 for example. Also, audio control means corresponds to the audio control block 293 for example.

Further, in claim 9, moving image storage means corresponds to the moving image storage block 200 for example. Also, conversion information storage means corresponds to the metadata storage block 210 for example. Also, image holding means corresponds to the image memory 180 for example. Also, image conversion means corresponds to the image conversion block 150 for example. Also, color information conversion means corresponds to the transparency conversion block 160. Also, image synthesis means corresponds to the image synthesis block 170 for example. Also, the display control means corresponds to the display control block 291 for example.

Further, in claim 11, moving image storage image corresponds to the moving image storage block 200 for example.

Also, conversion information storage means corresponds to the metadata storage block 210 for example. Also, image holding means corresponds to the image memory 180 for example. Also, image conversion means corresponds to the image conversion block 150 for example. Also, image synthesis means corresponds to the image synthesis block 170 for example. Also, representative image storage means corresponds to the panorama image storage block 240 for example. Also, position decision means corresponds to the panorama image arrangement position decision block 260 for example. Also, display control means corresponds to the display control block 291 for example.

Further, in claim 12, moving image input means corresponds to the moving image input block 110 for example. Also, conversion information computation means corresponds to the camera work detection block 120 for example. Also, image holding means corresponds to the image memory 180 for example. Also, image conversion means corresponds to the image conversion block 150 for example. Also, image synthesis means corresponds to the image synthesis block 170 for example. Also, index image extraction means corresponds to the index image extraction block 190 for example. Also, display control means corresponds to the display control block 291 for example. Also, operation acceptance means corresponds to the operation acceptance block 280 for example. Also, selection means corresponds to the selection block 270.

Further, in claim 13, moving image storage means corresponds to the moving image storage block 200 for example. Also, conversion information storage means corresponds to the metadata storage block 210 for example. Also, image holding means corresponds to the image memory 180. Also, image conversion means corresponds to the image conversion block 150 for example. Also, image synthesis means corresponds to the image synthesis block 170 for example. Also, index image extraction means corresponds to the index image extraction block 190 for example. Also, display control means corresponds to the display control block 291 for example. Also, operation acceptance means corresponds to the operation acceptance block 280 for example. Also, selection means corresponds to the selection block 270 for example.

Further, in claim 14 or 15, an image conversion procedure corresponds to step 927 for example. Also, an image synthesis procedure corresponds to step S933 for example. Also, an index image extraction procedure corresponds to steps S929, S930, and S932 for example. Also, an operation acceptance procedure corresponds to step S945 for example. Also, selection procedure corresponds to step S946 for example. Also, a procedure for displaying an index image along with a representative image corresponds to step S947 for example.

It should be noted that the processing procedures described in the embodiment of the present invention may be understood as a method having a sequence of these procedures or as a program for making a computer execute the sequence of these procedures or a recording media that records this program.

The invention claimed is:

1. An image processing apparatus comprising:
   moving image storage means for storing a first taken moving image taken by an image taking apparatus;
   conversion information storage means for storing conversion information for converting a second taken moving image with reference to at least said first taken moving image, said second taken moving image taken by the image taking apparatus;
   image holding means for holding a first log image;
   image conversion means for converting said first taken moving image related with said conversion information on the basis of said conversion information to produce a converted taken moving image;
   image synthesis means for synthesizing said converted taken moving image with said first log image to store a second log image that is a resultant new log image in said image holding means, the first log image being a prior image synthesized by the image synthesis means;
   index image extraction means for extracting a new index image on the basis of said converted taken moving image and a coordinate position and a size of a previously extracted index image;
   display control means for displaying said second log image as a representative image indicative of said first taken moving image;
   operation acceptance means for accepting a selection operation for selecting a position on said representative image; and
   selection means for selecting said extracted new index image on the basis of said selected position on said representative image;
   wherein said display control means displays said selected index image along with said representative image.

2. The image processing apparatus according to claim 1, further comprising:
   index information storage means for storing said extracted new index image and the coordinate position and the size of said previously extracted index image as related with each other.

3. The image processing apparatus according to claim 2, wherein, on the basis of the coordinate position and the size of said previously extracted index image stored in said index information storage means, said display control means overlappingly displays said selected index image at a position on said representative image corresponding to said selected index image.

4. The image processing apparatus according to claim 2, wherein said index image extraction means computes an overlap ratio between said converted taken moving image and said previously extracted index image stored in said index information storage means and extracts said new index image on the basis of said computed overlap ratio.

5. The image processing apparatus according to claim 2, wherein said display control means displays a marker indicative of a position of said previously extracted index image at a position on said representative image corresponding to said extracted new index image on the basis of the coordinate position and a size of said previously extracted index image stored in said index information storage means.

6. The image processing apparatus according to claim 5, wherein said display control means changes types of said marker for display in accordance with a recording position of said extracted new index image.

7. The image processing apparatus according to claim 1, further comprising:
   given interval information extraction means for extracting moving image information existing within a given interval of said first taken moving image including said extracted new index image; and
   index information storage means for storing said extracted new index image and said moving image information existing within the given interval extracted in correspondence with said previously extracted index image as related with each other;

wherein, if an instruction operation for displaying said moving image information is accepted by said operation acceptance means, said display control means displays moving image information stored in said index information storage means as related with said selected index image.

8. The image processing apparatus according to claim 1, said moving image storage means storing at least one taken moving image related with audio information, said image processing apparatus further comprising:
given interval information extraction means for extracting audio information existing within a given interval of said at least one taken moving image related with audio information including said extracted new index image;
index information storage means for storing said extracted new index image and said audio information existing within the given interval extracted in correspondence with said previously extracted index image as related with each other; and
audio control means for outputting audio information stored in said index information storage means as related with said selected index image if an instruction operation for outputting said audio information is accepted by said operation acceptance means.

9. An image processing apparatus comprising:
moving image input means for entering a moving image taken by an image taking apparatus as a first taken moving image;
conversion information computation means for computing conversion information for converting a second taken image with reference to at least said first taken moving image, said second taken moving image taken by the image taking apparatus;
image holding means for holding a first log image;
image conversion means for converting said first taken moving image associated with said conversion information on the basis of said conversion information to produce a converted taken moving image;
image synthesis means for synthesizing said converted taken image with said first log image and holding a second log image that is a resultant new log image in said image holding means, the first log image being a prior image synthesized by the image synthesis means;
index image extraction means for extracting a new index image on the basis of said converted taken moving image and a coordinate position and a size of a previously extracted index image;
display control means for displaying said second log image as a representative image indicative of said first taken moving image;
operation acceptance means for accepting a selection operation for selecting a position on said representative image; and
selection means for selecting said extracted new index image on the basis of said selected position on said representative image;
wherein said display control means displays said selected index image along with said representative image.

10. An image reproducing apparatus comprising:
moving image storage means for storing a first taken moving image taken by an image taking apparatus;
conversion information storage means for storing conversion information for converting a second taken image with reference to at least said first taken moving image, said second taken moving image taken by the image taking apparatus;
image holding means for holding a first log image;
image conversion means for converting said first taken image related with said conversion information on the basis of said conversion information to produce a converted taken moving image;
image synthesis means for synthesizing said converted taken image with said first log image to store a second log image that is a resultant new log image in said image holding means, the first log image being a prior image synthesized by the image synthesis means;
index image extraction means for extracting a new index image on the basis of said converted taken moving image and a coordinate position and a size of a previously extracted index image;
display control means for displaying said second log image as a representative image indicative of said first taken moving image;
operation acceptance means for accepting a selection operation for selecting a position on said representative image; and
selection means for selecting said extracted new index image on the basis of said selected position on said representative image,
wherein said display control means displays said selected index image along with said representative image.

11. An image processing method in an image processing apparatus having moving image storage means for storing a first taken moving image taken by an image taking apparatus, conversion information storage means for storing conversion information for converting a second taken image with reference to at least said first taken moving image, said second taken moving image taken by the image taking apparatus, and image holding means for holding a first log image, said image processing method comprising:
an image conversion procedure for converting said first taken image related with said conversion information on the basis of said conversion information to produce a converted taken moving image;
an image synthesis procedure for synthesizing said converted taken image with said first log image to store a second log image that is a resultant new log image in said image holding means, the first log image being a prior image synthesized by the image synthesis means;
an index image extraction procedure for extracting a new index image on the basis of said converted taken moving image and a coordinate position and a size of a previously extracted index image;
a procedure for displaying said second log image as a representative image indicative of said taken moving image;
an operation acceptance procedure for accepting a selection operation for selecting a position on said representative image;
a selection procedure for selecting said extracted index image on the basis of said selected position on said representative image; and
a procedure for displaying said selected index image along with said representative image.

12. A non-transitory computer readable storage medium having instructions stored therein, which when executed by a processor, in an image processing apparatus having moving image storage means for storing a first taken moving image taken by an image taking apparatus, conversion information storage means for storing conversion information for converting a second taken image with reference to at least said first taken moving image, said second taken moving image taken by the image taking apparatus, and image holding means for holding a first log image, causes the processor to execute a method comprising:

an image conversion procedure for converting said first taken image related with said conversion information on the basis of said conversion information to produce a converted taken moving image;

an image synthesis procedure for synthesizing said converted taken image with said first log image to store a second log image that is a resultant new log image in said image holding means, the first log image being a prior image synthesized by the image synthesis means;

an index image extraction procedure for extracting a new index image on the basis of said converted taken moving image and a coordinate position and a size of a previously extracted index image;

a procedure for displaying said second log image as a representative image indicative of said taken moving image;

an operation acceptance procedure for accepting a selection operation for selecting a position on said representative image;

a selection procedure for selecting said extracted new index image on the basis of said selected position on said representative image; and a procedure for displaying said selected index image along with said representative image.

\* \* \* \* \*